United States Patent
Moran et al.

(10) Patent No.: US 12,485,277 B2
(45) Date of Patent: Dec. 2, 2025

(54) DEVICES, SYSTEMS AND METHODS FOR CORTICAL STIMULATION

(71) Applicant: Inner Cosmos Inc., Scotts Valley, CA (US)

(72) Inventors: Daniel W. Moran, Ballwin, MO (US); Eric Claude Leuthardt, St. Louis, MO (US); Meron Gribetz, New York City, NY (US)

(73) Assignee: Inner Cosmos Inc., Scotts Valley, CA (US)

( * ) Notice: Subject to any disclaimer, the term of this patent is extended or adjusted under 35 U.S.C. 154(b) by 372 days.

(21) Appl. No.: 17/792,149

(22) PCT Filed: Jan. 14, 2021

(86) PCT No.: PCT/IB2021/050253
§ 371 (c)(1),
(2) Date: Jul. 12, 2022

(87) PCT Pub. No.: WO2021/144730
PCT Pub. Date: Jul. 22, 2021

(65) Prior Publication Data
US 2023/0075205 A1  Mar. 9, 2023

Related U.S. Application Data

(60) Provisional application No. 62/960,734, filed on Jan. 14, 2020.

(51) Int. Cl.
*A61N 1/00* (2006.01)
*A61B 5/37* (2021.01)
(Continued)

(52) U.S. Cl.
CPC ............. *A61N 1/0529* (2013.01); *A61B 5/37* (2021.01); *A61B 5/372* (2021.01); *A61N 1/36082* (2013.01)

(58) Field of Classification Search
None
See application file for complete search history.

(56) References Cited

U.S. PATENT DOCUMENTS

| 4,328,813 A | 5/1982 | Ray |
| 4,551,149 A | 11/1985 | Sciarra |

(Continued)

FOREIGN PATENT DOCUMENTS

| CA | 3098311 | 11/2019 |
| CN | 105916547 | 8/2016 |

(Continued)

OTHER PUBLICATIONS

Restriction Official Action Dated Feb. 2, 2023 from the US Patent and Trademark Office Re. U.S. Appl. No. 17/253,176. (7 pages).

(Continued)

*Primary Examiner* — Sana Sahand

(57) ABSTRACT

Systems including intra-calvarial implants and/or subdermal implants are capable of stimulating cortical regions and sensing and electrical signals is implanted within or on a calvarial bone of a skull. The implants have current steering capability to change the current density profiles applied to selected cortical regions underlying the implant. The systems may track changes in the position and/or spatial parameters of a neural network by recording cortical electrical signals and processing them to compute the values of one or more network activity biomarkers. The systems may spatially track changes detected in network anatomical position and deliver the stimulation of the cortex to the network detected position by using current steering methods.

27 Claims, 22 Drawing Sheets

(51) Int. Cl.
*A61B 5/372* (2021.01)
*A61N 1/05* (2006.01)
*A61N 1/36* (2006.01)

(56) References Cited

U.S. PATENT DOCUMENTS

| | | | |
|---|---|---|---|
| 5,895,416 | A | 4/1999 | Barreras, Sr. et al. |
| 6,178,353 | B1 | 1/2001 | Griffith et al. |
| 6,246,911 | B1 | 6/2001 | Seligman |
| 6,463,328 | B1 | 10/2002 | John |
| 6,782,292 | B2 | 8/2004 | Whitehurst |
| 6,909,917 | B2 | 6/2005 | Woods et al. |
| 7,120,486 | B2 | 10/2006 | Leuthardt et al. |
| 7,177,678 | B1 | 2/2007 | Osorio et al. |
| 7,346,391 | B1 | 3/2008 | Osorio et al. |
| 7,353,065 | B2 | 4/2008 | Morrell |
| 7,532,935 | B2 | 5/2009 | Maschino et al. |
| 7,890,182 | B2 | 2/2011 | Parramon et al. |
| 8,065,012 | B2 | 11/2011 | Firlik et al. |
| 8,121,694 | B2 | 2/2012 | Molnar et al. |
| 8,262,714 | B2 | 9/2012 | Hulvershorn et al. |
| 8,380,314 | B2 | 2/2013 | Panken et al. |
| 8,396,557 | B2 | 3/2013 | DiLorenzo |
| 8,412,334 | B2 | 4/2013 | Whitehurst et al. |
| 8,868,173 | B2 | 10/2014 | Nelson et al. |
| 8,914,115 | B2 | 12/2014 | Giftakis et al. |
| 8,914,119 | B2 | 12/2014 | Wu et al. |
| 8,936,630 | B2 | 1/2015 | Denison et al. |
| 9,079,039 | B2 | 7/2015 | Carlson et al. |
| 9,084,901 | B2 | 7/2015 | Wahlstrand |
| 9,173,811 | B2 | 11/2015 | Greiner et al. |
| 9,198,828 | B2 | 12/2015 | Greiner et al. |
| 9,327,069 | B2 | 5/2016 | Foster et al. |
| 9,352,145 | B2 | 5/2016 | Whitehurst et al. |
| 9,381,346 | B2 | 7/2016 | Lee et al. |
| 9,409,030 | B2 | 8/2016 | Perryman et al. |
| 9,511,223 | B2 | 12/2016 | DeGiorgio et al. |
| 9,566,449 | B2 | 2/2017 | Perryman et al. |
| 9,597,494 | B2 | 3/2017 | Wingeier et al. |
| 9,782,593 | B2 | 10/2017 | Parramon et al. |
| 9,925,384 | B2 | 3/2018 | Perryman et al. |
| 9,949,376 | B2 | 4/2018 | Greenberg et al. |
| 10,025,375 | B2 | 7/2018 | Lazor et al. |
| 10,149,958 | B1 | 12/2018 | Tran et al. |
| 10,201,708 | B2 | 2/2019 | De Ridder |
| 10,220,211 | B2 | 3/2019 | Liao |
| 10,471,262 | B2 | 11/2019 | Perryman et al. |
| 11,467,665 | B2 | 10/2022 | Gribetz |
| 2002/0087201 | A1 | 7/2002 | Firlik et al. |
| 2006/0122660 | A1 | 6/2006 | Boveja et al. |
| 2007/0027499 | A1 | 2/2007 | Maschino et al. |
| 2007/0043401 | A1 | 2/2007 | John |
| 2007/0179558 | A1 | 8/2007 | Gliner et al. |
| 2008/0161880 | A1 | 7/2008 | Firlik et al. |
| 2009/0112278 | A1 | 4/2009 | Wingeier et al. |
| 2009/0118804 | A1 | 5/2009 | Moffitt et al. |
| 2009/0264954 | A1 | 10/2009 | Rise et al. |
| 2010/0114237 | A1 | 5/2010 | Giftakis et al. |
| 2010/0280336 | A1 | 11/2010 | Giftakis et al. |
| 2011/0009922 | A1 | 1/2011 | Assaf et al. |
| 2011/0137381 | A1 | 6/2011 | Lee et al. |
| 2011/0264165 | A1 | 10/2011 | Molnar et al. |
| 2011/0295338 | A1 | 12/2011 | Rickert et al. |
| 2012/0071947 | A1 | 3/2012 | Gupta et al. |
| 2012/0108998 | A1 | 5/2012 | Molnar et al. |
| 2012/0296444 | A1 | 11/2012 | Greenberg et al. |
| 2013/0178829 | A1 | 7/2013 | Rezai et al. |
| 2014/0058528 | A1 | 2/2014 | Contreras-Vidal et al. |
| 2014/0142669 | A1 | 5/2014 | Cook et al. |
| 2014/0200432 | A1 | 7/2014 | Banerji et al. |
| 2014/0214125 | A1 | 7/2014 | Greiner et al. |
| 2014/0237073 | A1 | 8/2014 | Schiff |
| 2014/0277019 | A1 | 9/2014 | Pearson |
| 2015/0105837 | A1 | 4/2015 | Aguilar Domingo |
| 2015/0118661 | A1 | 4/2015 | Haruta et al. |
| 2015/0119689 | A1 | 4/2015 | Pascual-Leone et al. |
| 2015/0227702 | A1 | 8/2015 | Krishna et al. |
| 2016/0206883 | A1 | 7/2016 | Bornzin et al. |
| 2016/0354095 | A1 | 12/2016 | Pearson |
| 2017/0042474 | A1 | 2/2017 | Widge et al. |
| 2017/0043167 | A1 | 2/2017 | Widge et al. |
| 2017/0202475 | A1 | 7/2017 | Leuthardt |
| 2017/0259064 | A1 | 9/2017 | Wu et al. |
| 2018/0036537 | A1 | 2/2018 | Van Den Heuvel |
| 2018/0153474 | A1 | 6/2018 | Aeschlimann et al. |
| 2018/0289311 | A1 | 10/2018 | Phillips |
| 2018/0353759 | A1 | 12/2018 | Starr et al. |
| 2019/0090749 | A1 | 3/2019 | Leuthardt et al. |
| 2019/0216342 | A1 | 7/2019 | Williams et al. |
| 2019/0217112 | A1 | 7/2019 | Williams et al. |
| 2019/0217113 | A1 | 7/2019 | Williams et al. |
| 2019/0217116 | A1 | 7/2019 | Williams et al. |
| 2019/0346925 | A1 | 11/2019 | Daniels |
| 2020/0023189 | A1 | 1/2020 | Gribetz et al. |
| 2020/0330749 | A1 | 10/2020 | Gribetz et al. |
| 2021/0255707 | A1 | 8/2021 | Gribetz |
| 2021/0361948 | A1 | 11/2021 | Leuthardt et al. |
| 2022/0117540 | A1 | 4/2022 | Leuthardt et al. |
| 2022/0413612 | A1 | 12/2022 | Gribctz |

FOREIGN PATENT DOCUMENTS

| | | |
|---|---|---|
| EP | 2835988 | 2/2015 |
| EP | 2038004 | 1/2018 |
| JP | 2009-524450 | 7/2009 |
| JP | 2013-527784 | 7/2013 |
| JP | 2014-079387 | 5/2014 |
| JP | 2016-517283 | 6/2018 |
| WO | WO 2005/039696 | 5/2005 |
| WO | WO 2006/029007 | 3/2006 |
| WO | WO 2007/138598 | 12/2007 |
| WO | WO 2009/044271 | 4/2009 |
| WO | WO 2009/067323 | 5/2009 |
| WO | WO 2010/056751 | 5/2010 |
| WO | WO 2011/123150 | 10/2011 |
| WO | WO 2014/078074 | 5/2014 |
| WO | WO 2014/130960 | 8/2014 |
| WO | WO 2015/164477 | 10/2015 |
| WO | WO 2015/195553 | 12/2015 |
| WO | WO 2016/049789 | 4/2016 |
| WO | WO 2016/118811 | 7/2016 |
| WO | WO 2017/199052 | 11/2017 |
| WO | WO 2018/109715 | 6/2018 |
| WO | WO 2019/130248 | 7/2019 |
| WO | WO 2019/239367 | 12/2019 |
| WO | WO 2019/244099 | 12/2019 |
| WO | WO 2020/161555 | 8/2020 |
| WO | WO 2021/144730 | 7/2021 |

OTHER PUBLICATIONS

Examination Report Dated Feb. 28, 2024 From the Australian Government, IP Australia Re. Application No. 2019291582. (5 Pages).
Official Action Dated May 23, 2024 from the US Patent and Trademark Office Re. U.S. Appl. No. 17/253,176. (14 pages).
Official Action Dated Jul. 7, 2023 from the US Patent and Trademark Office Re. U.S. Appl. No. 17/253,176. (83 pages).
Notice of Reason(s) for Rejection Dated Jan. 9, 2024 From the Japan Patent Office Re. Application No. 2020-570860 and Its Translation Into English. (16 Pages).
Translation Dated May 3, 2024 of Grounds of Reason of Rejection Dated Apr. 25, 2024 From the Korean Intellectual Property Office Re. Application No. 10-2021-7001558 (6 Pages).
Notice of Reason(s) for Rejection Dated Jun. 20, 2023 From the Japan Patent Office Re. Application No. 2020-570860 and Its Translation Into English. (8 Pages).
Notification of Office Action and Search Report Dated Sep. 9, 2022 From the China National Intellectual Property Administration Re. Application No. 201780085562.2. (8 Pages).

(56) References Cited

OTHER PUBLICATIONS

Communication Pursuant to Article 94(3) EPC Dated Nov. 7, 2023 From the European Patent Office Re. Application No. 19820226.9 (7 Pages).
Official Action Dated Feb. 3, 2023 from the US Patent and Trademark Office Re. U.S. Appl. No. 17/895,124. (33 pages).
Grounds of Reason of Rejection Dated Apr. 25, 2024 From the Korean Intellectual Property Office Re. Application No. 10-2021-7001558 (7 Pages).
Requisition by the Examiner Dated Apr. 24, 2024 From the Innovation, Science and Economic Development Canada, Canadian Intellectual Property Office Re. Application No. 3,103,772 and Claims. (8 Pages).
Examination Report Under Sections 12 & 13 of the Patents Act, 1970 and the Patents Rules, 2003 Dated Aug. 12, 2021 From the Government of India, Intellectual Property India, Patents, Designs, Trade Marks, Geographical Indications, The Patent Office Re. Application No. 201927028238. (6 Pages).
Grounds of Reason of Rejection Dated May 26, 2022 From the Korean Intellectual Property Office Re. Application No. 2010-7029927. (3 Pages).
International Preliminary Report on Patentability Dated Jul. 9, 2020 From the International Bureau of WIPO Re. Application No. PCT/IB2018/060667. (8 Pages).
International Preliminary Report on Patentability Dated Dec. 24, 2020 From the International Bureau of WIPO Re. Application No. PCT/IB2019/054948. (8 Pages).
International Preliminary Report on Patentability Dated Jun. 27, 2019 From the International Bureau of WIPO Re. Application No. PCT/IB2017/057952. (9 Pages).
International Preliminary Report on Patentability Dated Jul. 28, 2022 From the International Bureau of WIPO Re. Application No. PCT/IB2021/050253. (13 Pages).
International Preliminary Report on Patentability Dated Apr. 30, 2021 From the International Preliminary Examining Authority Re. Application No. PCT/IB2020/050527. (45 Pages).
International Preliminary Report on Patentability Dated Dec. 30, 2020 From the International Bureau of WIPO Re. Application No. PCT/IB2019/055217. (9 Pages).
International Search Report and the Written Opinion Dated Apr. 10, 2019 From the International Searching Authority Re. Application No. PCT/IB2018/060667. (14 Pages).
International Search Report and the Written Opinion Dated Dec. 13, 2019 From the International Searching Authority Re. Application No. PCT/IB2019/055217. (15 Pages).
International Search Report and the Written Opinion Dated Apr. 16, 2020 From the International Searching Authority Re. Application No. PCT/IB2020/050527. (16 Pages).
International Search Report and the Written Opinion Dated Oct. 16, 2019 From the International Searching Authority Re. Application No. PCT/IB2019/054948. (13 Pages).
International Search Report and the Written Opinion Dated Mar. 22, 2018 From the International Searching Authority Re. Application No. PCT/IB2017/057952. (16 Pages).
International Search Report and the Written Opinion Dated Jun. 23, 2021 From the International Searching Authority Re. Application No. PCT/IB2021/050253. (21 Pages).
Invitation to Pay Additional Fees Dated Oct. 15, 2019 From the International Searching Authority Re. Application No. PCT/IB2019/055217. (2 Pages).
Invitation to Pay Additional Fees, Communication Relating to the Results of the Partial International Search and the Provisional Opinion Dated May 3, 2021 From the International Searching Authority Re. Application No. PCT/IB2021/050253. (10 Pages).
Notice of Allowance Dated Jun. 1, 2022 from US Patent and Trademark Office Re. U.S. Appl. No. 17/251,829. (45 pages).
Notice of Reason(s) for Rejection Dated Nov. 2, 2021 From the Japan Patent Office Re. Application No. 2019-533071 and Its Translation Into English. (9 Pages).
Official Action Dated Jul. 8, 2022 from US Patent and Trademark Office Re. U.S. Appl. No. 16/954,554. (69 pages).
Official Action Dated Jun. 8, 2022 from US Patent and Trademark Office Re. U.S. Appl. No. 16/469,165. (78 pages).
Supplementary European Search Report and the European Search Opinion Dated Feb. 16, 2022 From the European Patent Office Re. Application No. 19820226.9. (8 Pages).
Written Opinion Dated Dec. 21, 2020 From the International Preliminary Examining Authority Re. Application No. PCT/IB2020/050527. (9 Pages).
Albert et al. "Deep Brain Stimulation, Vagal Nerve Stimulation and Transcranial Stimulation: An Overview of stimulation Parameters and Neurotransmitter Release", Neuroscience & Biobehavioral Reviews,33(7):1042-1060, Jul. 2009.
Alesci et al. "Major Depression Is Associated with Significant Diurnal Elevations in Plasma Interleukin-6 Levels, a Shift of Its Circadian Rhythm, and Loss of Physiological Complexity in Its Secretion: Clinical Implications", The Journal of Clinical Endocrinology & Metabolism, 90(5): 2522-2530, May 1, 2005.
Allain et al. "Enzymatic Determination of Total Serum Cholesterol", Clinical Chemistry,20(4): 470-475, Apr. 1974.
Asselbergs et al. "Mobile Phone-Based Unobtrusive Ecological Momentary Assessment of Day-to-Day Mood: An Explorative Study", Journal of Medical Internet Research, 18(3):1-15, 2016.
Avery et al. "A Controlled Study of Repetitive Transcranial Magnetic Stimulation in Medication-Resistant Major Depression", Biological Psychiatry,59(2):187-194, Jan. 15, 2006.
Ballenger et al. "Carbamazepine in Manic-Depressive Illness: A New Treatment", The American Journal of Psychiatry, 137(7): 782-790, Jul. 1980.
Barker et al. "Non-Invasive Magnetic Stimulation of Human Moto Cortex", The Lancet 325:1106-1107, 1985.
Behrend et al. "Toward Feedback Controlled Deep Brain Stimulation: Dynamics of Glutamate Release in the Subthalamic Nucleus in Rats", Journal of Neuroscience Methods, 180(2): 278-289, Jun. 15, 2009.
Bejjani et al. "Transient Acute Depression Induced by High-Frequency Deep-Brain Stimulation", The New England Journal of Medicine, 340:1476-1480,May 13, 1999.
Belmaker et al. "Major Depressive Disorder", The New England Journal of Medicine, 358:55-68,Jan. 3, 2008.
Benabid et al. "Combined (Thalamotomy and Stimulation) Stereotactic Surgery of the VIM Thalamic Nucleus for Bilateral Parkinson Disease",Proceedings of the Meeting of the American Society for Stereotactic and Functional Neurosurgery, Applied Neurophysiology, 50: 344-346, 1987.
Ben-Menachem et al. "Effects of Vagus Nerve Stimulation on Amino Acids and Other Metabolites in the CSF of Patients with Partial Seizures", Epilepsy Research, 20(3):221-227, Mar. 1995.
Ben-Menachem et al. "Vagus Nerve Stimulation for Treatment of Partial Seizures: 1. A Controlled Study of Effect on Seizures", Epilepsia, 35(3):614-626, 1994.
Berndt et al. "Expanding the Optogenetics Toolkit: A Naturally Occurring Channel for Inhibitory Optogenetics is Discovered", Science, 349(6248): 590-591,Aug. 7, 2015.
Bhagwagar et al. "Persistent Reduction in Brain Serotonin1A Receptor Binding in Recovered Depressed Men Measured By Positron Emission Tomography with [11C]WAY-100635", Molecular Psychiatry, 9:386-392, Mar. 24, 2004.
Bichot et al. "A Source for Feature-Based Attention in the Prefrontal Cortex", Neuron 88(4): 832-844, Nov. 18, 2015.
Bick et al. "Neuromodulation for Restoring Memory", Neurosurgical Focus, 40:1-12, May 2016.
Biederman et al. "A Fully-Integrated, Miniaturized (0.125 mm$^2$) 10.5 µW Wireless Neural Sensor", IEEE Journal of Solid-State Circuits, 48(4): 960-970, Apr. 2013.
Boyden et al. "Millisecond-Timescale, Genetically Targeted Optical Control of Neural Activity", Nature Neuroscience, 8(9):1263-1268, Sep. 2005.
Bradley et al. "Influence of Child Abuse on Adult Depression Moderation by the Corticotropin-Releasing Hormone Receptor Gene", Arch Gen Psychiatry.65(2):190-200,Feb. 2008.

(56) References Cited

OTHER PUBLICATIONS

Brody et al. "Regional Brain Metabolic Changes in Patients With Major Depression Treated With Either Paroxetine or Interpersonal Therapy", Arch Gen Psychiatry.;58(7):631-640, Jul. 2001.
Bundy et al. "Decoding Three-Dimensional Reaching Movements Using Electrocorticographic Signals In Humans", Journal of Neural Engineering, 13(2):1-18, Feb. 23, 2016.
Burke et al. "Depression and Cortisol Responses toPpsychological Stress: A Meta-Analysis", Psychoneuroendocrinology 30(9): 846-856, Oct. 2005.
Butson et al. "Current Steering to Control the vol. of Tissue Activated During Deep Brain Stimulation", Brain Stimulation, 1(1): 7-15, Jan. 2008.
Carpenter et al. "Effect of Vagus Nerve Stimulation on Cerebrospinal Fluid Monoamine Metabolites, Norepinephrine, and Gamma-AminobutyricAacid Concentrations in Depressed Patients", Biological Psychiatry, 56(6): 418-426, Sep. 15, 2004.
Carroll et al. "Pathophysiology o fHypercortisolism in Depression", Acta Psychiatrica Scandinavica 115 (Suppl. 433): 90-103, Feb. 2007.
Caspi et al. "Influence of Life Stress on Depression: Moderation By a Polymorphism in the 5-HTT Gene", Science, 301(5631): 386-389, Jul. 18, 2003.
Cepoiu et al. "Recognition of Depression By Non-Psychiatric Physicians—A Systematic Literature Review and Meta-Analysis", Journal of General Internal Medicine,23(1):25-36, Jan. 2008.
Cohen et al. "Developing a More Focal Magnetic Stimulator. Part I: Some Basic Principles", Journal of Clinical Neurophysiology, 8(1):102-111, Jan. 1, 1991.
Collinger et al. "High-Performance Neuroprosthetic Control by an Individual with Tetraplegia", The Lancet, 381(9866): 557-564, Feb. 16-22, 2013.
Coppen "The Biochemistry of Affective Disorders", The British Journa of Psychiatry, 113(504):1237-1264, Nov. 1967.
Coyne et al. "Prevalence, Depressive Nature, and Comorbidity of Disorders in Primary Care", General Hospital Psychiatry, 16: 267-276, 1994.
Cronin et al. "Task-Specific Somatosensory Feedback Via Cortical Stimulation in Humans", IEEE Transactions on Haptics, 9(4):512-522, Jul. 18, 2016.
Dantzer et al. "From Inflammation to Sickness and Depression: When the Immune System Subjugates the Brain", Nature Reviews Neuroscience, 9:46-56, Jan. 1, 2008.
Davidson et al. "Depression: Perspectives from Affective Neuroscience", Annual Review of Psychology, 53:545-574, Feb. 2002.
Deisseroth "Optogenetics: 10 years of Microbial Opsins in Neuroscience", Nature Neuroscience, 18(9): 1213-1225, Sep. 2015.
Deisseroth et al. "Optogenetics", Nature Methods, 8(1):26-29, Jan. 2011.
Depression Guideline Panel "Depression in Primary Care: Detection, Diagnosis, and Treatment", Journal of American Association of Nurse Practionars, 6(5): 224-238, May 1994.
Dimitriu et al. "Neurostimulatory Therapeutics in Management of Treatment-Resistant Depression with Focus on Deep Brain Stimulation", Mount Sinai Journal of Medicine, 75(3):263-275, Jun. 2008.
Dobelle "Artificial Vision for the Blind by Connecting a Television Camera to the Visual Cortex", ASAIO Journal, 46(1):3-9, Jan.-Feb. 2000.
Dobelle et al. "Artificial Vision for the Blind by Electrical Stimulation of the Visual Cortex", Neurosurgery, 5(4):521-527, Oct. 1, 1979.
Dobelle et al. "Artificial Vision for the Blind: Electrical Stimulation of Visual Cortex Offers Hope for a Functional Prosthesis", Science, 1834123):440-444, Feb. 1, 1974.
Dobelle et al. "'Braille' Reading By A Blind Volunteer By Visual Cortex Stimulation", Nature, 259:111-112, Jan. 15, 1976.
Dobelle et al. "Phosphenes Produced By Electrical Stimulation of Human Occipital Cortex, and Their Application To the Development of a Prosthesis for the Blind", The Journal of Physiology, 243(2):553-576, Dec. 1, 1974.
Doud et al. "Continuous Three-Dimensional Control of a Virtual Helicopter Using a Motor Imagery Based Brain-Computer Interface", PLoS One,6(10):1-10, Oct. 26, 2011.
Dougherty et al. "A Randomized Sham-Controlled Trial of Deep Brain Stimulation of the Ventral Capsule/Ventral Striatum for Chronic Treatment-Resistant Depression", Biological Psychiatry, 78(4):240-248, Aug. 15, 2015.
Duman et al. "A Molecular and Cellular Theory of Depression", Arch Gen Psychiatry,54(7):597-606,1997.
Duman et al. "A Neurotrophic Model for Stress-Related Mood Disorders", Biological Psychiatry, 59(12):1116-1127, Jun. 15, 2006.
Duman et al. "Neuronal Plasticity and Survival in Mood Disorders", Biological Psychiatry, 48(8): 732-739,Oct. 15, 2000.
Dumm et al. "Virtual Electrodes by Current Steering in Retinal Protheses", Investigational Ophthalmology & Visual Science, 55(12): 8077-8085, Dec. 2014.
Ellis et al. "Is Platelet Imipramine Binding Reduced in Depression? A Meta-Analysis", Biological Psychiatry, 36(5):292-299, Sep. 1, 1994.
Emiliani et al. "All-Optical Interrogation of Neural Circuits", Journal of Neuroscience 35(41):13917-13926, Oct. 14, 2015.
Fava "Diagnosis and Definition of Treatment-Resistant Depression", Biological Psychiatry, 53(8):649-659, Apr. 15, 2003.
Feng et al. "Toward Closed-1Lop Optimization of Deep Brain Sstmulation for Parkinson's Disease: Concepts and Lessons from a Computational Model", Journal of Neural Engineering, 4(2):14-21, Feb. 23, 2007.
Figiel et al. "The Use of Rapid-Rate Transcranial Magnetic Stimulation (rTMS) in Refractory Depressed Patients", Journal of Neuropsychiatry, 10(1):20-25, Apr. 2006.
Fitzgerald et al. "A Randomized, Controlled Trial of Sequential Bilateral Repetitive Transcranial Magnetic Stimulation for Treatment-Resistant Depression", The American Journal of Psychiatry, 163(1):88-94, Jan. 2006.
Fitzgerald et al. "The Application of Transcranial Magnetic Stimulation in Psychiatry and Neurosciences Research", Acta Psichiatrica Scandinavica, 105(5( ):324-340, May 2002.
Fontaine et al. "Effect of Subthalamic Nucleus Stimulation on Obsessive-Compulsive Disorder in a Patient with Parkinson Disease, " Journal of Neurosurgery 100 (2004):1084-1086.
Foster et al. "Reverse Replay of Behavioural Sequences in Hippocampal Place Cells During the Awake State.", Nature,440: 680-683, Mar. 30, 2006.
Frank et al. "Hold Your Horses: Impulsivity, Deep Brain Stimulation, and Medication in Parkinsonism", Science,318(23):1309-1312, Nov. 2007.
Fu et al. "Stable Long-Term Chronic Brain Mapping at the Single-Neuron Level", Nature Methods, 13: 875-882, Aug. 29, 2016.
Gale et al. "Electrical Stimulation-Evoked Dopamine Release in the Primate Striatum", Stereotact Functional Neurosurgery,91(6):355-363, Nov. 2013.
Gale et al. "Reward and Reinforcement Activity in the Nucleus Accumbens During Learning", Frontiers in Behavioral Bioscience, 8, Art.114: 1-10, Apr. 2014.
Garrett et al. "EVestG(TM): Responses In Depressed Patients," 30th Annual International IEEE EMBS Conference Vancouver, British Columbia, Canada, Aug. 20-24, 2008, pp. 1707-1710.
George et al. "A One-Year Comparison of Vagus Nerve Stimulation with Treatment as Usual for Treatment-Resistant Depression", Biological Psychiatry, 58(5):364-373,Sep. 1, 2005.
George et al. "Vagus Nerve Stimulation: A New Tool for Brain Research and Therapy", Biological Psychiatry, 47(4):287-295,Feb. 15, 2000.
Goldapple et al. "Modulation of Cortical-Limbic Pathways in Major Depression: Treatment-Specific Effects of Cognitive Behavior Therapy", Arch Gen Psychiatry,61(1):34-41, 2004.
Golier et al. "Low Serum Cholesterol Level and Attempted Suicide", The American Journal of Psychiatry, 152(3):419-423, Apr. 2006.

(56) References Cited

OTHER PUBLICATIONS

Goodman et al. "Deep Brain Stimulation in Psychiatry: Concentrating on the Road Ahead", Biological Psychiatry, 65(4):263-266,Feb. 15, 2009.
Greenberg et al. "Three-Year Outcomes in Deep Brain Stimulation for Highly Resistant Obsessive Compulsive Disorder", Neuropsychopharmacology, 31:2384-2393, Jul. 19, 2006.
Grossman et al. "Noninvasive Deep Brain Stimulation via Temporally Interfering Electric Fields", Cell, 169(6): 1029-1041, Jun. 1, 2017.
Hacker et al. "Frequency-Specific Electrophysiologic Correlates of Resting State fMRI Networks", NeuroImage, 149: 446-457, Apr. 1, 2017.
Hacker et al. "Resting State Network Estimation in Individual Subjects", NeuroImage, 82: 616-633, Available Online Jun. 2, 2013.
Haelbig et al. "Pallidal Stimulation in Dystonia: Effects on Cognition, Mood, and Quality of Life", Journal of Neurology, Neurosurgery and Psychiatry, 76(12):1713-1716, 2005.
Hamilton etal. "Neural Signal Processing and Closed-Loop Control Algorithm Design for an Implanted Neural Recording and Stimulation System", 37th Annual International Conference of the IEEE Engineering in Medicine and Biology Society (EMBC), 7831-7836, Aug. 2015.
Han et al. "Microelectrode Technologies for Deep Brain Stimulation", Implantable Neural Protesses, I. Devices and Applications, p. 195-219, Jun. 10, 2009.
Hardesty et al. "Deep Brain Stimulation in Movement and Psychiatric Disorders", Biological Psychiatry, 61(7):831-835, Apr. 1, 2007.
Heils et al. "Allelic Variation of Human Serotonin Transporter Gene Expression", Journal of Neurochemistry, 66(6):2621-2624, Jun. 1996.
Henry et al. "Brain Blood Flow Alterations Induced by Therapeutic Vagus Nerve Stimulation in Partial Epilepsy: I. Acute Effects at High and Low Levels of Stimulation", Epilepsia, 39(9):983-990, Sep. 1998.
Hochberg et al. "Neuronal Ensemble Control of Prosthetic Devices by a Human with Tetraplegia", Nature, 442:164-171, Jul. 13, 2006.
Holsboer "The Corticosteroid Receptor Hypothesis of Depression", Neuropsychopharmacology, 23:477-501, Nov. 1, 2000.
Holsboer et al. "Antidepressants and Hypothalamic-Pituitary-Adrenocortical Regulation", Endocrine Reviews,17(2):187-205, Apr. 1, 1996.
Hong et al. "Syringe Injectable Electronics: Precise Targeted Delivery with Quantitative Input/Output Connectivity", Nano Letters, 15 (10): 6979-6984, 2015.
Jacobs et al. "Adult Brain Neurogenesis and Psychiatry: A Novel Theory of Depression", Molecular Psychiatry,5:262-269, Jun. 15, 2000.
Janicak et al. "Transcranial Magnetic Stimulation in the Treatment of Major Depressive Disorder: A Comprehensive Summary of Safety Experience From Acute Exposure, Extended Exposure, and During Reintroduction Treatment", Journal of Clinical Psychiatry, 69(222-232), Feb. 2008.
Jarosiewicz et al. "Virtual Typing By People with Tetraplegia Using A Self-Calibrating Intracortical Braincomputer Interface", Science Translational Medicine 11;7(313): 28P., Nov. 2015.
Jiminez et al. "A Patient with a Resistant Major Depression Disorder Treated with Deep Brain Stimulation in the Inferior Thalamic Peduncle", Neurosurgery, 57(3):585-593, Sep. 1, 2005.
Judd et al. "A Prospective 12-Year Study of Subsyndromal and Syndromal Depressive Symptoms in Unipolar Major Depressive Disorders", Arch Gen Psychiatry, 55(8):694-700, Aug. 1998.
Karege et al. "Decreased Serum Brain-Derived Neurotrophic Factor Levels in Major Depressed Patients", Psychiatry Research, 109(2):143-148, Mar. 15, 2002.
Katnani et al. Temporally Coordinated Deep Brain Stimulation in the Dorsal and Ventral Striatum Synergistically Enhances Associative Learning, Scientific Reports, 6:1-8, Jan. 4, 2016.
Kearns et al. "A Comparison of Depression Rating Scales", The British Journal of Psychiatry, 141(1): 45-49, Jul. 1982.
Kempermann et al. "Depressed New Neurons?—Adult Hippocampal Neurogenesis and a Cellular Plasticity Hypothesis of Major Depression", Biological Psychiatry, 54(5):499-503, Sep. 1, 2003.
Kendler et al. "The Interaction of Stressful Life Events and a Serotonin Transporter Polymorphism in the Prediction of Episodes of Major Depression", Arch Gen Psychiatry, 62(5):529-535, May 2005.
Kennedy et al. "Direct Control of a Computer from the Human Central Nervous System", IEEE Transactions on Rehabilitation Engineering, 8(2): 198-202, Jun. 2000.
Kessler et al. "Lifetime Prevalence and Age-of-Onset Distributions of DSM-IV Disorders in the National Comorbidity Survey Replication", Archives of General Psychiatry, 62(6): 593-602, Jun. 2005.
Kessler et al. "The Epidemiology of Major Depressive Disorder: Results From the National Comorbidity Survey Replication (NCS-R)", JAMA, 289(23):3095-3105, Jun. 18, 2003.
Kirsch et al. "Initial Severity and Antidepressant Benefits: A Meta-Analysis of Data Submitted to the Food and Drug Administration", PLOS Medicine, 5(2):260-268, Feb. 2008.
Kirsch et al. "The Emperor's New Drugs: An Analysis of Antidepressant Medication Data Submitted to the U.S. Food and Drug Administration", Prevention & Treatment,5, (Art.23):1-11, Jul. 15, 2002.
Klein et al. Therapeutic Efficacy of Right Prefrontal Slow Repetitive Transcranial Magnetic Stimulation in Major Depression, A Double-Blind Controlled Study: Arch Gen Psychiatry. 56(4):315-320, 1999.
Klomp et al. "Fabrication of Large Arrays of Cortical Electrodes For Use In Man", Journal of Biomedical Materials Research Banner, 11(3):347-364, May 1977.
Konsman et al. "Rat brain vascular distribution of interleukin-1 type-1 receptor immunoreactivity: relationship to patterns of inducible cyclooxygenase expression by peripheral inflammatory stimuli", The Journal of Comparitive Neurology, 472(1):113-129, Apr. 19, 2004.
Kosel et al. "Mood Improvement After Deep Brain Stimulation of the Internal Globus Pallidus for Tardive Dyskinesia in a Patient Suffering From Major Depression", Journal of Psychiatric Research, 41(9):801-803, Nov. 2007.
Krahl et al. "Locus Coeruleus Lesions Suppress the Seizure-Attenuating Effects of Vagus Nerve Stimulation", Epilepsia, 39(7):709-714 Jul. 1998.
Kroenke et al. "The PHQ-9 Validity of a Brief Depression Severity Measure", Journal of General Internal Medicine Banner, 16(9): 606-613, Sep. 2001.
Kucewicz et al. "Evidence for Verbal Memory Enhancement with Electrical Brain Stimulation in the Lateral Temporal Cortex", Brain, A Journal of Neurology, 141(4); 971-978, Apr. 2018.
Kunugi et al. "Low Serum Cholesterol in Suicide Attempters", 41(2):196-200, Jan. 15, 1997.
Lacassse et al. "Serotonin and Depression: A Disconnect between the Advertisements and the Scientific Literature", PLOS Mdicine, 2(12):1211-1216, Dec. 2005.
Leuthardt et al. "A Brain-Computer Interface Using Electrocorticographic Signals in Humans*", Journal of Neural Engineering 1(2): 63-71,Jun. 14, 2004.
Lewis et al. "Restoration of Vision in Blind Individuals Using Bionic Devices: A Review with a Focus on Cortical Visual Prostheses", Brain Research, 1595: 51-73, Jan. 21, 2015.
LiKamWa et al. "MoodScope: Building a Mood Sensor from Smartphone Usage Patterns", MobiSys '13 Proceeding of the 11th Annual International Conference on Mobile Systems, Applications, and Services: 389-402, Jun. 25-28, 2013.
Liu et al. "Syringe Injectable Electronics", Nature Nanotechnology, 10(7): 629-636,Jul. 2015.
Lozano et al. "Subcallosal Cingulate Gyrus Deep Brain Stimulation for Treatment-Resistant Depression", Biological Psychiatry, 64(6):461-467, Sep. 15, 2008.
Maier et al. "S100B, Homocysteine, Vitamin B12, Folic Acid, and Procalcitonin Serum Levels in Remitters to Electroconvulsive Therapy: A Pilot Study", Disease Markers, 2018(Art.ID 2358451): 1-8, Published Online Jan. 10, 2018.

(56) References Cited

OTHER PUBLICATIONS

Makris et al. Variability and Anatomical Specificity of the Orbitofrontothalamic Fibers of Passage in the Ventral Capsule/Ventral Striatum (VC/VS): Precision Care for Patient-specific Tractography-Guided Targeting of Deep Brain Stimulation (DBS) in Obsessive Compulsive Disorder (OCD), Brain Imaging and Behavior, 10(4):1054-1067, Dec. 2016.
Malone, Jr. et al. "Deep Brain Stimulation of the Ventral Capsule/Ventral Striatum for Treatment-Resistant Depression", Biological Psychiatry, 65(4):267-275, Feb. 15, 2009.
Manji et al. "The Cellular Neurobiology of Depression", Nature Medicine, 7:541-547, May 1, 2001.
Mann "The Medical Management of Depression", The New England Journal of Medicine, 353:1819-1834, Oct. 27, 2005.
Marangell et al. "Neurostimulation Therapies in Depression: A Review of New Modalities", Acta Psychiatrica Scandinavica, 116(3):174-181, Sep. 2007.
Marangell et al. "Vagus Nerve Stimulation (VNS) for Major Depressive Episodes: One Year Outcomes", Biological Psychiatry, 51(4):280-287, Feb. 15, 2002.
Martin et al. "Brain Blood Flow Changes In Depressed Patients Treated With Interpersonal Psychotherapy or Venlafaxine Hydrochloride", Arch Gen Psychiatry.;58(7):641-648, Jul. 2001.
Mayberg "Limbic-Cortical Dysregulation: A Proposed Model of Depression", Clinical Neurosciences, 9(3), 471-481, 1997.
Mayberg et al. "Deep Brain Stimulation for Treatment-Resistant Depression", Neuron, 45(5):651-660, Mar. 3, 2005.
Mayberg et al. "Reciprocal Limbic-Cortical Function and Negative Mood: Converging PET Findings in Depression and Normal Sadness", The American Journal of Psychiatry, 156(5):675-682, May 1, 1999.
Mayberg et al. "Regional Metabolic Effects of Fluoxetine in Major Depression: Serial Changes and Relationship to Clinical Response", Biological Psychiatry, 48(8):830-843,Oct. 15, 2000.
McCreery et al. "A Characterization of the Effects of Neuronal Excitability Due To Prolonged Microstimulation with Chronically Implanted Microelectrodes", IEEE Transactions on Biomedical Engineering, 44(10):931-939, Oct. 1997.
Merali et al. "Dysregulation in the Suicide Brain: mRNA Expression of Corticotropin-Releasing Hormone Receptors and GABAA Receptor Subunits in Frontal Cortical Brain Region", The Journal of Neuroscience, 24(6):1478-1485, Feb. 11, 2004.
Milak et al. "Neuroanatomic Correlates of Psychopathologic Components of Major Depressive Disorder", Arch Gen Psychiatry, 62(4):397-408, Apr. 2005.
Moessner et al. "Consensus Paper of the WFSBP Task Force on Biological Markers: Biological Markers in Depression", The World Journal of Biological Psychiatry, 8(3):141-174, 2007.
Moran et al. "Motor Cortical Representation of Speed and Direction During Reaching", Journal of Neurophysiology, 82(5): 2676-2692, Nov. 1, 1999.
Morikawa et al. "An Origami-Inspired Ultrastretchable Bioprobe Film Device", IEEE 29th International Conference on Micro Electro Mechanical Systems (MEMS):149-152, Jan. 2016.
Mueller et al. "Recurrence After Recovery From Major Depressive Disorder During 15 Years of Observational Follow-Up", The American Journal of Psychiatry, 156(7):1000-1006, Jul. 1999.
Muller et al. "Thin-Film, Ultra High-Density Microelectrocorticographic Decoding of Speech Sounds in Human Superior Temporal Gyrus", IEEE Engineering in Medicine and Biology Conference Orlando,6P, Feb. 2016.
Naples et al. "A Spiral Nerve Cuff Electrode for Peripheral Nerve Stimulation", IEEE Transactions on Biomedical Engineering, 35(11): 905-916, Nov. 1988.
Nemeroff et al. "Elevated Concentrations of CSF Corticotropin-Releasing Factor-Like Immunoreactivity in Depressed Patients", Science, 226(4680):1342-1344, Dec. 14, 1984.
Nemeroff et al. "VNS Therapy in Treatment-Resistant Depression: Clinical Evidence and Putative Neurobiological Mechanisms", Neuropsychopharmacology, 31:1345-1355, Apr. 19, 2006.

Nestler et al. "Neurobiology of Depression", Neuron, 34(1):13-25, Mar. 28, 2002.
Neuronetics "NeuroStar TMS Therapy® System: FDA-Cleared Transcranial Magnetic Stimulation for Treatment of Depression", Neuronetics, 3 P., Sep. 2, 2011.
Nibuya et al. "Regulation of BDNF and trkB mRNA in Rat Brain By Chronic Electroconvulsive Seizure and Antidepressant Drug Treatments", Journal of Neuroscience, 15(11):7539-7547, Nov. 1, 1995.
Nuttin et al. "Electrical Stimulation in Anterior Limbs of Internal Capsules in Patients with Obsessive-Compulsive Disorder", Lancet, 354,(9189):1526, Oct. 30, 1999.
Nuyujukian et al. "A Nonhuman Primate Brain-Computer Typing Interface", Proceedings of the IEEE,105(1):66-72, Sep. 12, 2016.
O'Brien et al. "Plasma Cytokine Profiles in DSepressed Patients Who Fail to Respond To Selective Serotonin Reuptake Inhibitor Therapy", Journal of Psychiatric Research, 41(3-4):326-331, Apr.-Jun. 2007.
Ongur et al. "Prefrontal Cortical Projections To the Hypothalamus in Macaque Monkeys", The Journal of Comparative Neurology,401(4):480-505, Nov. 30, 1998.
Oxley et al. "Minimally Invasive Endovascular Stentelectrode Array for High-Fidelity, chronic Recordings of Cortical Neural Activity", Nature Biotechnology, 34: 320-327, Feb. 8, 2016.
Palopoli-Trojani et al. "In Vitro Assessment of Long-Term Reliability of Low-Cost [Mu]ECoG Arrays", 38th Annual International Conference of the IEEE Engineering in Medicine and Biology Society, EMBC, Orlando, FL, USA, Aug. 16-20, 2016, p. 4503-4506, Aug. 16, 2016.
Paniccia et al. "Clinical and Non-Clinical Depression and Anxiety in Young People: A Scoping Review on Heart Rate Variability", Autonomic Neuroscience: Basic and Clinical, 208: 1-14, Published Online Aug. 26, 2017.
Park et al. "Closed-Loop, Ultraprecise, Automated Craniotomies", Journal of Neurophysiology 113: 3943-3953, Jun. 2015.
Pascual-Marquis et al. "Low Resolution Electromagnetic Tomography: A New Method for Localizing Electrical Activity In The Brain", International Journal of Psychophysiology, 18(1):49-65, Oct. 1994.
Peretti et al. "Safety and Tolerability Considerations: Tricyclic Antidepressants vs. Selective Serotonin Reuptake Inhibitors", Acta Psychiatrica Scandinavica, 101(Suppl.403):17-25, Sep. 2000.
Petridis et al. "Unobtrusive Low Cost Pupil Size Measurements Using Web Cameras", 2nd International Workshop on Artificial Intelligence and Netmedicine (NetMed'13): 9-20, Nov. 28, 2013.
Piallat et al. "Monophasic But Not Biphasic Pulses Induce Brain Tissue Damage During Monopolar High-Frequency Deep Brain Stimulation", Neurosurgery, 64(1):156-163, Jan. 1, 2009.
Pittenger et al. "Stress, Depression, and Neuroplasticity: A Convergence of Mechanisms", Neuropsychopharmacology, 33:88-109, 2008.
Pool et al. "Psychosurgery in Oler People", Journal of American Geriatrics Society (AGS), 2(7): 456-466, Jul. 1954.
Post et al., "Antidepressant effects of carbamazepine", Journal of Psychiatry, 143(1): 29-34, Jan. 1986.
Quitkin et al. "Study Duration in Antidepressant Research: Advantages of a 12-Week Trial", Journal of Psychiatric Research, 20(3):211-216,Jan. 1, 1986.
Raisman et al. "High-Affinity 3H-Imipramine Binding in Platelets From Untreated and Treated Depressed Patients Compared to Healthy Volunteers", Psychopharmacology, 75(4):368-371, Dec. 1981.
Raison et al. "Cytokines Sing the Blues: Inflammation and The Pathogenesis of Depression", 27(1):24-31, Jan. 2006.
Rechlin et al. "Are Affective Disorders Associated with Alterations of Heart Rate Variability?", Journal of Affective Disorders, 32(4): 271-275, Dec. 1994.
Rubin et al. "Neuroendocrine Aspects of Primary Endogenous Depression", Arch Gen Psychiatry, 44(4):328-336, Apr. 1987.
Ruhe et al. "Mood Is Indirectly Related To Serotonin, Norepinephrine and Dopamine Levels in Humans: A Meta-Analysis of Monoamine Depletion Studies", Molecular Psychiatry, 12:331-359,Jan. 16, 2007.
Rush "About Treatment Resistant Depression", Cyberonics, 2007.

(56) References Cited

OTHER PUBLICATIONS

Rush et al. "Vagus Nerve Stimulation (VNS) For Treatment-Resistant Depressions: A Multicenter Study", Biological Psychiatry, 47(4):276-286, Feb. 15, 2000.
Russel "A Circumplex Model of Affect", Journal of Prsonality and Social Psychology, 39(6): 1161-1178, 1980.
Sapolsky "Glucocorticoids and Hippocampal Atrophy in Neuropsychiatric Disorders", Arch Gen Psychiatry. 57(10):925-935, Oct. 2000.
Schalk et al. "Brain-Computer Interfaces Using Electrocorticographic Signals", IEEE Reviews in Biomedical Engineering, 4:140-154, Oct. 17, 2011.
Scherer et al. "Self-Reported Symptoms of Depression and PTSD Are Associated with Reduced Vowel Space in Screening Interviews", IEEE Transactions on Affective Computing, 7(1): 59-61, Jan.-Mar. 2016.
Schwartz et al. "Primate Motor Cortex and Free Arm Movements to Visual Targets in Three-Dimensional Space. I. Relations Between Single Cell Discharge and Direction of Movement", The Journal of Neuroscience, 8(8): 2913-2927,Aug. 1, 1988.
Seo et al. "Wireless Recording in the Peripheral Nervous System with Ultrasonic Neural Dust", Neuron,91(3): 529-539, Aug. 3, 2016.
Sgoifo et al. "Autonomic Dysfunction and Heart Rate Variability in Depression", Stress, 18(3): 343-352, Published Online May 25, 2015.
Shimizu et al. "Alterations of Serum Levels of Brain-Derived Neurotrophic Factor (BDNF) in Depressed Patients With or Without Antidepressants", Biological Psychiatry, 54(1):70-75, Jul. 1, 2003.
Siddiqi et al. "Repetetive Transcranial Magnetic Stimulation With Resting-State Network Targeting for Treatment-Resistant Depression in Traumatic Brain Injury: A Randomized, Controlled, Double-Blinded Pilot Study", Journal of Neurotrauma, 36(8): 1361-1374, Published Online Jan. 7, 2019.
Silk et al. "Pupillary Reactivity to Emotional Information in Child and Adolescent Depression: Links to Clinical and Ecological Measures", The American Journal of Psychiatry, 164(12): 1873-1880, Dec. 2007.
Smith "The Macrophage Theory of Depression", Medical Hypotheses, 35(4):298-306, Aug. 1991.
Smith et al. "A Bayesian statistical analysis of behavioral facilitation associated with deep brain stimulation", Journal of Neuroscience Methods, 183(2):267-276,Oct. 15, 2009.
Solomon et al. "Multiple Recurrences of Major Depressive Disorder", The American Journal of Psychiatry, 157(2):229-233, Feb. 2000.
Speer et al. "Opposite effects of high and low frequency rTMS on regional brain activity in depressed patients", Biological Psychiatry, 48(12): 1133-1141,Dec. 15, 2000.
Sullivan et al. "Genetic Epidemiology of Major Depression: Review and Meta-Analysis", The American Journal of Psychiatry, 157(10):1552-1562, Oct. 2000.
Sun et al. "Responsive Cortical Stimulation For The Treatment of Epilepsy", Neurotherapeutics,5(1):68-74, Jan. 2008.
Taylor et al. "Direct Cortical Control of 3D Neuroprosthetic Devices", Science, 296, (5574):1829-1832, Jun. 7, 2002.
Troncoso et al. "Vision's First Steps: Anatomy, Physiology, and Perception in the Retina, Lateral Geniculate Nucleus, and Early Visual Cortical Areas", Visual Prosthetics: 23-57, Jan. 4, 2011.
Tung et al. "Using Finite State Automata To Produce Self-Optimization And Self-Control", IEEE Transactions on Parallel and Distributed Systems, 7(4):439-448, Apr. 1996.
Turner et al. "Selective Publication of Anti-Depressant Trials and its Influence on Apparent Efficacy", The New England Journal of Medicine, 358:252-260, Jan. 17, 2008.
Van Rijsbergen et al. "Can a One-Item Mood Scale Do the Trick? Predicting Relapse over 5.5-Years in Recurrent Depression", PLOS One, 7(10):1-5, Oct. 3, 2012.
Velasco et al. "Neurobiological Background for Performing Surgical Intervention in the Inferior Thalamic Peduncle for Treatment of Major Depression Disorders", Neurosurgery, 57(3):439-448,Sep. 1, 2005.
Viventi et al. "Flexible, Foldable, Actively Multiplexed, High-Density Electrode Array for Mapping Brain Activity In Vivo", Nature Neuroscience, 14(12): 1599-1605, 2011.
Wang et al. "An Electrocorticographic Brain Interface in an Individual with Tetraplegia", PLOS One 8(2):1-8, Feb. 6, 2013.
Watanabe et al. "Transcranial Electrical Stimulation Through Screw Electrodes For Intraoperative Monitoring of Motor Evoked Potentials", Journal of Neurosurgery 100(1):155-160, Jan. 1, 2004.
Wells et al. "The Functioning and Well-Being of Depressed Patients: Results From the Medical Outcomes Study", JAMA, 262(7):914-919, Aug. 18, 1989.
Wheeler et al. "An Implantable 64-Channel Neural Interface With Reconfigurable Recording and Stimulation", 37th Annual International Conference of the IEEE Engineering in Medicine and Biology Society (EMBC), 7837-7840, Aug. 2015.
Wodlinger et al. "Ten-Dimensional Anthropomorphic Arm Control in a Human Brain-Machine Interface: Difficulties, Solutions, and Limitations", Journal of Neural Engineering, 12(1):1-17, Dec. 16, 2014.
Wong et al. "Closed-Loop Control of Cellular Functions Using Combinatory Drugs Guided By a Stochastic Search Algorithm", Proceedings of the National Academy of Sciences, 105(13): 5105-5110, Apr. 1, 2008.
Xie et al. "Three-Dimensional Macroporous Nanoelectronic Networks as Minimally Invasive Brain Probes", Nature Materials, 14: 286-1292 Oct. 5, 2015.
Yamagiwa et al. "Flexible Parylene-Film Optical Waveguide Arrays", Applied Physics LKetters, 107(8), 6P, 2015.
Yamagiwa et al. "Self-Curling and -Sticking Flexible Substrate for ECoG Electrode Array", IEEE 26th International Conference on Micro Electro Mechanical Systems (MEMS): 480-483, Jan. 2013.
Yanagisawa et al. "Electrocorticographic Control of a Prosthetic Arm in Paralyzed Patients", Annals of Neurology, 71(3): 353-361, Mar. 2012.
Yirmiya et al. "Illness, Cytokines, and Depression", Annals of the New York Academy of Sciences, 917(1):478-487, Jan. 2000.
Yousry et al. "Localization of the Motor Hand Area to a Knob on the Precentral Gyrus, A New Landmark", Brain, 120(1): 141-157, Jan. 1, 1997.
Zhou et al. "Pulvinar-Cortex Interactions in Vision and Attention", Neuron, 89(1):209-220, Jan. 6, 2016.
Requisition by the Examiner Dated Aug. 10, 2023 From the Innovation, Science and Economic Development Canada, Canadian Intellectual Property Office Re. Application No. 3,103,772. (4 Pages).
Official Action Dated Oct. 26, 2023 from the US Patent and Trademark Office Re. U.S. Appl. No. 17/253,176. (17 pages).
Final Official Action Dated Feb. 16, 2023 from the US Patent and Trademark Office Re. U.S. Appl. No. 16/469,165. (33 pages).
American Psychiatric Association "Diagnostic and Statistical Manual of Mental Disorders: DSM-IV™", The American Psychiatric Association, Fourth Ed., p. 1-886, May 1994. (Part 1).
American Psychiatric Association "Diagnostic and Statistical Manual of Mental Disorders: DSM-IV™", The American Psychiatric Association, Fourth Ed., p. 1-886, May 1994. (Part 2).
American Psychiatric Association "Diagnostic and Statistical Manual of Mental Disorders: DSM-IV™", The American Psychiatric Association, Fourth Ed., p. 1-886, May 1994. (Part 3).
American Psychiatric Association "Diagnostic and Statistical Manual of Mental Disorders: DSM-IV™", The American Psychiatric Association, Fourth Ed., p. 1-886, May 1994. (Part 4).
American Psychiatric Association "Diagnostic and Statistical Manual of Mental Disorders: DSM-IV™", The American Psychiatric Association, Fourth Ed., p. 1-886, May 1994. (Part 5).
American Psychiatric Association "Diagnostic and Statistical Manual of Mental Disorders: DSM-IV™", The American Psychiatric Association, Fourth Ed., p. 1-886, May 1994. (Part 6).

(56) References Cited

OTHER PUBLICATIONS

American Psychiatric Association "Diagnostic and Statistical Manual of Mental Disorders: DSM-IV™", The American Psychiatric Association, Fourth Ed., p. 1-886, May 1994. (Part 7).
American Psychiatric Association "Diagnostic and Statistical Manual of Mental Disorders: DSM-IV™", The American Psychiatric Association, Fourth Ed., p. 1-886, May 1994. (Part 8).
American Psychiatric Association "Diagnostic and Statistical Manual of Mental Disorders: DSM-IV™", The American Psychiatric Association, Fourth Ed., p. 1-886, May 1994. (Part 9).
American Psychiatric Association "Diagnostic and Statistical Manual of Mental Disorders: DSM-IV™", The American Psychiatric Association, Fourth Ed., p. 1-886, May 1994. (Part 10).
American Psychiatric Association "Diagnostic and Statistical Manual of Mental Disorders: DSM-IV™", The American Psychiatric Association, Fourth Ed., p. 1-886, May 1994. (Part 11).
American Psychiatric Association "Diagnostic and Statistical Manual of Mental Disorders: DSM-IV™", The American Psychiatric Association, Fourth Ed., p. 1-886, May 1994. (Part 12).
American Psychiatric Association "Diagnostic and Statistical Manual of Mental Disorders: DSM-IV™", The American Psychiatric Association, Fourth Ed., p. 1-886, May 1994. (Part 13).
American Psychiatric Association "Diagnostic and Statistical Manual of Mental Disorders: DSM-IV™", The American Psychiatric Association, Fourth Ed., p. 1-886, May 1994. (Part 14).
American Psychiatric Association "Diagnostic and Statistical Manual of Mental Disorders: DSM-IV™", The American Psychiatric Association, Fourth Ed., p. 1-886, May 1994. (Part 15).
American Psychiatric Association "Diagnostic and Statistical Manual of Mental Disorders: DSM-IV™", The American Psychiatric Association, Fourth Ed., p. 1-886, May 1994. (Part 16).
American Psychiatric Association "Diagnostic and Statistical Manual of Mental Disorders: DSM-IV™", The American Psychiatric Association, Fourth Ed., p. 1-886, May 1994. (Part 17).
Requisition by the Examiner Dated Mar. 17, 2025 From the Innovation, Science and Economic Development Canada, Canadian Intellectual Property Office Re. Application No. 3,103,772. (3 Pages).
Examination Report Dated Dec. 11, 2024 From the Australian Government, IP Australia Re. Application No. 2019291582. (3 Pages).

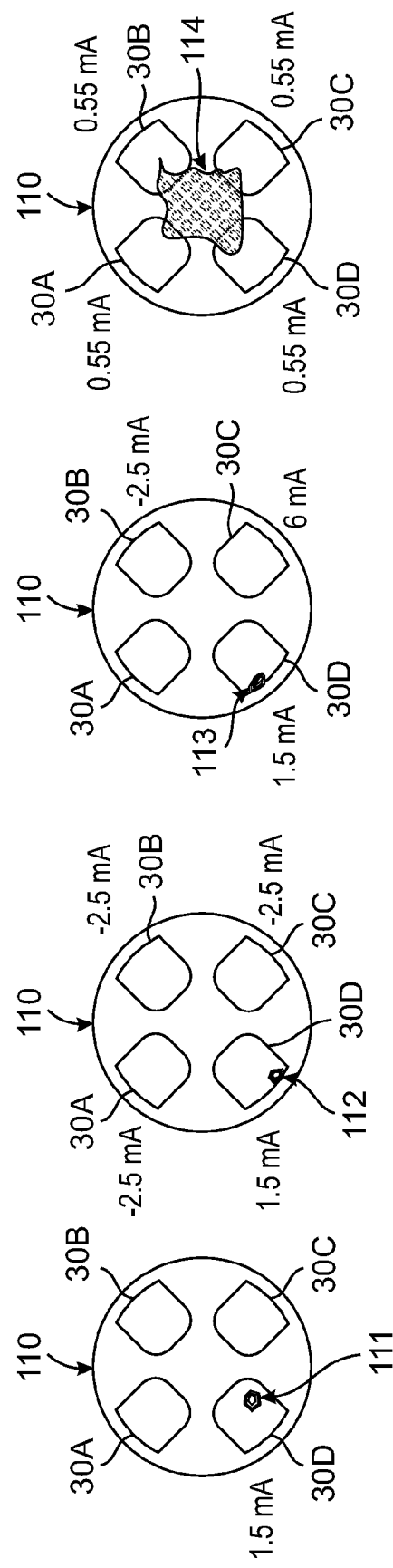

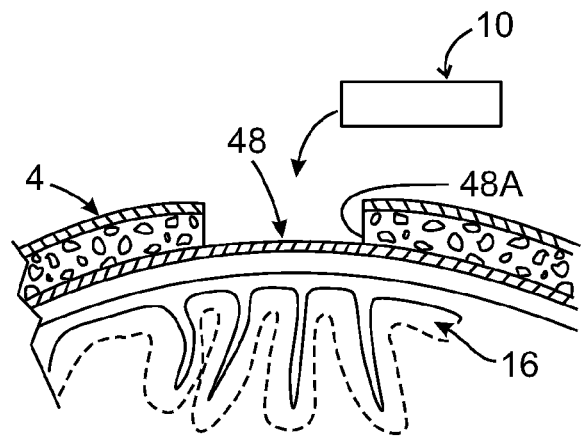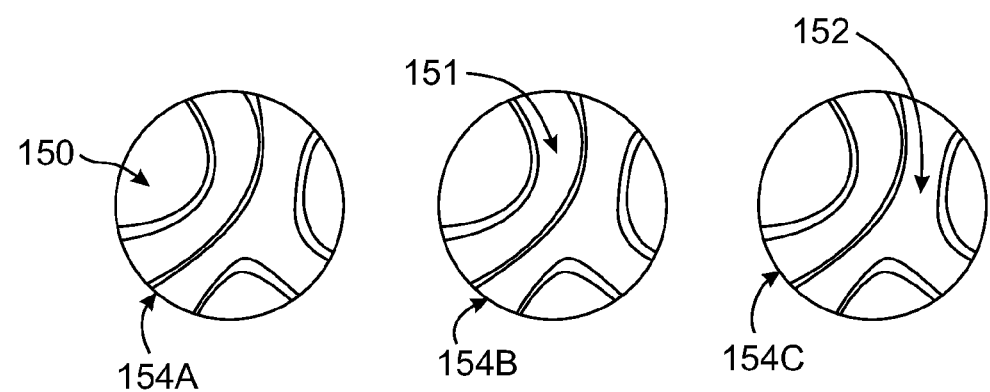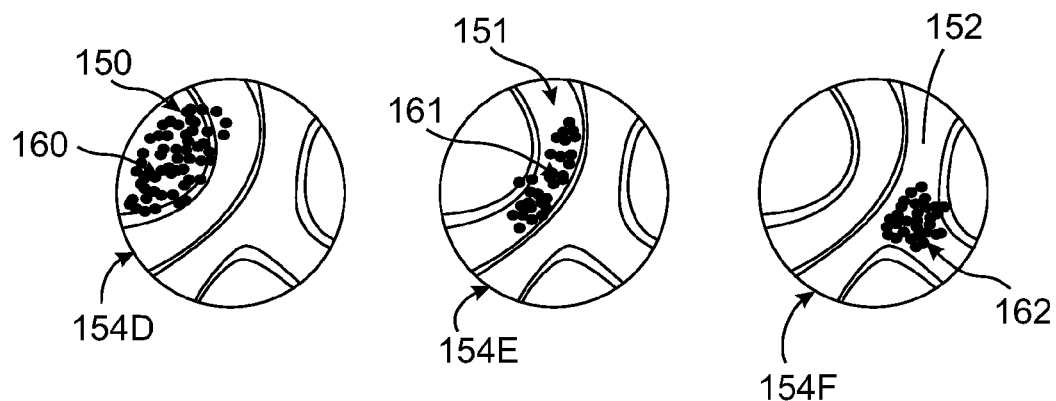
FIG. 19

DEVICES, SYSTEMS AND METHODS FOR CORTICAL STIMULATION

RELATED APPLICATIONS

This application is a National Phase of PCT Patent Application No. PCT/IB2021/050253 having International filing date of Jan. 14, 2021, which claims the benefit of priority under 35 USC § 119 (e) of U.S. Provisional Patent Application No. 62/960,734 filed on Jan. 14, 2020. The contents of the above applications are all incorporated by reference as if fully set forth herein in their entirety.

FIELD AND BACKGROUND OF THE INVENTION

The present invention, in some embodiments thereof, relates to the field of brain computer interface systems (BCIs), and more particularly to BCIs including electrode arrays for electrically stimulating and or inhibiting neuronal network activities in the cortex in a precise spatio-temporal manner by using current steering.

Recording of electrical signals from the cortical surface of the brain and electrically stimulating selected cortical regions as well as other deeper brain regions underlying the cortex may enable neuro-modulation of brain electrophysiology that may have a wide range of clinical and non-clinical applications. In some clinical applications, cortical stimulation may be used to modify cortical excitability to treat numerous neuropsychiatric diseases such as, among others, depression, ADHD, OCD, addiction, and obesity.

The recording of cortical electrical signals may also be implemented in brain computer interfaces that may be used to treat a wide array of motor disabilities.

Brain recording and/or stimulating methods may also be used for modulating the brain physiology to enhance cognitive function in healthy individuals or to improve cognitive function in some patients having neuropsychiatric diseases affecting cognitive performance such as, inter alia, depression, ADHD, OCD, Various eating disorders, epilepsy, and many other psychiatric, neurodegenerative, neurological and neuropsychiatric disorders.

Depending on the stimulation modality, the brain region being stimulated, and the interface regime, cognitive operations such as attention, memory, analytic abilities, and mood may all be enhanced beyond a given individual's normal baseline.

Electrical current steering using multiple stimulating electrodes on a single array was first used in peripheral nerve cuff electrodes at Case Western Reserve in the 1990s. Using multiple electrodes in the cuff electrode, Sweeney and Mortimer varied the anode/cathode amplitudes (i.e. both voltage polarity and voltage magnitude) to selectively activate specific sectors within the cross-section of the sciatic nerve to activate specific muscles within the hind-limb. Later these techniques were adopted by other researchers to selectively activate the optic nerve to provide a visual neuro-prosthetic and to activate the auditory nerve to give a sense of hearing. Spinal cord stimulators used the technique of current steering to optimize treatment of pain. In all these methods, the neural structure being stimulated was cylindrical (nerve or spinal cord) and the goal was to selectively activate a sector within the cross-section of the cylindrical or roughly cylindrical neural structure.

For stimulation of a neural surface, the first use of current steering was in retinal prosthetics. Instead of increasing the number of electrodes on the 2D stimulating array, activating adjacent electrodes concurrently allowed movement of the central activation area from directly underneath an electrode to the space between the activated electrodes. Thus, current steering allowed the movement of the centroid of stimulation to any location under the electrode array. Likewise, altering the magnitude of stimulation either increased or decreased the amount of tissue activated (e.g. diameter of activation).

Scientific papers using current steering for brain stimulation are exclusively concerned with deep brain stimulation. They use the methods to selectively activate deep brain structures (e.g. globus palidus, sub-thalamic nucleus) for treatment of Parkinson's and Essential Tremor. The goal was to target these brain structures while minimizing stimulation of undesirable areas (internal capsule) that have negative effects.

U.S. Pat. No. 5,895,416 to Barreras Sr. et al. discloses a Method and apparatus for controlling and steering an electric field. U.S. Pat. No. 6,909,917 to Woods et al. discloses an Implantable generator having current steering means. U.S. Pat. No. 9,782,593 Parramon et al. discloses implantable stimulator device with Fractionalized stimulation pulses. U.S. Pat. No. 7,890,182 to Parranon et al. discloses current steering for an implantable stimulator device involving fractionalized stimulation pulses. US published application 20160206883 to Bronzin et al., discloses a system and method for current steering neurostimulation.

However, the above patents and published applications seem to concentrate on how to perform multichannel current steering with just one stimulation device (i.e. they interlace across channels—fractionalization).

To the best knowledge of the inventors, as of the date of filing the present application there is no published material disclosing the use of current steering methods to target cortical tissues that are irregularly folded and highly convoluted neural tissue. Furthermore, while most publications in the field use current steering by positioning the stimulating leads or electrode arrays in contact with the neural tissue being stimulated (such as, for example the spinal cord or retina), the present application is the first to disclose an intra-calvarial implant performing current steering through the calvarial bone (or the inner table of the calvarial bone) with an electrode array that is not in contact with the cortical target regions to be stimulated. Moreover, the present invention discloses the use of simulation methods to determine before implantation of an implant the approximate current density maps. Further yet, the present invention is the first to implement current steering methods in combination with in-situ sensing of cortical electrical signals to detect dynamic time dependent changes in neural network anatomical location, and for performing real time or near real time tracking of the position of a dynamically shifting neural stimulation target by analyzing the frequency content of the recorded cortical signals and using current steering methods to deliver stimulating currents fitted to the detected position of the stimulation target.

International Published application WO/2019/239367 discloses a virtual user interface. International published application WO/2018/09715 discloses methods, devices and systems for enhancing intelligence. International Published application WO/2019/130248 discloses intra-calvarial implants and systems and methods for their implantation and use. International Published application WO/2020/161555 discloses intra-calvarial implants and systems and methods for their implantation and use. All the above international published applications are incorporated herein by reference in their entirety for all purposes.

SUMMARY OF THE INVENTION

The present application discloses implants for performing controlled spatio-temporal stimulation and/or inhibition of selected regions (or volumes) of the mammalian cortex (including the human cortex) and to sense cortical electrical signals.

An aspect of some embodiments is that the implants include a 2D array of electrodes including a plurality of current passing (stimulating and or inhibiting) electrodes and a plurality of sensing/recording electrodes.

An aspect of some embodiments of the implants is using current steering by controlling the application of various different stimulation parameters to different stimulating electrodes, including current-controlled and voltage-controlled stimulation waveforms.

In some embodiments, the implants are implanted within a suitable recess formed in the calvarial bone of a mammalian skull. The recess may pass through the outer table of the bone and through some or all of the cancellous bone without fully penetrating or breaching the inner table of the calvarial bone. In some embodiments, some of the inner table bone material may be removed but without breaching the inner table.

In some embodiments, the implants are implanted sub-dermally between the outer surface of the calvarial bone and the scalp.

In some embodiments, the ICIs of the present application may be operated as a closed loop BCI system capable of tracking fast and/or slow anatomical shifts of regions of intrinsic neuronal networks (such as, for example, the DMN, and or DAN networks to track or follow progressing cortical network activity waves as they occur in the cortex and to adapt the stimulation (activation and/or deactivation) of network anatomical regions based on detecting changes in the frequency content of electrical signals sensed by sensing/recording electrodes of the ICI.

Another aspect of the ICIs disclosed herein is their ability to generate non-circular and/or non-oval current density profiles within the stimulated cortical regions to better match the shape of the stimulating currents to the anatomical shape of the cortical regions that are stimulated (activated or deactivated).

There is therefore provided, in accordance with some embodiments of the present application, a system for tracking a cortical region to be stimulated in a patient, the system includes, at least one implantable device configured to be implanted in the head of the patient. the implantable device includes a plurality of recording electrodes for recording electrical signals from the cortical region, a plurality of stimulating electrodes for delivering stimulating electrical signals to at least part of the cortical region, a controller/processor for controlling the recording of the electrical signals from the cortical region and for controlling the delivering of the stimulating signals, a telemetry unit for wirelessly bi-directionally communicating with one or more external devices and a power source for energizing the implantable device. The system also includes one or more external devices disposed outside the body of the patient, the at least one external device includes at least one processor/controller configured for processing data and at least one telemetry unit for wirelessly bi-directionally communicating with the implantable device. The at least one implantable device and one or more external devices are in wireless communication there between and are programmed to perform the steps of, recording electrical cortical signals using the plurality of recording electrodes, processing the recorded electrical signals to compute spatial parameters representing the spatial distribution of the magnitude of at least one biomarker indicative of the cortical region to be stimulated, selecting from a look-up table (LUT) available in the system and including a plurality of simulated current spatial distribution data sets or datasets derived from the plurality of simulated current spatial distribution sets, a matched data set of stimulation parameters to be applied to the plurality of stimulating electrodes responsive to the spatial parameters representing the spatial distribution of the at least one biomarker computed in the step of processing, and applying to the cortical region stimulating electrical signals using the matched set of stimulation parameters selected in the step of selecting.

In accordance with some embodiments of the system, the at least one implantable device includes a plurality of implantable devices implanted in the head of the patient.

In accordance with some embodiments of the system, the one or more external devices are selected from a hand held computing device or a wearable computing device or a smartwatch, or a smartphone, or a personal computer, or a personal laptop, or a remote clinical workstation, or a remote server, or any combination thereof.

In accordance with some embodiments of the system, the one or more implantable devices each include a magnet, and the one or more external devices include one or more detachably attachable wirelessly energizing devices that is attachable to the scalp of the patient over the at least one implantable device. The one or more energizing devices are selected from, an energizing pod including a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod, or an energizing pod including a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a permanent magnet attached to the housing or disposed within the housing of the energizing pod, or an energizing pod including a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod, the inductance coil connected to the power transmitter of the pod is also electrically connected to the telemetry unit and is operable as an antenna of the telemetry unit, or an energizing pod including a housing, an induction coil electromagnetically couplable to a second induction coil disposed within or on the at least one implantable device for inductively providing electrical energy to the at least one implantable device, a power transmitter electrically connected to the induction coil of the energizing pod for controllably providing electrical alternating current to the inductance coil, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod.

In accordance with some embodiments of the system, the implantable device is programmed to perform the step of recording and the step of applying and the at least one external device is programmed to perform the steps of processing and selecting.

In accordance with some embodiments of the system, the system includes at least one remote server and the steps of processing and selecting are performed by cloud processing on the remote server or on the remote clinical workstation.

In accordance with some embodiments of the system, the stimulating electrical signals are selected from, exciting stimulating electrical signals or inhibiting electrical signals, or a combination of exciting and inhibiting signals.

In accordance with some embodiments of the system, the at least one implantable device is, an intra-calvarially implantable device adapted to be implanted within the calvarial bone of the skull of the patient, or an implantable device adapted to be implanted between a calvarial bone and a scalp of the patient.

In accordance with some embodiments of the system, the at least one biomarker is selected from the following list: a time resolved phase amplitude coupling of gamma and beta frequency bands [tPAC]γβ, or a normalized alpha-theta power difference ($\Delta P_{\alpha,\theta}$), a normalized alpha-theta power ratio ($P_{R\alpha,\theta}$), or a relative gamma power with respect to the total power ($P_{REL}\gamma$), a relative beta power with respect to the total power ($P_{REL}\beta$), or a normalized beta-gamma power difference ($\Delta P_{\beta,\gamma}$), or a normalized beta-gamma relative power ($P_{REL\beta\gamma}$), or a normalized beta-gamma power ratio ($P_{R\beta,\gamma}$), or a peak frequency of a spectral analysis, or peak frequency power in a specific frequency band, or phase coupling, or correlation measurements, or frequency band variance, or frequency band power, or ripples, or fast ripples.

In accordance with some embodiments of the system, the plurality of recording electrodes are selected from the following list: a plurality of identically shaped recording electrodes positioned such that their recording surfaces are disposed on the bottom surface of the implantable device and facing the cortical region, or a plurality of identically shaped recording electrodes positioned such that their recording surfaces are disposed on the bottom surface of the implantable device and facing the cortical region and the recording electrodes are symmetrically disposed with respect to the center point of the bottom of the implantable device, or a plurality of identically shaped recording electrodes positioned such that their recording surfaces are disposed on the bottom surface of the implantable device and facing the cortical region and the recording electrodes are non-symmetrically disposed with respect to the center point of the bottom of the implantable device.

In accordance with some embodiments of the system, the one or more implantable devices also includes one or more auxiliary electrodes selected from the following list one or more reference electrodes, or one or more current return electrodes, or one or more stimulating electrodes, or one or more reference electrodes disposed on one or more attachment tabs of the implantable device, or one or more reference electrodes disposed on a laterally extending member attached to or laterally extending from the implantable device, or one or more current return electrodes disposed on one or more attachment tabs of the implantable device, or one or more current return electrodes disposed on a laterally extending member attached to or laterally extending from the implantable device, or one or more additional stimulating electrodes disposed on one or more attachment tabs of the implantable device, or one or more additional stimulating electrodes disposed on a laterally extending member attached to or laterally extending from the implantable device, or any combinations thereof.

In accordance with some embodiments of the system, the step of selecting includes the steps of, computing the coordinates of the centroid of biomarker peak magnitude in a Cartesian x,y coordinate system within a first plane parallel to the bottom surface of the implanted device from the values of the biomarker computed for each electrode recording electrode, computing for each parameter set of the LUT the coordinates of the peak current density in a second plane parallel to the first plane and disposed within the cortical region to be stimulated, to obtain a set of computed values of coordinates of peak current densities, computing the distance between x-y coordinates of the centroid and each of the x-y coordinates to obtain a set of distance values, selecting from the set of computed distances the set of stimulation parameters having the shortest distance of the set of distance values, and if there are two or more shortest distance values having the same value, randomly or pseudo-randomly choosing a single set of stimulation parameters from the set of two or more equal shortest distance values.

In accordance with some embodiments of the system, the system includes at least one external device capable of providing EMA data to the system and the step of applying may be prevented or enabled responsive to the EMA data provided to the system.

In accordance with some embodiments of the system, the system includes at least one external device capable of providing heart rate variability (HRV) data to the system, and the step of applying may be prevented or enabled responsive to the HRV data provided to the system.

In accordance with some embodiments of the system, the step of processing includes processing the electrical signals recorded by one or more of the recording electrodes, computing from the electrical signals the value of a biomarker indicative of the mood state of the patient, and the step of applying may be prevented or enabled responsive to the computed value of the biomarker data.

There is also provided, in accordance with the methods of the present application, a method for detecting and tracking in a cortex of a patient the present anatomical position of a cortical neural network to be stimulated by an implantable device. The method includes the steps of: recording electrical cortical signals from a cortical region of the patient using a plurality of recording electrodes, processing the recorded electrical signals to compute spatial parameters representing the spatial distribution of at least one biomarker indicative of the cortical neural network that needs to be stimulated, selecting from an available plurality of simulated current spatial distribution data or data sets derived from the plurality of simulated current spatial distribution data sets, a matched set of stimulation parameters to be applied to the cortex responsive to the spatial parameters representing the spatial distribution of the at least one biomarker computed in the step of processing, and applying to the cortex stimulating electrical signals using the matched set of stimulation parameters selected in the step of selecting.

In accordance with some embodiments of the method, the step of applying is performed by one or more implantable devices implanted within a calvarial bone of the patient or between the calvarial bone and a scalp of the patient and the one or more implantable devices have a plurality of stimulating electrodes for stimulating the cortex of the patient.

In accordance with some embodiments of the method, the step of recording includes the steps of conditioning and amplifying the cortical signals prior to the step of processing.

In accordance with some embodiments of the method, the method includes the step of wirelessly transmitting the signal recorded in the step of recording to at least one computing device disposed outside the body of the patient, and one or more of the steps of processing and selecting is performed by the at list one computing device.

In accordance with some embodiments of the method, the method also includes the step of wirelessly transmitting the matched set of stimulation parameters selected in the step of selecting to the one or more implantable devices for controlling the application of cortical stimulation by a plurality of stimulating electrodes included in the one or more implantable devices, using the matched set of stimulation parameters.

In accordance with some embodiments of the method, the step of selecting includes the steps of, computing the coordinates of the centroid of biomarker in a Cartesian x,y coordinate system within a first plane passing through the bottom surface of the implanted device from the values of the biomarker computed for each electrode recording electrode, computing for each parameter set of the LUT the coordinates of the peak current density in a second plane parallel to the first plane and disposed within the cortical region to be stimulated, to obtain a set of computed values of coordinates of peak current densities, computing the distance between the x,y coordinates of the centroid and each of the x-y coordinates to obtain a set of distance values, selecting from the set of computed distances the set of stimulation parameters having the shortest distance of the set of distance values, and if there are two or more shortest distance values having the same value, randomly or pseudo-randomly choosing a single set of stimulation parameters from the set of two or more equal shortest distance values.

In accordance with some embodiments of the method, the method includes the step of receiving EMA data from a device outside the body of the patient and the step of applying may be prevented or enabled responsive to the EMA data.

In accordance with some embodiments of the method, the system includes the step of receiving heart rate variability (HRV) data, and the step of applying may be prevented or enabled responsive to the HRV data.

In accordance with some embodiments of the method, the step of processing includes processing the electrical signals recorded from the cortex in the step of recording and computing from the electrical signals the value of one or more biomarkers indicative of the mood state of the patient, the step of applying may be prevented or enabled responsive to the computed value of the biomarker data.

In accordance with some embodiments of the methods and systems of the present application, the one or more biomarkers are selected from the list consisting of: a time resolved phase amplitude coupling of the gamma and beta frequency bands [tPAC]$\gamma\beta$, or a normalized alpha-theta power difference ($\Delta P_{\alpha,\theta}$), or a normalized alpha-theta power ratio ($P_{R\alpha,\theta}$), or a relative gamma power with respect to the total power ($P_{REL}\gamma$), or a relative beta power with respect to the total power ($P_{REL}\beta$), or a normalized beta-gamma power difference ($\Delta P_{\beta,\gamma}$), or a normalized beta-gamma relative power ($P_{REL\beta,\gamma}$), or a normalized beta-gamma power ratio ($P_{R\beta,\gamma}$), or peak frequency of a spectral analysis, or peak frequency power in a specific frequency band, or phase coupling, or correlation measurements, or frequency band variance, or frequency band power, or ripples, or fast ripples.

In accordance with some embodiments of the method and systems of the present application, the patient is a patient having a disorder or condition selected from the following list: a mood disorder, or post traumatic syndrome (PTSD), or bipolar disorder, or attention deficit disorder (ADD), or attention deficit hyperactivity disorder (ADHD), or chronic pain, or addiction, or obesity, or a neurodegenerative disorder, or a dementia, or Alzheimer' disease, or an age related cognitive decline, or traumatic brain injury (TBI), or any combination thereof.

There is also provided in accordance with an embodiments of the energizing pods of the present application a wirelessly energizing pod, usable for energizing an implantable device, the implantable device is configured to be implanted within the calvarial bone of a patient or between the calvarial bone and a scalp of the patient. The implantable device includes a permanent magnet disposed on or therein, the pod includes: a housing, an induction coil disposed within or on the housing, the induction coil is electromagnetically couplable to a second induction coil disposed within or on the implantable device for inductively providing electrical energy to the implantable device. The pod also includes a power transmitter electrically connected to the induction coil of the pod for providing alternating or pulsed electrical current to the inductance coil of the pod. The pod also includes a telemetry unit for wirelessly bi-directionally communicating data and/or commands and/or status signals between the pod and at least one external device disposed outside the body of the patient. The pod also includes a sensor disposed within or on the housing for detecting attachment of the pod to the scalp of the patient over the implantable device. The pod also includes a memory unit for storing and retrieving data. The pod also includes a processor/controller connected to the sensor, the telemetry unit, the memory unit and the power transmitter for controlling the operation thereof. The pod also includes a power source for providing electrical energy to the components of the pod, and a permanent magnet attached to the housing or disposed within the housing of the pod for attracting the pod towards the permanent magnet of the implantable device.

In some embodiments of the pod, the sensor is selected from the following list: a passive sensor, or an active sensor, or a magnetic sensor, or an electrical contact sensor, or a capacitive contact sensor, or a mechanical contact sensor, or an electrical sensor, or any non-mutually exclusive combinations thereof.

In some embodiments of the pod, the inductance coil connected to the power transmitter of the pod is also electrically connected to the telemetry unit and is operable as an antenna of the telemetry unit.

In some embodiments of the pod, the power source is selected from the following list: a primary battery, or a rechargeable battery, or a supercapacitor, or a primary electrochemical cell or a rechargeable electrochemical cell.

In some embodiments of the pod, the power source is a rechargeable power source, and the pod also includes electrical circuitry selected from the following list: circuitry for allowing wireless charging of the rechargeable power source by a wireless charging station, or circuitry for allowing wired charging of the rechargeable power source through a charging cable connectable to the pod or through docking pins of a charging station.

In some embodiments of the pod, the frequency of the alternating or pulsed electrical current provided by the power transmitter is different than the frequency of the signals transmitted by the telemetry unit.

In some embodiments of the pod, the energizing pod is programmed to wirelessly bi-directionally relay data, and/or status signals, and/or control signals between the implant and at least one external device disposed outside the body of the patient.

Finally, in some embodiments of the pod, the at least one external device is selected from the following list: a hand held computing device, or a wearable computing device, or a smartwatch, or a smartphone, or a personal computer, or a personal laptop, or a remote workstation, or a remote server or any combination thereof.

BRIEF DESCRIPTION OF THE SEVERAL VIEWS OF THE DRAWINGS

Some embodiments of the invention are herein described, by way of example only, with reference to the accompanying drawings, in which like components are designated by like reference numerals. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 10, 11 and 12 are schematic two dimensional diagrams illustrating simulations of current steering capabilities of the electrode configuration of the implant of FIGS. 1-5;

FIG. 19 is a schematic diagram illustrating the ability of the implants of the present application to stimulate or inhibit cortical neuronal activity in selected specific anatomical regions along the cortex underlying the implant by using current steering of the implant of FIGS. 1-5;

DETAILED DESCRIPTION OF SPECIFIC EMBODIMENTS OF THE INVENTION

Figure 1:
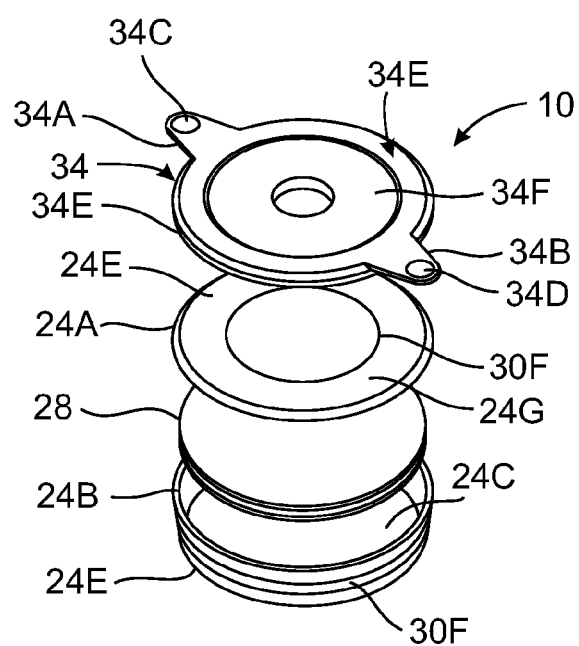
FIG. 1 is a schematic isometric exploded view of an implant, in accordance with an embodiment of the implants of the present application.

Abbreviations:

The following abbreviations are used throughout the specification and the claims of the present application:

| Abbreviation | Means |
| --- | --- |
| µV | microvolt |
| ASIC | Application-specific integrated circuit |
| BOLD | Blood- oxygen-level dependent |
| CT | Computerized tomography |
| CVD | Chemical vapor deposition |
| cm | centimeter |
| DCES | Direct cortical electrical stimulation |
| ECM | Electronic circuitry module |
| Ecog | Electrocorticography |
| EEG | Electroencephalography |
| EMA | Ecological momentary mood assessment |
| FI | Frequency interference |
| fMRI | Functional magnetic resonance imaging |
| ICE | Intra-calvarial Electrode |
| ICEA | Intra-calvarial electrode assembly |
| ICI | Intra-calvarial Implant |
| mm | Millimeter |
| MRI | Magnetic resonance imaging |
| mV | Millivolt |

| Abbreviation | Means |
| --- | --- |
| mA | Milliampere |
| ms | millisecond |
| SNR | Signal to Noise Ratio |
| TES | Trans-cranial electrical stimulation |
| TFIS | Trans-cranial frequency interference stimulation |
| TMS | Transcranial Magnetic Stimulation |
| 2D | Two dimensional |
| 3D | Three dimensional |
| DMN | Default mode network |
| DAN | Dorsal attention network |

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as an ASIC (or "chip") or a circuit. As software, selected tasks according to embodiments of the invention could be implemented as a plurality of firmware or software instructions being executed by a gate array, processor, or computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disc and/or removable media, for storing instructions and/or data. Optionally, a network connection is provided as well. A display and/or a button, touchscreen, keyboard or mouse are optionally provided as well.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. It is expected that during the life of a patent maturing from this application many relevant types of electrodes and electrode arrays will be developed and the scope of the terms "electrode" and "electrode array" are intended to include all such new technologies a priori. As used herein the term "about" refers to ±10%. The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application and claims, the term "plurality" means "two or more".

Throughout this application and claims, the terms "sensing electrode" and "recording electrode" and "sensing/recording electrode" and their plural forms are interchangeably used. Whenever used herein it implies that a "sensing electrode" may be used for sensing and also for recording the sensed electrical signals, and that a "recording electrode" senses and records electrical signals. The term "sensing/recording electrode" and its plural forms means that the electrode(s) may be used for sensing signals or for sensing and recording the sensed signals.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The present application, discloses inter alia, intra-calvarial electrodes, intra-calvarial electrode arrays and implants that are entirely or at least partially implanted within the calvarial bone of the skull of a mammal (such as, for example a human patient, a normal person, or other mammals). The present application also discloses implants that are implanted sub-dermally between the outer surface of the calvarial bone and the scalp.

Also disclosed are methods of implanting such implants, sub-dermally or within the calvarial bone (or at least partially within the calvarial bone, methods for using such implants for sensing cortical electrical activity and methods of stimulating various different cortical regions, by using stimulating electrodes of the implants.

It is noted that the terms "calvarial bone", "calvarial bones" and "Calvaria" and their conjugate and plural forms are interchangeably used throughout the specification and the claims of the present application to include one or more of the following bones or parts of the following bones: the frontal bone, the left and right parietal bones, the occipital bone, the non-squamous parts of the left and right temporal bones, and the occipital bone. The terms "calvarial bone" and its plural and conjugate forms may also mean any combination of two or more calvarial bones or parts of bones selected from the above list and fused together. It is however noted that the term "calvarial bone" and its conjugate and plural forms, as used in the specification and the claims also includes any bone of the skull in which the ICIs of the present application may be implanted.

The terms "stimulating electrode" "current passing electrode" in their single and plural forms the are interchangeably used throughout the present application to mean electrodes that are used to pass currents through cortical regions underlying the implants. Such currents may vary in polarity, amplitude and pulse shape, may be cathodic and/or anodic currents, and may be directly current-controlled or indirectly voltage-controlled.

The term "auxiliary electrode" and its plural forms is used to refer to a reference electrode (used in conjunction with sensing/recording electrodes) and/or to a current passing electrode, through which currents are sourced or sinked. Such an auxiliary electrode may be a current source or a current sink or both a current source and a current sink.

The electrical signals sensed and recorded in this way would be somewhat similar to electrocorticography (Ecog) in which electrodes are placed on the surface of the brain. Ecog signals have been shown to have substantial advantages in SNR in that they can detect focal cortical changes and record higher frequencies than typical EEG recording techniques (such as, for example, gamma rhythms). Numerous publications have shown the information value of Ecog signals for brain computer interfaces and for identifying highly resolved cortical dynamics related to cognition (motor, language, attention, memory, vision, etc.). The disclosed implants, may be able to sense/record a similar level of signal quality without the risk of intracranial implantation risks. Thus, in addition to the benefits to the patient, implants and the systems, and systems including them and the methods for their implantation and use would not require the patient to be admitted to a hospital for observation since the intracranial complication risks are absent. An outpatient procedure with risks more comparable to a tattoo would more likely be adopted by a larger clinical and non-clinical population.

Taken together, the implants and implant systems using them enable high level access to neural interfacing without the attendant risks of an intracranial penetration, making the implants suitable for more widespread application due to the reduced associated health risk combined with easy and cost effective implantation.

Beyond the advantages of anatomic location of the implants and systems, the circuitry of the system could also be configured or programmed to perform both recording and stimulation concurrently or intermittently, to synergize the advantages of both modalities. Closed loop cortical stimulation has been shown to substantially improve the intended functional and physiologic effect of stimulation. Using various physiologic biomarkers taken from cortex can better inform the amplitude, timing, and stimulation regime. Such markers include, time series measures (peak and trough of select frequency rhythms) frequency band amplitudes (e.g. delta, theta, mu, alpha, beta, and gamma), connectivity measures (correlation, mutual information, etc.), cross frequency interactions (e.g. phase amplitude coupling). All these signals could be used to optimize the timing and magnitude of stimulation. As an example, stimulation of memory-associated areas of brain (e.g. dorsal lateral prefrontal cortex) may better improve the subject's memory by timing the stimulation with specific phases of a theta rhythm (3-5 Hz). Another example would be that the magnitude or amplitude of stimulation of motor cortex for the treatment of Parkinson patients could be titrated to minimize beta-gamma phase amplitude coupling.

Furthermore, the implants of the present application may be constructed such as to have electrode configurations that may improve ICI performance by electrically directing (steering) the stimulating currents in such a way as to achieve efficient focal electrical stimulation or inhibition of cortical tissues underlying the implant to significantly improve and refine the anatomical resolution of cortical target area stimulation by using such current steering methods.

Furthermore, as the disclosed 2D current steering electrode array configurations allow stimulation/inhibition of quite small and well defined volumes of cortical tissue, the implants may be able to reduce undesired stimulation/inhibition of cortical regions adjacent to the targeted tissue.

Moreover, as the current steering methods disclosed herein below allow sub-millisecond temporal resolution of stimulation (and/or inhibition), while the sensing electrodes of the implants allow following the electrical cortical activities in real time or very close to real time, closed loop BCI operation of the implant may enable responding to slow anatomical shifting of the relevant cortical areas to be stimulated or inhibited by analyzing the sensed signals to determine the frequency content of the sensed cortical signals at specific EEG frequency bands which may be correlated to neural network shifting. If the implant system detects anatomical shifting of the relevant neural network activity, the system may be able to compensate for the anatomic location shift by using the current steering capability to redirect the stimulation or inhibition currents to the shifted target regions. One advantage of this "dynamic network tracking" capability is to avoid stimulation or inhibition of cortical regions which are no longer relevant or even counterproductive to achieving the required therapeutic effect.

Another advantage of the above described "network tracking" is that less electrical power and lower currents may be required for achieving a desired effective stimulation (in normal persons in which the implant is being used for enhancement of cognitive performance, such as working memory, attention focusing, etc.) or a desired therapeutic effect (in treated patients such as neurological patients, neuropsychiatric patients and psychiatric patients), resulting in more efficient therapy.

Figure 2:
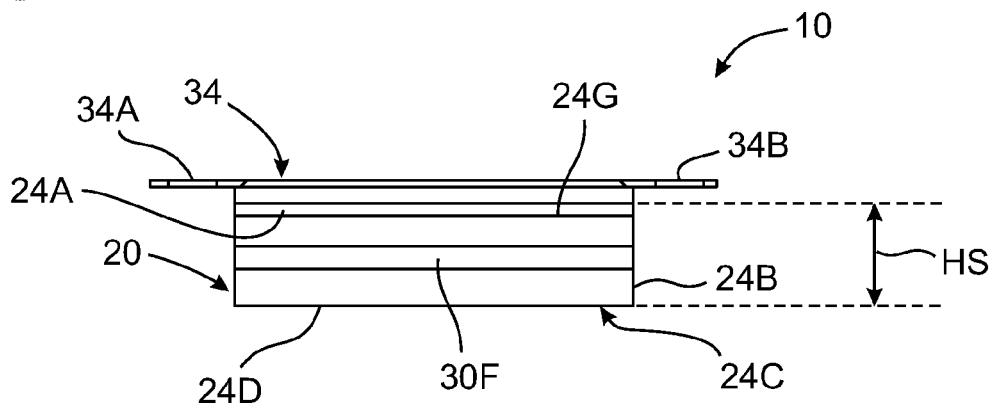
FIG. 2 is a schematic side view illustrating the implant of FIG. 1.
Figure 3:
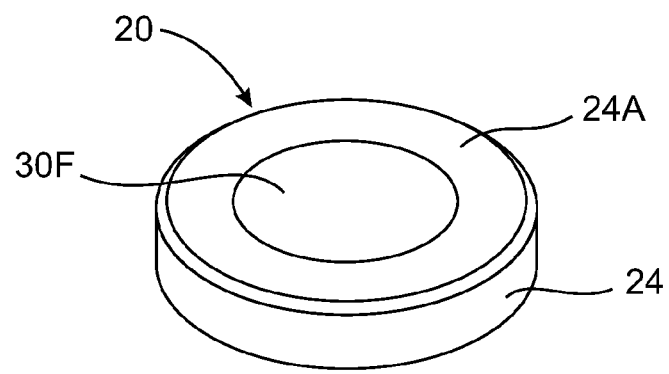
FIG. 3 is a schematic isometric view of part of the implant of FIG. 2.
Figure 4:
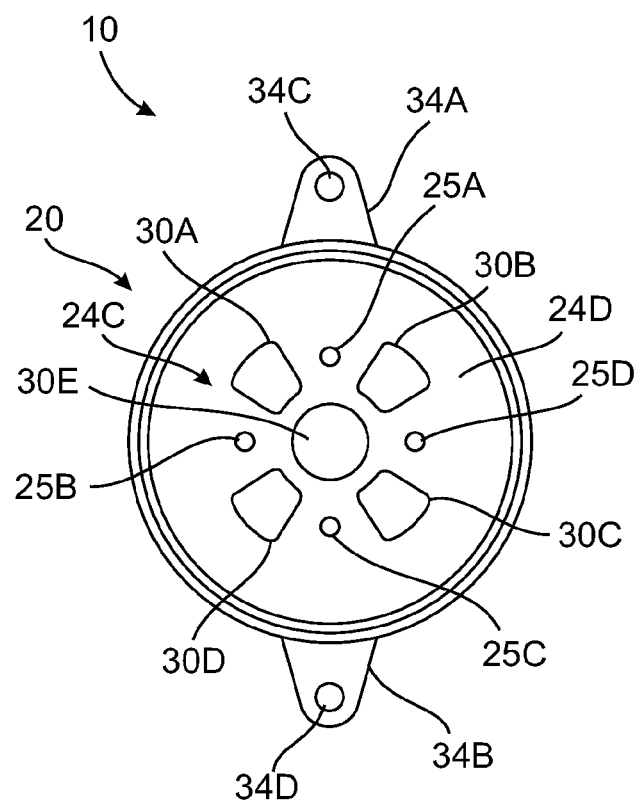
FIG. 4 is a schematic bottom view illustrating the implant of FIG. 1.
Figure 5:
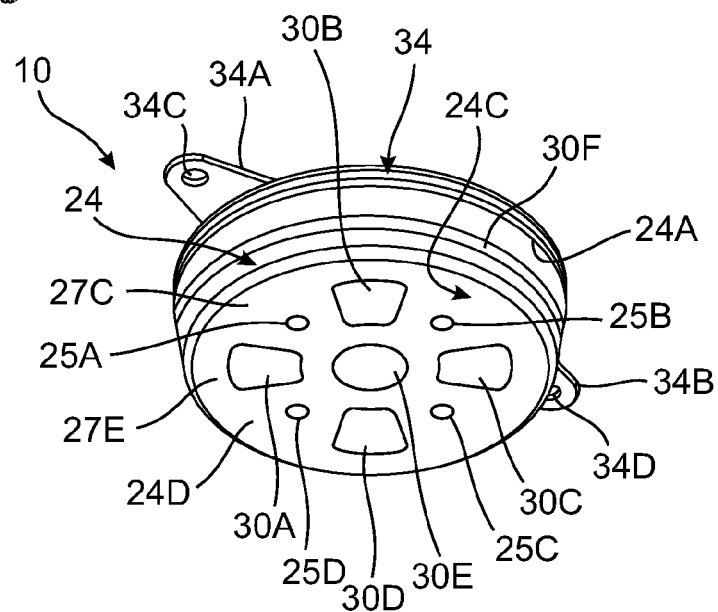
FIG. 5 is another schematic isometric view of the implant of FIG. 1.
Figure 6:
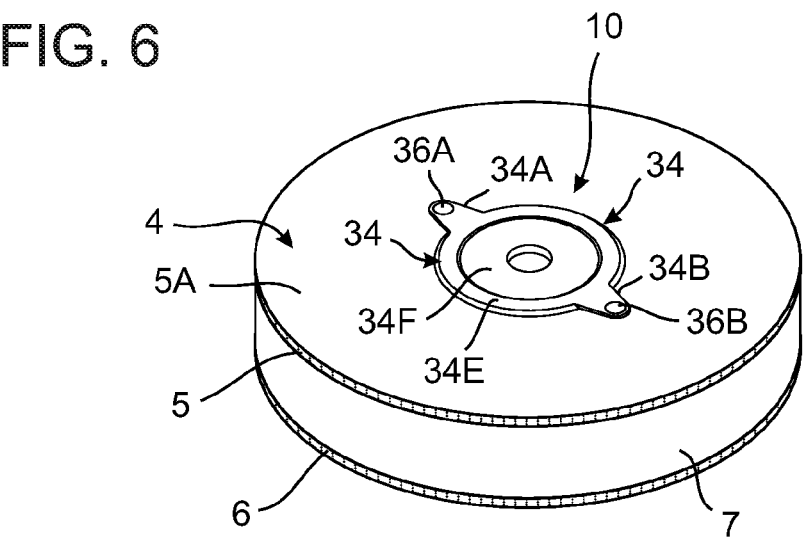
FIG. 6 is a schematic isometric view illustrating part of a calvarial bone with an implant therein, in accordance with some embodiments of the present application.

Reference is now made to FIGS. 1-6. FIG. 1 is a schematic isometric exploded view of an implant, in accordance with an embodiment of the implants of the present application. FIG. 2 is a schematic side view illustrating the implant of FIG. 1. FIG. 3 is a schematic isometric view of part of the implant of FIG. 2. FIG. 4 is a schematic bottom view illustrating the implant of FIG. 1. FIG. 5 is another schematic isometric view of the implant of FIG. 1. FIG. 6 is a schematic isometric view illustrating part of a calvarial bone with an implant therein, in accordance with some embodiments of the present application.

The intra-calvarial implant 10 may include a housing 20 and a shimming member 34 separate from the housing 20. The housing 20 may comprise a sealed compartment 24. The sealed compartment 24 may include a top part 24A, a bottom part 24C and a side wall 24B extending between the top part 24A and the bottom part 24C.

The top part 24A of the sealed compartment 24 may be implemented as a circular lid that may be sealingly attached to or sealingly screwed into the side wall 24B to form the sealed compartment 24. The sealed compartment 24 when sealed by the top part 24A may have a height HS. The ICI 10 may also include an electronic circuitry module (ECM) 28. After assembling of the ICI 10, the ECM 28 is sealingly enclosed within the sealed compartment 24. In accordance with some embodiments of the ICI 10, the housing 20 or parts thereof may be made from a suitable ceramic such as, alumina or sapphire. In some embodiments, the housing 20 may be coated or covered with a thin layer, or combination of layers, of moisture barriers, such as silicon carbide, metal oxide ceramic film, or liquid crystal polymer. If the housing 20 or parts thereof are made from electrically-conductive materials, the housing surface may be coated with an electrically isolating (electrically non-conducting) biocompatible polymer, such as, for example, Parylene®, but other suitable polymers may also be used. In other embodiments the housing 20 or some parts thereof may be made from a biocompatible electrically non-conducting polymer based material such as, for example Parylene®, Kevlar®, polyetherketones (PEEK), Polyethylene (PE), polylactic acid (PLA), polyglycolic acid (PGA) copolymers of PLA, PGA, polysillanes or other suitable polymers.

In some embodiments of the ICIs, the sealed compartment 24 (or any other of the sealed compartments disclosed in the present application), may be made from an electrically conducting material (such as for example titanium). In some embodiments, parts of the sealed compartment may be coated or covered by a thin layer of electrically isolating biocompatible polymer, such as, for example, Parylene® in order to electrically isolate any of the electrodes from shorting through the metallic conducting material of the sealed compartment 24. However, in some such cases, the electrically conducting material (such as, titanium) may be independently grounded or held at ground potential. Such grounding may be particularly useful in ICIs during sensing because it may significantly increase the signal to noise ratio (SNR) during sensing and/or recording cortical signals and may prevent capacitive coupling from fluorescent lights as well as serve as a shield some of the sensing electrodes and/or the ECM components from other sources of electromagnetic radiation in the environment by functioning similar to a faraday cage.

In such embodiments, the electrically conducting metal of the sealed compartment may be electrically switchably and reversibly connected to ground by the ECM 28. In such embodiments, the ECM (such as, for example, the ECM 28) may electrically connect the electrically conducting part of the sealed compartment 24 to the ground during sensing/recording and may disconnect the electrically conducting part of the sealed compartment 24 from the ground during stimulating.

Additionally, in some embodiments of the ICIs, only certain selected parts of the external surface of an electrically conducting sealed compartment may be coated with insulating polymer, while other parts may be left without coating. Such non-coated parts may serve as ground.

The ICI 10 may also include four stimulating electrodes 30A, 30B, 30C and 30D, a reference electrode 30E and an auxiliary electrode 30F. The auxiliary electrode 30F may be implemented as a ring-like electrode disposed on or attached to the side-wall 24B of the sealed compartment 24 as illustrated in FIGS. 1-2). However, other suitable shapes and locations of the auxiliary electrode may also be used. For example, the auxiliary electrode 30F may be implemented as a circular or annular shaped electrode attached to or disposed on the outer surface 24G of the top part 24A of the sealed compartment 24. Additionally, the auxiliary electrode 30F may be implemented as a structure or combination of structures that extend away from the implant, for example, auxiliary electrodes may be integrated with tabs 34A and 34B. In some embodiments, multiple auxiliary electrodes may be connected to the same electrical potential. In some embodiments, one or more auxiliary electrodes may be switched on and off such that when used as a current return for stimulation, current is steered in their direction, relative to the stimulating electrodes. In some embodiments the auxiliary electrode may be embedded within the skull, over the skull, or combination of both.

It is noted that throughout the present application, the auxiliary electrode 30F may also be referred to as the "current return electrode" when used in a stimulating mode, as the current may leave the stimulating electrodes and return through the auxiliary electrode 30F. It is noted that the auxiliary electrode 30F may operate as a current sink electrode and/or as a current source electrode depending on the polarity of the voltage applied between any one of the stimulating electrodes 30A, 30B, 30C and 30D and the auxiliary electrode 30F. For example, if the auxiliary electrode 30F is grounded and held at a voltage of zero volts (0V) and a positive voltage (for example +5V) is applied to electrode 30A, current will nominally flow from electrode 30A into the auxiliary electrode 30F so the auxiliary electrode 30F operates as a current sink. If the auxiliary electrode 30F is grounded and held at a voltage of zero volts (0V) and a negative voltage (for example −5V) is applied to electrode 30C, current will nominally flow from the auxiliary electrode 30F into the electrode 30C, so the auxiliary electrode 30F operates as a current source.

In another example, if the auxiliary electrode 30F is grounded and held at a voltage of zero volts (0V) and a positive voltage (for example +5V) is applied to electrode 30A, while a negative voltage (for example −5V) is applied to electrode 30C, the auxiliary electrode 30F may operate as a current sink with respect to the electrode 30A and as a current source with respect to the electrode 30C. Therefore, the auxiliary electrode 30F may operate as a current sink or as a current source or as a simultaneous sink/source combination, depending on the particular specific voltages applied to any of the stimulating electrodes 30A, 30B, 30C and 30D relative to the voltage of the auxiliary electrode 30F.

The ICI 10 may also include a plurality of sensing/recording electrodes for sensing and/or recording electrical signals from the cortical tissue underlying the ICI 10. In the specific embodiment of the ICI 10 illustrated in FIGS. 1-5, there are four sensing/recording electrodes 25A, 25B, 25C and 25D. The reference electrode 30E may be used in conjunction with one or more of the sensing/recording electrodes 25A, 25B, 25C and 25D to perform differential cortical signal recording to reduce pickup of irrelevant spurious noise due to common mode rejection (CMR).

The electrodes 25A, 25B, 25C, 25D, 30A, 30B, 30C, 30D, 30E and 30F may be made of or may include a biocompatible electrically conducting material such as, for example platinum, a platinum/iridium alloy, graphene or any other suitable biocompatible electrically conducting material. Each of the electrodes 25A, 25B, 25C, 25D, 30A, 30B, 30C, 30D, 30E and 30F may be electrically connected to the ECM 28 by suitably electrically isolated electrical conducting members or electrode leads (which are not shown in any of FIGS. 1-5 for the sake of clarity of illustration), that may be, for example, electrically isolated electrically conducting wires. The wires may sealingly pass through suitable passages in the housing 20 (the passages are not shown in FIGS. 1-5 for the sake of clarity of illustration) the sealing of the passages prevents any moisture or bodily fluids from penetrating into the sealed compartment 24 after implantation.

The stimulating electrodes 30A, 30B, 30C and 30D, the sensing/recording electrodes 25A, 25B, 25C, 25D, and the reference electrode 30E may be attached to or recessed within the outer surface 24D of the bottom part 24C of the sealed compartment 24, as illustrated in FIGS. 4-5. In some embodiments, the electrodes 30A, 30B, 30C and 30D and 25A, 25B, 25C, 25D may be symmetrically arranged along the surface 24D as illustrated in FIGS. 4-5 (however, this is not obligatory and non-symmetrical electrode arrangements may also be used. In some embodiments, any of the electrodes 30A, 30B, 30C 30D, 30E, 30F and 25A, 25B, 25C, 25D may be disposed in suitable recesses (not shown) formed in suitable positions on the outer surface of the sealed compartment 24.

In accordance with some embodiments, some or all of the electrodes may also be deposited or coated on the appropriate surfaces of the housing 20 by methods such as, for example CVD, sputtering, ion beam deposition, spin coating or any other suitable method. Furthermore, the surface morphology and/or chemistry of electrode surfaces may be modified by etching or deposition to adjust electrode impedance and/or integration with surrounding tissue.

The reference electrode 30E may be a circularly shaped electrode attached to the outer surface 24D of the bottom part 24C of the sealed compartment 24 by a suitable adhesive (including braze or weld) or by being partially embedded within a suitable recess (not shown) formed in the surface 24D. It is noted, however that in some embodiments, the reference electrode 30E may be disposed in a different place on the surface of the sealed compartment 24. For example, in some embodiments the reference electrode 30E may be disposed on or attached to the outer surface 24G of the top part 24A of the sealed compartment 24. The circular shape of the electrode 30E is not obligatory and any other suitable electrode shape may also be used.

The surface area of the electrodes of the implants of the present application may be in the range of 0.3-100 $mm^2$, with typical values of the recording electrodes in the range of about 1-2 $mm^2$, typical values of the reference electrodes in the range of about 4-8 $mm^2$, typical values of the stimulating electrodes in the range of 5-20 $mm^2$, and typical values of auxiliary electrodes (such as, for example, the auxiliary electrode 30F in the range of 50-100 $mm^2$. However, some of the electrodes may have surface area values lower than 0.3 $mm^2$ or higher than 100 $mm^2$, depending, inter alia on the particular medical application and implant dimensions.

It will be appreciated that while the exemplary embodiment of the ICI 10 of FIGS. 1-5 has four stimulating/ recording electrodes 30A, 30B, 30C and 30D, this is by no means obligatory and some embodiments of the ICIs of the present application may typically include a number of stimulating and/or recording electrodes in the range of 2-30 electrodes, and in certain embodiments the number of electrodes may be even greater than 30. The factors determining the number of recording and/or stimulating electrodes may include, inter alia, the type and dimensions of the ICI, the degree of precision required during stimulation, the specific medical or clinical application, the intensity of the required stimulating currents, and other considerations.

Figure 7:
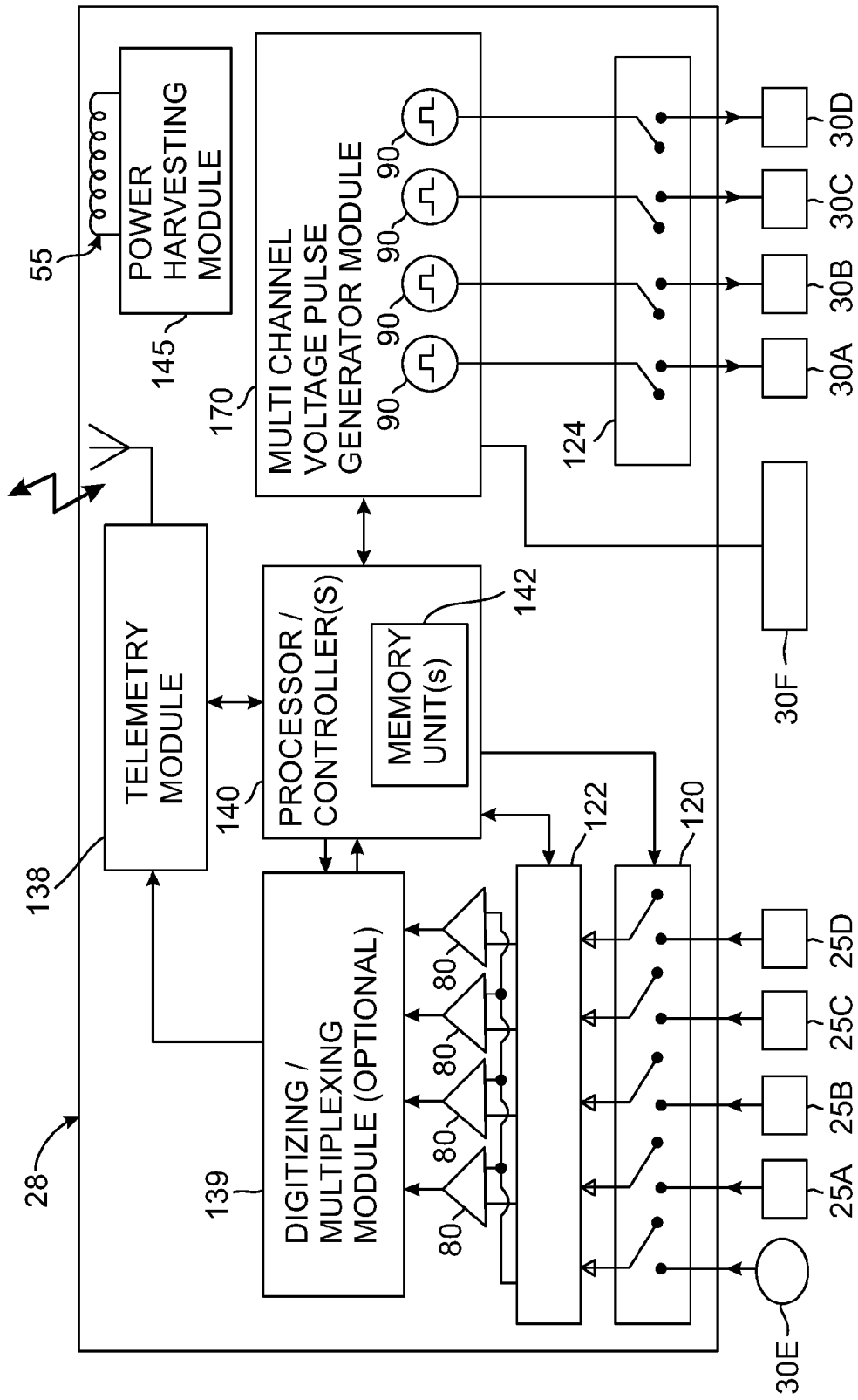
FIG. 7 is a schematic block diagram illustrating some of the components of an electronic circuitry module (ECM) usable in the implants of the present application, in accordance with some embodiments of the ECMs of the present application.
Figure 29:
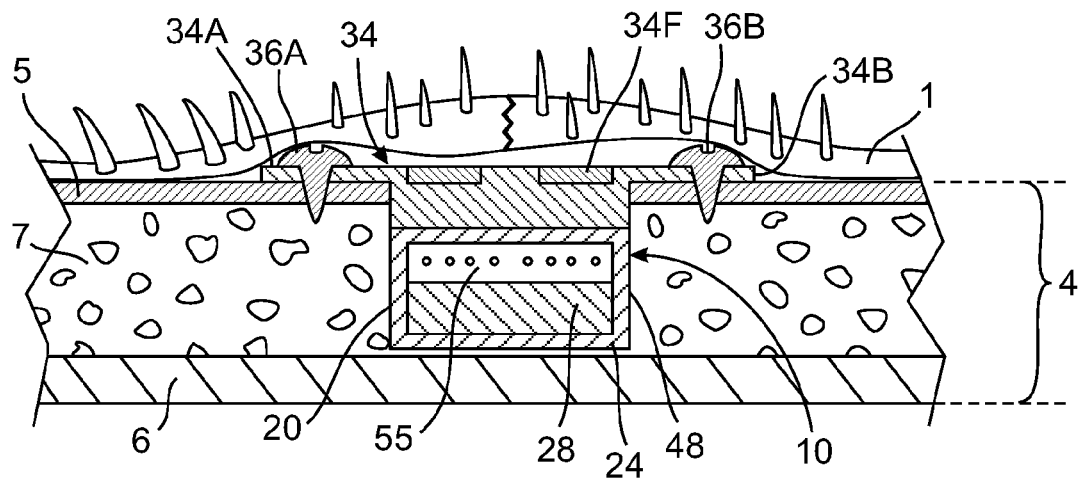
FIG. 29 is a schematic, part cross-sectional diagram schematically illustrating the implant of FIGS. 1-5 implanted within a calvarial bone.

In some embodiments, the ICI 10 may include a first induction coil 55 that is part of a power harvesting module 145 (not shown in detail in FIGS. 1-5, but see FIGS. 7 and 29). The power harvesting module 145 may include current conditioning circuitry (not shown in detail), such as, for example a current rectifying circuit that may be electrically coupled to the inductance coil 55 and to a, (optional) charge storage device (not shown in detail) for storing the electrical charge harvested by the power harvesting module 145. The current conditioning circuitry and the charge storage device (such as, for example, a capacitor, a super capacitor, a battery, a rechargeable electrochemical cell or any other suitable charge storage device) may be integrated into the ECM 28. In some embodiments, the induction coil 55 may be disposed within the sealed compartment 24 (see FIG. 29). It is noted that in such embodiments, the top part 24A of the ICI or implant is preferably made from an electrically non-conducting material, such as, for example, an electrically non-conducting polymer based material or a ceramic material such as, for example, alumina or zirconia based ceramics (alumina based ceramics may be transparent to radio frequencies). This may advantageously prevent shielding of the first inductance coil 55 from the varying magnetic fields provided by a second inductance coil (not shown) placed on the scalp.

Exemplary dimensions for an embodiment of the ICI 10 are as follows: HS=4.0 mm, the diameter of the sealed compartment is 21 mm, the thickness of the side walls 24B is about 0.5 mm. The thickness of the shimming member 34 is 1.5 mm and the diameter of the shimming member 34 is 21 mm (excluding the tabs 34A and 34B). However, the above dimensions are given by way of example only and may change depending, inter alia, on the specific clinical application, the size of the ECM 28, the required number of stimulating/recording electrodes and the thickness of the calvarial bone 4 at the site of implantation.

Returning to FIG. 1, the ICI 10 the shimming member 34. In some embodiments, the shimming member may include a flat annular member having two side tabs 34A and 34B. The tab 34A has a screw hole 34C passing there through, and the tab 34B has a screw hole 34D passing there through. The annular member 34E may be made from titanium of from any of the polymer based materials disclosed in detail hereinabove, or from a suitable ceramic material.

The shimming member 34 may also (optionally) include a magnet 34F attached to member 34E. In some embodiments, the magnet may be annular. In some embodiments the magnet may be affixed to or within the shimming member such that it can be removed and replaced. In embodiments in which the source of power for operation of the ICI 10 is a power harvesting module that includes an inductance coil which may receive energy from a second external inductance coil placed upon the scalp of the patient, the magnet 34F may assist in accurate placement of an external energizing device containing an inductance coil (not shown) that may also include a magnet therein. The two magnets may attract each other and enable secure and precise placement of the external energizing device on the scalp (for an example, see FIGS. 15-16 hereinafter). The surface of the shimming member 34 that faces the top part 24A after implantation may be a flat surface as illustrated in FIGS. 1-2. Alternatively, in some embodiments, the surface of the shimming member 34 that faces the top part 24A after implantation may have a shallow circular recess formed therein (not shown in FIGS. 1-2) and having a diameter that is equal to or very slightly larger than the diameter of the top part 24A of the sealed compartment 24. In such an embodiment (not shown), after the housing 20 is implanted within the calvarial bone, the shimming member may be attached to the housing 20 by pressing the shimming member 34 downwards towards the top part 24A to press-fit the top part 24A within the recess (not shown) formed in the shimming member.

In embodiments in which the bottom surface of the shimming member 34 is flat (as illustrated in FIG. 2, the shimming member 34 may be attached to the top part 24A during implantation by a small drop of biocompatible adhesive, alignment pins, or by one or more suitable small screws (the screws are not shown for the sake of clarity of illustration) that are passed through suitable holes in the shimming member 44 (not shown in FIGS. 1-2, for the sake of clarity of illustration) and are screwed into one or more respective threaded recesses formed in the top part 24A (the threaded recesses in the top part 24 are not shown in FIG. 2 are not shown for the sake of clarity of illustration).

It is noted that the thickness of the calvarial bone may vary widely, based on location in the skull, the patient's age and the patient's physical dimensions. The thickness of the calvarial bone 4 may be as little as 1 mm in the squamosal portion of the temporal bone to as thick as 2 centimeters for some parts of the frontal bone. The thickness of the inner table 6 and the outer table 5 of the calvarial bone may also vary in the range of 0.1-4.0 mm and the thickness of the layer of cancellous bone (diploe) 7 of the calvarial bone 4 may vary in the range of 0.1 mm-1.9 cm.

The thickness of the shimming member 34 may vary, and the surgeon implanting the ICI 10 may be supplied with a set of different shimming members each having a different thickness. This may be necessary due to the differences in the thickness of the calvarial bone in different patients and in different sites of the calvarial bone in the same patient. A more detailed description of the implantation methods is disclosed hereinafter. Therefore, the thickness of the available shimming members 34 may vary in the range of 1-10 mm, and the thickness of the shimming members 34 may typically vary in steps of about 0.5 mm. This may enable the surgeon to select a shimming member of a suitable thickness such that when the shimming member is attached to the top part 24A, the tabs 34A and 34B will be in contact with the outer surface 5A of the outer table 5 of the calvarial bone 4. However, the steps in the thickness of the shimming members may be in values smaller or larger than 0.5 mm if necessary.

During implantation of the ICI 10, the position of the top part 24A of the sealed compartment relative to the outer table 5 may significantly differ between different implantation sites and between different patients because of the natural variations of the thickness of the calvarial bone or parts thereof. The surgeon or physician may select a shimming member having the appropriate thickness such that after the attachment of the shimming member to the top part 24A of the sealed compartment 24, the tabs 34A and 34B of the annular member 34E are in contact with the exposed outer surface 5A of the outer table 5 (see FIG. 6 hereinafter) and may be properly attached to the outer table 5 using the screws 36A and 36B (see FIG. 6, hereinafter).

The method of implanting the ICI 10 in the calvarial bone 4 of a patient may be as follows with reference to FIG. 30: After determining the region of implantation, the patient may be brought into the operating room and induced under general anesthesia. Once the implantation site is identified in imaging space, the implantation location may be localized on the patient's head using a stereotactic navigation system. The implantation site may then be prepared and draped in standard surgical fashion. The skin of the scalp (not shown) may be infiltrated with a local anesthetic and a 1 cm incision may be made in the scalp. A small retractor may be placed in the incision and the surface of the skull is exposed. A cylindrical recess 48 having a diameter slightly larger than or equal to the diameter of the ICI 10 may be then drilled into the calvarial bone 4 using a suitable drill bit (not shown). The recess 48 may pass through the outer table 5, may extend through the entire cancellous bone layer 7 and may reach the outer surface 6B of the inner table 6. Alternatively, the recess 48 may penetrate only through part of the cancellous bone layer 7, without reaching the outer surface 6B of the inner table 6. The bone thickness at the site planned for implantation may be determined from the CT scan of the skull performed prior to implantation.

The surgeon may then insert the housing 20 into the recess 48 until the sealed compartment is seated within the recess 48. The surgeon may then measure the distance between the top surface of the upper part 24A and the outer surface 5A of the outer table 5 and may select a suitable shimming member 34 from an available selection of shimming members having different thicknesses to ensure that when the shimming member 34 is attached to the sealed compartment 24, the side tabs 34A and 34B will contact the outer surface 5A of the outer table 5 of the (exposed) part, of the calvarial bone 4. The surgeon may then attach the shimming member 34 to the top part 24A of the sealed compartment 24 by firmly press-fitting the shimming member 34 or by applying one or more small drops of a suitable biocompatible glue to the upper part of the top part 24A and pressing the shimming member 34 onto the top part 24, or by using suitable small screws (not shown) to attach the shimming member 34 to the top part 24A. The shimming member 34 may then be attached to the skull by screwing the screws 36A and 36B through the screw holes 34C and 34D, respectively, into the calvarial bone 4.

After the ICI 10 has been secured to the calvarial bone 4, the skin flaps of the incision made in the scalp (not shown) may be closed to allow the scalp to cover the implantation region and to allow the scalp incision to heal. A few days after implantation, the ICI 10 may become attached within the recess 48 by scar tissue that may further reduce or prevent undesirable movements or rotation of the ICI 10 within the recess 48.

Reference is now made to FIG. 6, which is a schematic isometric view illustrating part of the calvarial bone with the ICI of FIGS. 1-5 implanted therein, in accordance with some embodiments of the present application. In FIG. 6, the ICI 10 is illustrated as implanted within part of the calvarial bone 4 of a skull. The calvarial bone 4 includes an outer table 5, an inner table 6 and a layer of cancellous bone (Diploe) 7 disposed between the outer table 5 and the inner table 5. The outer table 5 has an outer surface 5A which is the surface of the skull. It is noted that the scalp overlying the calvarial bone is not shown in FIG. 11, for the sake of clarity of illustration. The shimming member 34 is shown as attached to the calvarial bone 4 by a pair of bone screws 36A and 36B that pass through the openings 34C of the tab 34A and 34D of the tab 34B, respectively.

Figure 8:
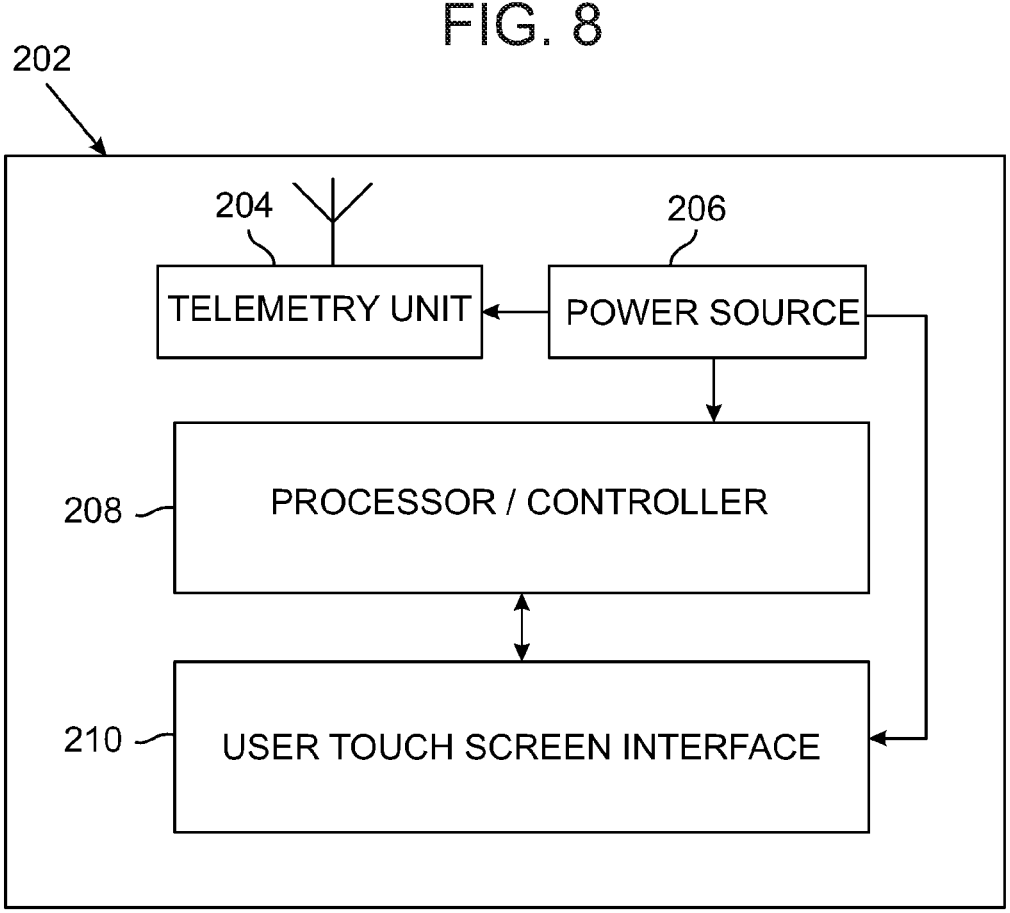
FIG. 8 is a schematic functional block diagram illustrating The components of an exemplary hand held or wearable or portable device usable with the implants of the present application.

Reference is now made to FIGS. 7-8. FIG. 7 is a schematic block diagram illustrating some of the components of an ECM usable in the implants of the present application, in accordance with some embodiments of the ECMs of the present application. FIG. 8 is a schematic functional block diagram illustrating the components of an exemplary hand held or wearable or portable device usable with the implants of the present application.

The ECM 28 may include at least one processor/controller(s) 140, a power harvesting module 145, a first electrode selecting module 120, a signal conditioning module 122, a digitizing/multiplexing module 139, a multichannel voltage pulse generator module 170 and a second electrode selecting module 124.

The power harvesting module 145 may include an induction coil 55 for receiving electromagnetic energy transmitted from an external energizing coil (not shown) that may be included in an external energizing device (such as for example, the hand held portable device of FIG. 8). It is noted that the construction and operation of such external energizing coils is well known in the art, is not the subject matter of the present application and is therefore not described in detail herein. For example, U.S. Pat. No. 6,246,911 to Seligman discloses the construction and use of inductance coils for energizing cochlear implants.

The sensing/recording electrodes 25A, 25B, 25C and 25D and the reference electrode 30E of the implant 10 are may be electrically and switchably connectable the first electrode selecting module 120 of the ECM 28. The first electrode selecting module 120 may be implemented as a solid state multi-channel switching device. The first switching module 122 is suitably coupled to the signal conditioning module 122. The first switching module 120 is suitably connected to the processor/controller (s) 140 that controls the switching operation of the first switching module 122 which may controllably connect or disconnect any selected electrodes from the signal conditioning module 122. The signal conditioning module 122 may include electronic circuitry suitable for performing various signal conditioning types on the electrical cortical signals fed from the sensing/recording electrodes 25A, 25B, 25C and 25D. The signal conditioning operations may include signal filtering, frequency band limiting, low pass filtering, or any other type of desired signal conditioning operations. The conditioned signals may be then fed into suitable channel amplifiers 80 for amplifying the conditioned signals performing differential recording against the reference signal fed from the reference electrode 30E. The conditioned amplified signals output from the amplifiers 80 may be (optionally) digitized by the (optional) digitizing/multiplexing module 139 to form digitized signals. The digitizing/multiplexing module 139 may be suitably coupled to the processor/controller(s) 140 for controlling the digitizing and/or multiplexing operations thereof. The digitized signals may be further filtered, averaged, decimated to a lower sampling rate, and/or compressed to reduce data throughput. The digitized signals may be fed into the telemetry module 138 for wirelessly transmitting to an external receiver (or transceiver) outside the body of the patient or mammal for further processing and/or storing/recording. Alternatively, in some embodiments, the conditioned/amplified analog signals output from the amplifiers 80 are not digitized and are fed to the Telemetry module 138 to be transmitted to the external receiver or transceiver (not shown).

The processor/controller(s) 140 may be operatively connected to the telemetry module 138 for controlling the operation thereof. The processor/controller(s) 240 may include integral memory unit(s) 142 or may additionally or alternatively be connected to one or more suitable data storage device (not shown). In some embodiments of the ECM 28, in which the processor/controller(s) has sufficient processing power, the digitized recorded signals may be sent directly to the processor/controller(s) 140 for further processing to detect cortical activity indicative of the need for cortical stimulation or cortical inhibition or stimulation of some cortical regions and inhibition of other cortical regions. For examples, such data processing methods and algorithms are disclosed in detail in published international application WO 2018/109715 and may be implemented herein for data analysis and processing by suitable programming of the processor/controller(s) 14.

Alternatively, in some embodiments of the ICI 10, in which the processor/controller(s) 140 do not possess sufficient processing power, the digitized signals or the analog signals are telemetrically transmitted to an external receiver (or transceiver) and are communicated (preferably wirelessly) to one or more processors disposed outside the body of the patient or person (such as, for example, a smartphone, a laptop, a workstation, a desktop, a hand held or wearable or mobile processing device) which may have sufficient processing power to perform the required signal analysis and data processing. Such more powerful processing devices (not shown in FIG. 7) may detect that the cortex requires stimulation/inhibition and may wirelessly transmit control signals to the telemetry module 138. Such control signals may be communicated to the processor/controller(s) 140 and may result in the processor/controller(s) 140 initiating cortical target stimulation and/or inhibition, as is disclosed in detail hereinafter.

The multi-channel voltage (or current) pulse generator module 170 of the ECM 28 is suitably connected to the processor/controller(s) 140 for controlling the operation thereof. The multi-channel voltage (or current) pulse generator module 170 may include four individually and selectively operable controllable variable voltage (or current) pulse generators 90 that are operatively connected to a second electrode selecting module 124. Each of the stimulating electrodes 30A, 30B, 30C and 30D is switchably electrically connectable to one of the four voltage (or current) pulse generators 90.

The auxiliary electrode 30F and any other auxiliary electrodes included in the device may be electrically connected to the multi-channel voltage (or current) pulse generator module 170. The auxiliary electrode 30F may be held at a voltage of zero volts (0V) and may be operating as a current sink or a current source or a current sink/source, depending on the polarity of the voltage applied to each of the stimulating electrodes 30A, 30B, 30C and 30D. It is noted that the voltage (or current) pulses generated by each one of the four voltage pulse generators 90 may be positive voltage (or current) pulses (referenced to the voltage of the auxiliary electrode 30F), or negative voltage (or current) pulses (referenced to the voltage of the auxiliary electrode 30F) and the pulse voltage (or current) may be controllably held at any (positive or negative or zero) voltage level within a given voltage range (for example, +10V to −10V).

For example, if the auxiliary electrode 30F is grounded at 0V (zero volts), a square voltage pulse of +5V may be applied to the stimulating electrode 30A, while a square voltage pulse of +2.5V may be applied to the stimulating electrode 30B, a square voltage pulse of −2.5V may be applied to the stimulating electrode 30B and a voltage of 0V may be applied to the stimulating electrode 30D. In another example, if the auxiliary electrode 30F is grounded at 0V (zero volts), a square voltage pulse of −5V may be applied to the stimulating electrode 30A, while a square voltage pulse of +8V may be applied to the stimulating electrode 30B, a square voltage pulse of +4.5V may be applied to the stimulating electrode 30B and a square voltage pulse of −4.5V may be applied to the stimulating electrode 30D.

The voltage differences between the auxiliary electrode 30F and each stimulating electrode (that has a voltage that is different than the voltage value applied to the auxiliary electrode 30F) may cause a current to flow between each selected pair of electrodes provided that there is a non-zero voltage difference between the two electrodes of the pair. Such currents will flow between electrodes and penetrate the tissues underlying the ICI 10.

In principle, any combination of voltage (or current) pulses with various different polarities and various different amplitudes may be applied to the stimulating electrodes 30A, 30B, 30C and 30D. Each different applied voltage combinations may result in a current flow having a specific three-dimensional (3D) shape and current density map.

It is noted that while the multi-channel voltage pulse generator module 170 (of FIG. 7) may be used to deliver voltage pulses to the stimulating electrodes 30A-30D, in some embodiments of the device 10, the multi-channel voltage pulse generator module 170 may be replaced by a multi-channel current pulse generator (not shown in FIG. 7). Such an embodiment having a multi-channel current pulse generator may actually operate more satisfactorily in situations where the stimulating electrode impedance may change over time after implantation of the ICI 10 due to changes in electrode surface properties and also due to changes in the impedance of the tissues underlying the stimulating electrodes. The use of constant current pulses by such a multi-channel current pulse generator may therefore be more effective, in long term implantation, for achieving long term stability of the desired current density distribution in the tissues underlying the stimulating electrodes 30A, 30B, 30C and 30D.

It is noted that while the stimulation waveforms described herein refer to pulsatile shapes, non-pulsatile shapes may be used to activate or inhibit neural activity. For example, sinusoids, exponentials, and Gaussian wavelets could be assembled to create stimulation patterns that provide advantages in activating or inhibiting specific cell types, minimizing power consumption, and minimizing undesirable current distributions on the electrode surface that may lead to electrode degradation.

Using a suitable simulating software, it is possible to use a simplified model including the electrical properties of the different tissues underlying the ICI 10. Such a model allows the current density maps which in turn allows 2D and 3D graphs illustrating contours of surfaces (in 2D simulated maps) or volumes (for 3D simulated maps) within which the current density is supra-threshold (i.e. where the simulated stimulating current density will be equal to or larger than the current density required to activate neuronal firing by causing neuronal membrane depolarization). Such maps visually and mathematically represent a "supra-threshold excitatory current "Beam" which may provide information about where in the cortical volume underlying the ICI 10 neuronal excitation and firing may occur.

Such mapping may also indicate, for flows of currents with the opposite polarity in which regions or volumes in 3D space, there will occur neuronal membrane hyperpolarization that may actually block or reduce neuronal firing (i.e., a region of cortical inhibition).

Turning to FIG. 8, in accordance with some embodiments, an external controlling/processing device 202 may be used to communicate with the ICI 10 (of FIGS. 1-5) or with the ICI 400 (of FIG. 30) of the present application. The device 202 may be a mobile and/or portable and/or hand held device, and/or wearable device such as, for example, a mobile (cellular) telephone or smartphone, a phablet, a tablet, a laptop computer a notebook or a wearable virtual reality (VR) headset, or a wearable augmented reality (AR) headset. The device 202 may include a processor/controller 208 (such as, for example the processor included in a cellular telephone). The device 202 may also include a power source 206 (such as, for example the rechargeable lithium battery of a laptop or a cellular telephone). The device 202 may also include a telemetry unit 204 (such as, for example, the cellular transmitter of the smartphone or cellular telephone or Wi-Fi circuitry of a laptop computer) that is suitably connected to and controlled by the processor/controller 208. The device 202 may also include a user touch screen interface 210 (such as, for example, the touch sensitive display screen of a cellular telephone or smartphone or a laptop touch sensitive screen) that enables the user to interact with any application operating on the processor(s) included in such mobile cellular telephones.

It is noted that the external controlling processing device 202, is not limited to mobile phones or smartphone but may also be implemented as any device having wireless communicating capabilities, processing power and a user interface (physical and/or virtual), including for example, a laptop or other computer, a notebook, a phablet, a virtual reality (VR) headset, such as, for example, virtual reality goggles, VR eyeglasses, augmented reality (AR) headsets, or any other device enabling the user to interact with a virtual or physical user interface of any type.

In operation, a software program or mobile application may be installed on the smartphone that may wirelessly receive signals and or data from any of the ICIs of the present application and may process the received data to detect an indication of a change in the state of the user in which the ICIs are implanted, as disclosed hereinabove. The processor(s) of the device 202 may telemetrically send control signals to the telemetry module 138 of the ICI 10. When the control signals are received by the processor/controller 140 of the ICI 10 they may initiate a stimulation regime of one or more brain regions of the user/patient by the ICI 10.

Furthermore, the inclusion of the device 202, may enable further interactions of the user/patient with the ICI 10 by using the touch screen user interface 210 for displaying data or processed date on the screen representing the status of the system, the parameters of stimulation and other information about the status and operational state and/or operational history of the system. In some embodiments the user or the patient may be able to feed data or control instructions to the touch screen interface 210, for changing and/or modulating, and/or stopping, and or initiating the operation of the ICI 10.

It is noted that the user-interface of the portable and or mobile and/or wearable devices disclosed hereinabove may be any type of physical interface (such as, for example, a keyboard, a touch-screen) but may also be any other type of interface, such as a graphic user interface (GUI), a virtual GUI, or any other type of suitable user interface.

COMSOL Modeling

COMSOL Multiphysics® is an advanced Finite Element Computational Solver software for Partial Differential Equations (commercially available from Comsol Multiphysics Inc. MA, USA). We use this program to solve a volume conductor model of the human head. We define the geometry (e.g. thicknesses) of various tissues in the model and their corresponding conductivities (given table 1 below). We state the boundary conditions of the model which are mostly the current densities leaving or entering each of the electrodes (Neumann boundary condition).

Ohm's law relates these current densities and conductivities to the Electric Fields generated in the tissue as follows:

$$\vec{E} = \frac{\vec{J}}{\sigma}$$ Equation 1

Where E is the electric field, J is the current density and σ is the tissue conductivity. The electric field is the negative gradient of the electric potential:

$$\vec{E} = -\nabla \Phi$$ Equation 2

Where Φ is the electric potential and the "del" operator is the gradient (first spatial derivative).

Incorporating the Divergence Theorem that relates current density to volume sources or:

$$\nabla \cdot \vec{J} = I_v$$ Equation 3

Where $I_v$ is the volume source density and the "del" operator is the divergence.

Combining Equations 1-3 yields Poisson's Equation or:

$$\nabla \cdot \vec{J} = -\sigma \nabla^2 \Phi$$ Equation 4

Comsol is used to solve the volume conductor problem by meshing the geometry and solving Poissson's equation. This allows us to calculate the current density at the surface of the cortex. Once the current density at the surface of the cortex is known, we can predict which areas are depolarized (activated), which areas are hyperpolarized (inhibited) and which areas are unaffected. Likewise, the Comsol model can calculate the electric potential on the surface of the cortex or at any level below the cortex. Spatial derivatives (For example, the $2^{nd}$ spatial derivative of potential) can be used to calculate "activating functions" which also can be used to predict which areas are depolarized or hyperpolarized which in turn predicts which areas are activated.

The data values used in the Comsol simulation are given in TABLE 1 below.

TABLE 1

| TISSUE LAYER | CONDUCTIVITY (S/m) | LAYER THICKNESS (mm) |
|---|---|---|
| Scalp | 0.435 | 8 |
| Outer Table | 0.0063 | 2 |
| Cancellous bone | 0.04 | 3 |
| Inner table | 0.0063 | 2 |
| Dura | 0.065 | 1 |
| CSF | 1.65 | 3 |
| Gray matter | 0.33 | 7 |
| White matter | 0.256 | 20 |

Each of the four stimulating electrodes 30A, 30B, 30C and 30D, are disposed symmetrically on the surface 24D of the bottom part 24C of the ICI 10, thus it is possible to solve for the resulting current density (Jx, Jy, and Jz) at the level of the cortex for a unit activation (e.g. 1 mA) of just one electrode and then superpose results of the other three electrodes by rotating the results 90 degrees for each electrode. Likewise, it is possible to scale the magnitude of the cortical current density by the amount of current sourced or sinked by the electrodes (−10 mA to +10 mA). Applying a threshold value (for example, a threshold in the range of: current density >3-6 A/m$^2$), one can predict the area of stimulation.

Figure 9:
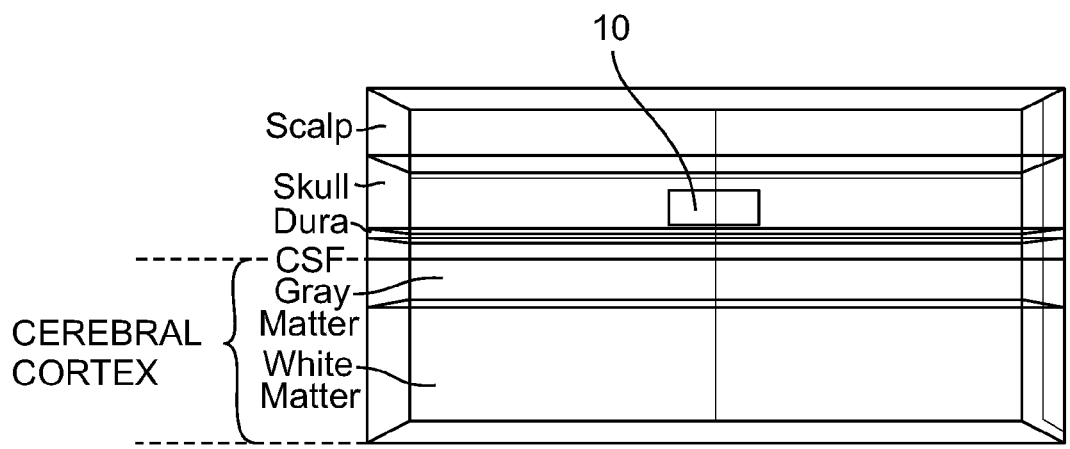
FIG. 9 is a schematic view illustrating a simplified model of the skull and brain structures used to perform simulations of the flow of current resulting from using the implant disclosed illustrated in FIGS. 1-5.
Figure 14:
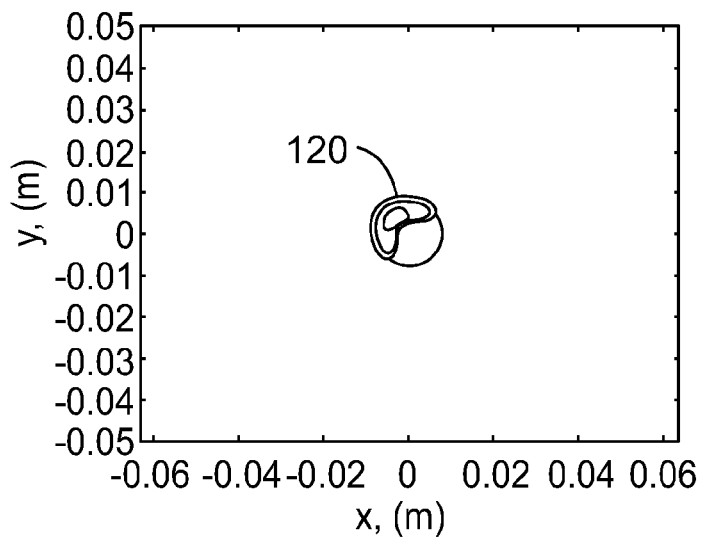
FIGS. 14, 15 and 16 are schematic diagrams illustrating the results of simulations of three different non-oval two-dimensional current density maps achievable by the implant of FIGS. 1-5.
Figure 15:
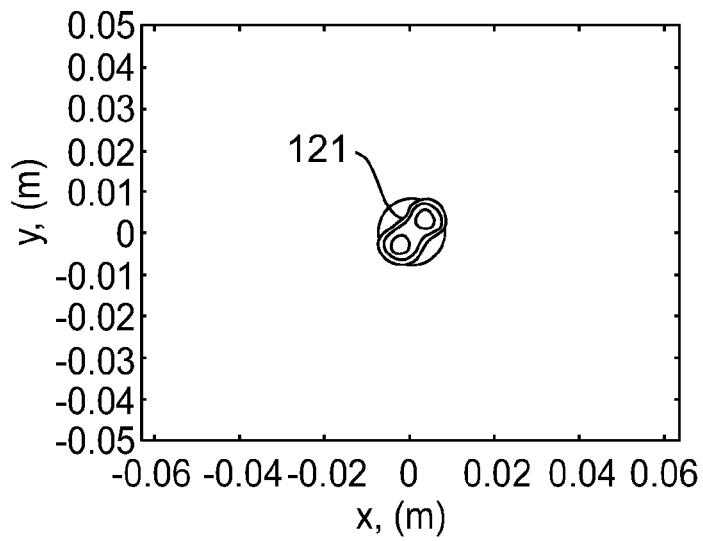
Figure 16:
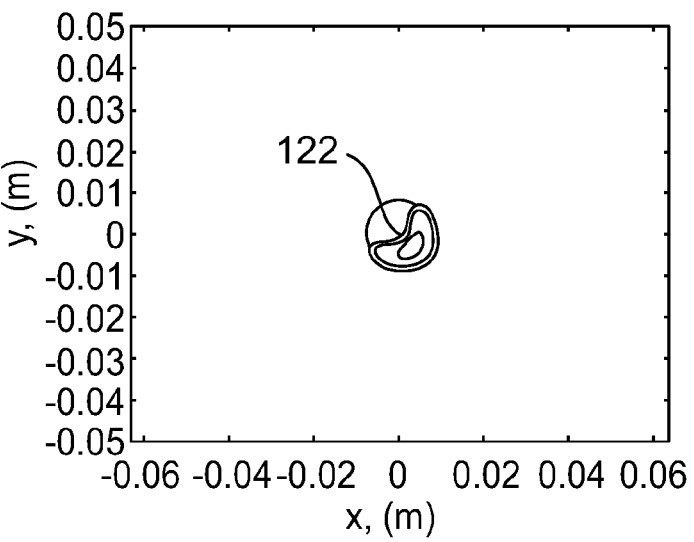

Reference is now made to FIGS. 9-13. FIG. 9 is a schematic view illustrating a simplified model of the skull and tissue structures used to perform simulations of the flow of current resulting from using the implant disclosed in FIGS. 1-5. FIGS. 10-13 are schematic two dimensional diagrams illustrating simulations of current steering capabilities of the electrode configuration of the implant of FIGS. 1-5. FIGS. 14-16 are schematic diagrams illustrating the results of simulations of three different non-oval two-dimensional current density maps achievable by the implant of FIGS. 1-5.

Turning to FIG. 9, the simplified model implemented in COMSOL is illustrated with the tissue layers used in the simulation identified and the position of the implanted device 10 after it is implanted is indicated by the disc 10 that is embedded in the calvarial bone (designated by the layer labeled by the word "skull"). It is noted that different models were programmed and tested for a device implanted between the bone and the scalp (such as for example, the device 400 of FIG. 30 hereinafter). Such models may be used for obtaining simulation data representing the approximate current density distribution at any desired plane parallel to the bottom of the device 400 after implantation for any desired set of current parameters applied to the stimulating electrodes of the device 400. Furthermore, the simulation may be used to compute the simulated supra-threshold current surfaces in 3D similar (but not identical) to the surfaces 130 and 132 of FIGS. 17-18, respectively.

Storage of Current Density Simulation Results in LUT

The current density simulation results for a particular implantable device having a specific stimulating electrode arrangement may be stored in a digitized form in a lookup table (LUT).

The LUT may include the set of current pulse parameters (or, alternatively, in some embodiments voltage pulses) to be applied to each of the stimulating electrodes. The current pulse parameters may include, for example, the pulse amplitude, the pulse duration, the pulse polarity and the pulse frequency within a stimulation session. In some embodiments, for each set of electrode pulse parameters assigned for each of the stimulating electrodes, the LUT may store 2D spatial data representing the simulated current density within a second plane parallel to a first plane of the bottom of the device, such as for example, the ICI 10 or any other implantable devices disclosed herein (within which plane the stimulating electrodes of the implantable device are disposed) The second plane is disposed within the cortical region to be stimulated.

The current density data may be stored as pixels of a digitized density map, each pixel has an associated current density vector value ($J_x$, $J_y$, $J_z$) and a set of x-y coordinates values representing the location of the center of the pixel in a Cartesian coordinate system defined within the second plane.

As the current density simulation is capable of providing 3D current density distribution in the tissues underlying the first plane (representing the surface of the bottom of the implantable device), in some embodiments, the LUT may store, for each set of current parameters to be applied to all stimulating electrodes, a set of 3D digitized voxels each voxel representing the 3D current density within each voxel and the x-y-z coordinates representing the location of the center of the voxel in a 3D Cartesian system. Such a data set may enable accessing data of multiple x-y planes each having a different depth (different Z coordinate value) within the tissues underlying the bottom of the implantable device.

Turning to FIGS. 10-13, in all the FIGS. 10,11, 12 and 13, the circles 110 represent the contours of the bottom surface 24D of the bottom part 24C of ICI 10 (each of the circles 110 also illustrates the positions of the stimulating Electrodes 30A, 30B, 30C and 30D. It is noted that the positions of the reference electrode 30E, the sensing electrodes 25A, 25B, 25C and 25D, and of the auxiliary electrode 30F are not shown in FIGS. 10-13 for the sake of clarity of illustration. The numbers on side of each of the electrodes 30A, 30B, 30C, 30D, represent the polarity and amplitude of currents (in mA) flowing from or to the electrode. For example, in FIG. 10, a current of +1.5 mA flows from the electrode 30D, while no currents flow from or into the remaining electrodes 30A, 30B and 30C. In FIG. 11, a current of +1.5 mA flows from the electrode 30D and a current of −2.5 mA flows into each of the remaining electrodes, 30A, 30B and 30C. In FIG. 12, a current of +1.5 mA flows from the electrode 30D, a current of −2.5 mA flows into the electrode 30B, a current of +6 mA flows from the electrode 30C and no current flows from or into the electrode 30A. In FIG. 13, a current of +0.55 mA flows from each of the four electrodes 30A, 30B, 30C and 30D. The regions 111 (of FIG. 10), 112 (of FIG. 11), 113 (of FIG. 12 and 114 (of FIG. 13), represent the regions of supra-threshold current density within an (imaginary) planar surface disposed within the cortex 16 and parallel to the planar surface 24D of the ICI 10.

As may be seen from FIGS. 10-13, in the simulations, applying different current combinations through different electrodes may result in changing (increasing or decreasing) the area of the supra-threshold current density regions as well as the position of the supra-threshold current density regions in the cortex 16.

Moreover, it is noted that the shapes of the supra-threshold regions 111, 112, 113 and 114 may be quite dissimilar to each other and are not necessarily symmetrical.

Turning now to FIGS. 14-16, the regions 120, 121 and 122 of FIGS. 14, 15 and 16, respectively, represent different simulated shapes of supra-threshold current density regions within an imaginary plane disposed within the cortex 16 (and parallel to the surface 24D) that result from applying different voltage combinations to selected electrode combinations of the electrodes 30A, 30B, 30C and 30D. As is apparent from the simulated two dimensional current density maps illustrated in FIGS. 14-16, very different shapes of supra-threshold current density regions may be obtained. Such density regions are not necessarily oval regions. For example, the region 120 of FIG. 14 is Banana-shaped, the region 121 of FIG. 15 is double lobed (dumbbell shaped) and the region 122 of FIG. 16 has an inverted banana shaped (as compared to the region 120 of FIG. 14).

Figure 17:
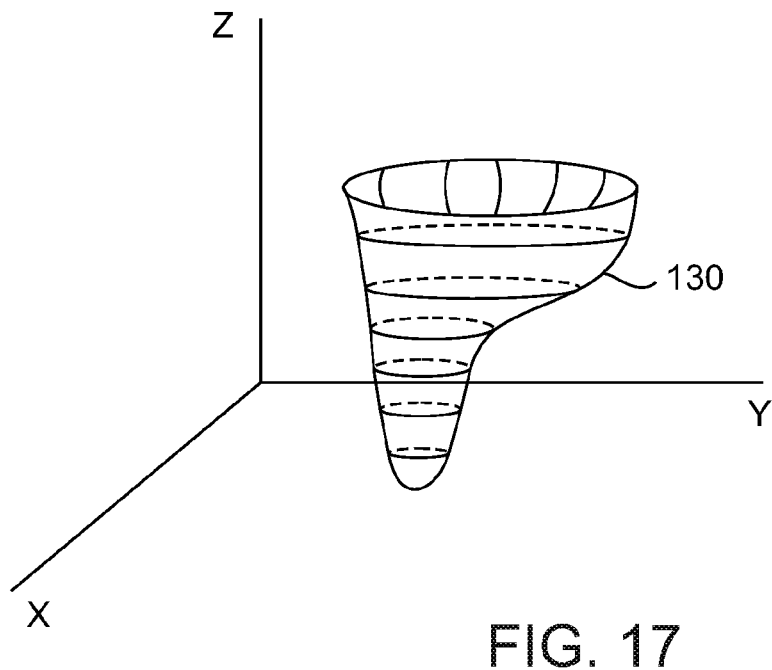
FIGS. 17-18 are schematic diagrams illustrating two different 3D current density maps obtainable by the implant of FIGS. 1-5.
Figure 18:
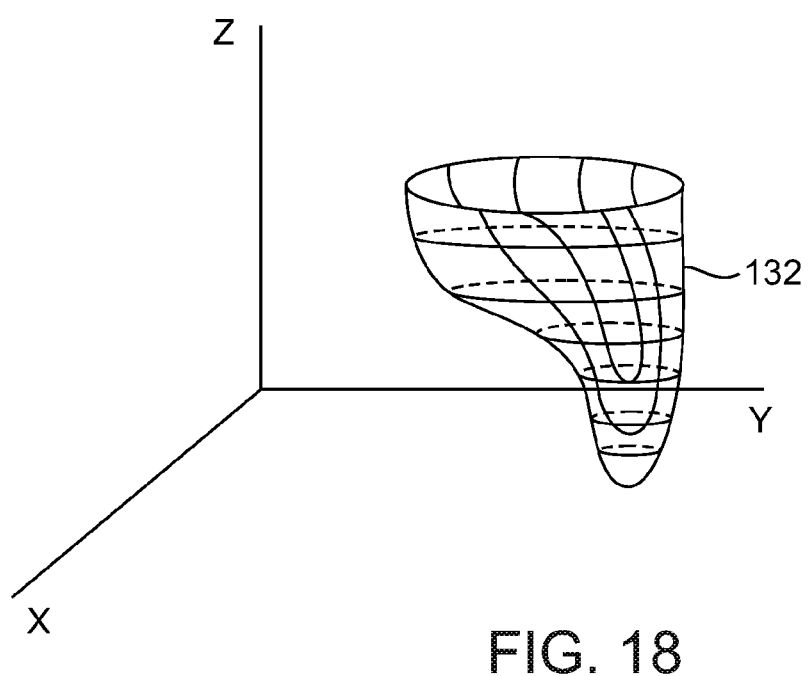

Reference is now made to FIGS. 17-18. FIGS. 17-18 are schematic diagrams illustrating two different 3D current density maps obtainable by combining several two-dimensional simulations similar to the simulations of FIGS. 15-17. The 3D surface 130 in the 3D graph of FIG. 17 represents a surface (under the bottom part of the ICI 10) enclosing supra-threshold current densities. It is noted that FIGS. 17 and 18 are arbitrary, illustrative "mock" examples provided for better understanding only and do not represent the results of a particular simulation, such 3D current density representations in space may be obtained by 3D finite element model simulations or by performing several 2D current density simulations at different values of the z axis and combining the resulting 2D maps to generate a 3D supra-threshold current density surface simulation.

The 3D surface 132 in the 3D graph of FIG. 18 represents another arbitrary, illustrative "mock" example of a current density surface (under the bottom part of the ICI 10) enclosing supra-threshold current densities. The surface 132 does not represent the results of a particular real simulation and is provided as a "mock" possible example that may be obtained by using a set of electrode voltage (or current) parameter set different than the electrode parameter set used to generate the surface of surface 130 of FIG. 17. FIGS. 17-18 illustrate that the stimulated cortical regions may be selectively changed by using current steering to change the position of the supra-threshold current region in the cortex 16. It is stressed that the surfaces 130 and 132 do not represent the result of a real simulation and are provided for a better understanding of the mode of operation of the current steering performed as disclosed herein.

It is noted that an advantageous feature of the current steering methods disclosed in the present application is that it is possible to shift the cortical regions subjected to supra-threshold current densities not only laterally on the surface of the cortex 16 but also in the depth dimension of the cortical tissue (which is normal to the surface 24D).

Figure 20:
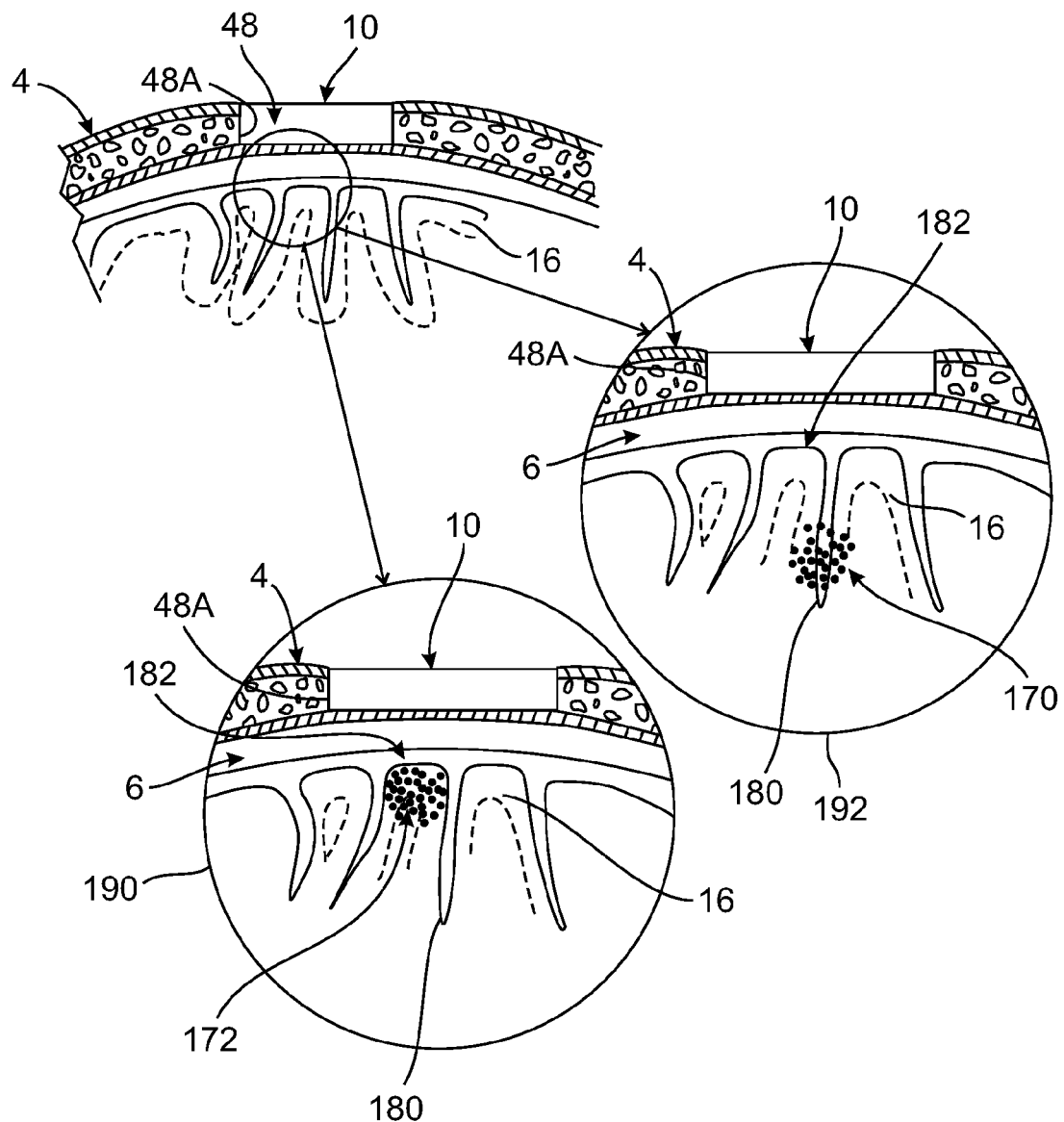
FIG. 20 is a schematic diagram illustrating the ability of the implants of the present application to stimulate or inhibit cortical neuronal activity in selected specific anatomical regions having different depths within the cortex underlying the implant by performing current steering with the implant of FIGS. 1-5.

Reference is now made to FIGS. 19-20. FIG. 19 is a schematic diagram illustrating the ability of the implants of the present application to stimulate or inhibit cortical neuronal activity in selected specific anatomical regions along the cortex underlying the implant by using current steering of the implant of FIGS. 1-5. FIG. 20 is a schematic diagram illustrating the ability of the implants of the present application to stimulate or inhibit cortical neuronal activity in selected specific anatomical regions having different depths within the cortex underlying the implant by performing current steering with the implant of FIGS. 1-5.

Turning to FIG. 19, the implant 10 is schematically shown before placement into the recess 48 in the calvarial bone 4. The three circles 154A, 154B and 154 C represent the circumference of the bottom the recess 48 (as projected on the surface of the cortex 16 underlying the ICI 10). Three different Gyri 150, 151 and 152 are illustrated as circumscribed by the projected circumference 48A of the bottom of the recess 48. The three circles 154D, 154E and 154F illustrate the same three Gyri 150, 151 and 152 and the gray dots 160, 161 and 162 represent three different anatomical regions where supra-threshold stimulation may be applied. For example, in the circle 154 D the black dots 160 representing stimulation are located within the gyrus 150. In the circle 154E, the black dots 161 represent shifting the stimulation to the region of the gyrus 151. In the circle 154F the grey dots 162 represent shifting of the stimulation to the region of the gyrus 152.

Turning to FIG. 20, a cross-sectional view of the implant 10 attached within the recess 48 is illustrated. The cortex 16 is illustrated and is physically separated from the ICI 10 by the inner table 6 of the calvarial bone 4. The circle 190 illustrates an enlarged view of the cortical tissue 16 in which the current is steered such that only the region of a gyrus 182 is stimulated as represented schematically by the gray dots 172. The circle 192 illustrates an enlarged view of the same cortical region illustrated in the circle 190 after the current is steered by the ICI 10 as disclosed hereinabove such that only the region of a sulcus 180 is stimulated as represented schematically by the gray dots 170. Such current steering enables one to perform stimulation or inhibition of various different regions selected in the cortex 16 despite the convoluted folded structure of the cortex 16 and to selectively stimulate and/or inhibit both superficial gyrus regions as well as deeper sulcal regions.

Moreover, the ability of forming supra-threshold current density regions which are asymmetrical and non-oval shapes (as illustrated in FIGS. 10-13, 14-16 and 17-18 above) may enable the "tailoring" of "current beams" or current density distributions profiles that may be selectively directed or matched to specific anatomically or functionally identified cortical regions.

Furthermore, as the ICI 10 may be capable of acquiring and processing locally sensed cortical electrical signals (by using the Sensing electrodes 25A, 25B, 25C and 25D as disclosed in detail \hereinabove, and as the stimulated/inhibited regions may be very quickly changed or shifted within the cortex with high temporal resolution (i.e., within several tenths of microseconds to milliseconds), it may be possible to shift the position of stimulation or inhibition by very quickly changing the stimulation parameters (such as, for example, the polarity and amplitude of the voltage pulses applied to the stimulating electrodes 30A, 30B, 30C and 30D), the ICI 10 may be operated in a closed-loop configuration in order to track changes or anatomical shifts of the target regions to which stimulation is to be applied.

Such tracking may be necessary due to relatively slow changes or shifts in the anatomical positions of functional areas over time. Such changes may occur spontaneously within hours to days or even months in the cortex of a patient, and may even occur due to therapeutic electrical stimulation or inhibition that are periodically applied to the cortex during treatment using the ICI 10. Another type of tracking that may be performed by closed-loop operation of the ICI 10 may be fast tracking (tracking frequency content changes occurring within seconds or even less than seconds time scale).

The detection of such shifts and changes may be performed as follows. It is known that different networks have different associated rhythms. Specifically, intrinsic networks such as DMN are more associated with theta rhythms, while extrinsic networks are more associated with alpha rhythms, as in an article by Hacker et al. entitled "Frequency-specific electrophysiologic correlates of resting state fMRI networks", published in Neuroimage. Vol 149, pp 446-457 (2017).

Given that the four sensing electrodes 25A, 25B, 25C and 25D are recording electrical cortical signals from the cortical regions underlying the ICI 10, as the relationship of theta envelope to alpha envelope power increases the ICI 10 may change the stimulation based on that anatomic information of recording based on how the regions are shifting in their respective frequency content.

Methods for analyzing recorded cortical signals to determine the signals' frequency content are published in detail by the Hacker et al. in the above mentioned Neuroimage article.

The region below the intra-calvarial device will both sense and stimulate the cortical regions beneath the implant. This device will have the ability to detect and respond to the changing cortical dynamics that occur between the networks both in the fast-scale (ms), and slow scale (hours, days or even weeks).

For fast scale adaptation, the electrode sensors will detect changes in gamma power in the gyri that are part of the default mode network and that dorsal attention network that are in close proximity beneath the implant.

Gamma power detection would be done through the following methods. Electrocortical signals are acquired using the ICI 10. All signals are internally sampled at 38.4 kHz with a 6.6 kHz low pass filter. The signals are then digitally bandpass filtered within the amplifiers between 0.1 Hz and 500 Hz, and subsequently down-sampled to a 1200 Hz output sampling rate.

The cortical signals are segmented into 300 ms time windows with shifts of 50 ms between windows. Spectral power are estimated in 2 Hz bins with center frequencies from 3 to 253 Hz using the autoregressive maximum entropy method with a model order of 75. Although the 300 ms time window may limit the accuracy of power estimates for the lowest frequencies, it is chosen to balance the accuracy of spectral power estimates and temporal resolution. As power spectra are not normally distributed, power spectra are normalized using a log transform. Power spectra are then converted to z-score values, using the mean and standard deviation of spectral power from 200 ms after time a given time point. The z-score operation accounts for the 1/f fall-off in spectral power by ensuring that the mean and variance of spectral power is the same at each frequency. Additionally, positive and negative z-scores indicate respective increases and decreases in spectral power relative to the time period. The time period is chosen as the baseline period for future comparison. Spectral power was then averaged into seven canonical frequency bands: theta (4-8 Hz), mu (8-12 Hz), beta 1 (12-24 Hz), beta 2 (24-34 Hz), gamma 1 (34-55 Hz), gamma 2 (65-95 Hz), and gamma 3 (130-175 Hz). The beta band was separated into two components because two distinct components have been described. These seven frequency bands were chosen to ensure inclusion of relevant frequency bands while avoiding all noise harmonics of the 60 Hz line noise and a 100 Hz harmonic observed in the recording system. Because the frequency bands have varying bandwidths, their variances differed after averaging into frequency bands; therefore, the band-averaged spectral power is converted to a z-score. The two calculations are used to ensure that each frequency bin contributed equally to the band-averaged power estimates, and that the variance is similar across frequency bands, irrespective of the bandwidth.

These measurements are taken for each sensing electrode of the sensing electrodes 25A, 25B, 25C and 25D of the ICI 10. Each electrode may be positioned over a specific gyrus that is associated with a given network. As the spectral power of a particular frequency band (e.g. gamma frequency band) increases in one of the gyri and the respective network then a responsive stimulation can be performed to alter the relative power changes in the respective gyri to achieve desired ratio of cortical activation between the respective gyri and their associated networks.

For slow scale adaptation, the sensing electrodes 25A, 25B, 25C and 25D will detect changes in slow rhythm connectivity are part of the default mode network and that dorsal attention network that are in close proximity beneath the ICI 10.

To investigate the behavior of the network interactions, correlation of the slow cortical potential (>0.5 Hz), shown to be related to fMRI BOLD signal, is computed. The correlation matrix is computed for a given number of contiguous, non-overlapping time epochs over days, and an electrode over the relevant cortical area is selected as the seed for the respective network. To statistically evaluate changes in these network correlation structures over the selected epochs of time (hours, days, or weeks), each epoch is subsampled separately by computing the correlation matrix on contiguous, non-overlapping five second segments within the epoch. For each of these segments, electrodes are classified as being "in network" (correlation coefficient >0) or "out of network" (correlation coefficient <0). A $\chi 2$ test ($\alpha=0.05$) can be used to assess for significant similarity between the network correlation patterns of the first through n-epochs.

Another method for band limited power includes the following. Briefly, in accordance with a non-limiting example, the cortical signals sensed (and/or recorded) by the sensing/recording electrodes 25A, 25B, 25C and 25D of the ICI 10 are referenced to a common average. A de-spiking function, $f(x)=a \cdot \tan-1(x/a)$, where $\alpha$ is 5 S.D. (five standard deviations) of the signal, may be applied to attenuate transient artifacts from external electrical noise. The sensed/recorded signals may then be decomposed into frequency components by zero-phase digital filtering using a 2nd order Butterworth filter in the forward and reverse directions (effectively, 4th order). Frequency bins may be logarithmically spaced with bin edges defined as 2 k Hz, where k ranges from 0 to 7 in increments of 0.1. The filtered signals may be squared to compute the instantaneous power value. In other applications, a low-pass filter may be applied to recover the full signal envelope (equivalent to envelopes obtained using the Hilbert transform). Envelope modulations may be divided into distinct frequency bands. Accordingly, a second band-pass filter may be applied to the squared signals obtained in the previous step to obtain 'envelope frequency' bins. The envelope frequency bins may be logarithmically spaced with bin edges defined as 10 k Hz, where k ranges from −2.5 to 1.25 in increments of 0.25. Measurable envelope frequencies cannot exceed the bin width applied to the carrier frequency. Thus, for example, for the band limited power (BLP) bin spanning 104-111 Hz, the envelope signal may be filtered to isolate frequency components ranging from 0.003 Hz to a maximum of 7 Hz (i.e., the width of the 104-111 Hz carrier frequency bin).

Stimulation may be performed according to preferred network configuration. Different stimulation regimes can be applied to enhance or inhibit a given region of brain and its network configuration. Specifically, this may include different frequency of stimulation (e.g. 1 Hz-1000 Hz), different amplitudes of stimulation (1-10 mA), and different rhythm structure (e.g. 100 Hz with a 1 Hz enveloped frequency). It is noted that the ICI 10 may also be used to block activity by applying of high frequency stimulation to selected cortical regions.

Thus, the ICIs of the present application are able to sweep a wave of excitation or inhibition across a selected cortical region. Such a BCI closed loop operation therefore enables applying dynamic, temporally changing activation and/or deactivation paradigms to the cortex to facilitate electrical modulation of cortical dynamically changing activity patterns.

The ICIs of the present application also allow tracking of the network over time as therapy progresses and the patients improve. Furthermore, by combining resting state fMRI and network mapping algorithms (as disclosed in detail by Hacker et al.), it is possible to precisely map the dorsal Attention network (DAN) and Default Mode network (DMN), and their movement over time. The tracking of the network, thus, enables the modifying of the current steering (by changing the parameters of the voltage pulses applied to the electrodes 30A, 30B, 30C and 30D parameters) and to move and reshape the electrical stimulation (activation or inhibition) to match any detected cortical activity.

It is noted that while the specific configuration and shapes of the current passing (stimulating) electrodes 30A, 30B, 30C and 30D of shapes the ICI 10 were used in performing the current density simulations of FIGS. 10-16, the illustrated electrode shapes numbers and configuration of the electrodes of the ICI 10, is by no means obligatory to practicing the current steering of the present application. Rather, many different variations of electrode numbers, electrode shapes and electrode configuration are possible and may be used for performing the signal sensing and the current steering disclosed herein.

Reference is now made to FIGS. 21-28 are schematic bottom views illustrating several non-limiting electrode configurations usable in some embodiments of the implants of the present application. The ICIs illustrated in FIGS. 21-28 may all have the same ECM 28 as disclosed hereinabove with respect to FIGS. 1-5 and 10, but may each have different current passing and/or sensing electrode combinations.

Figure 21:
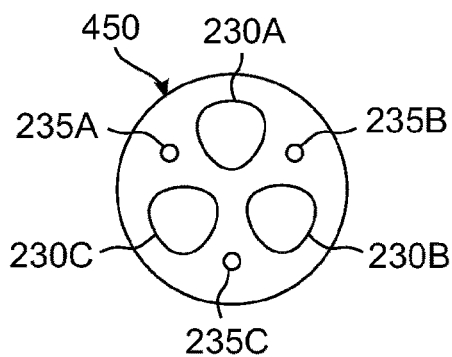
FIGS. 21, 22, 23, 24, 25, 26, 27 and 28 are schematic bottom views illustrating several non-limiting electrode configurations usable in some embodiments of the implants of the present application.

Turning to FIG. 21, the ICI 450 may include a set of three identically shaped current passing electrodes 230A, 230B and 230C that are arranged in a triangular array on the bottom part of the ICI 450. The ICI 450 may also include a set of identically shaped circular sensing/recording electrodes 230A, 230B and 230C that are arranged in a triangular array on the bottom part of the ICI 450.

Figure 22:
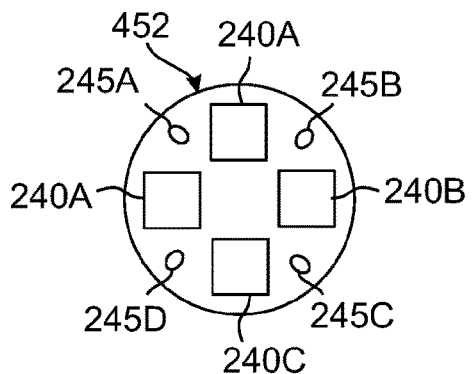

Turning to FIG. 22, the ICI 452 may include a set of four identically shaped square-shaped current passing electrodes 240A, 240B, 240C and 240D that are arranged in a symmetrical array on the bottom part of the ICI 452. The ICI 452 may also include a set of identically shaped oval sensing/recording electrodes 245A, 245B, 245C and 245D that are arranged in a symmetrical array on the bottom part of the ICI 452.

Figure 23:
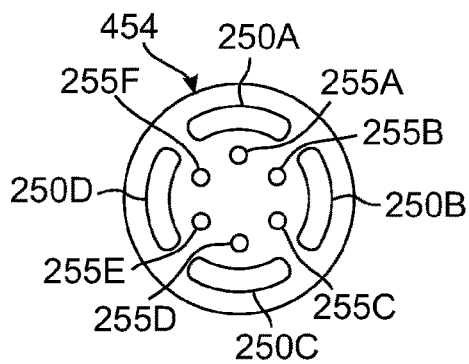

Turning to FIG. 23, the ICI 454 may include a set of four identically shaped banana-shaped current passing electrodes 250A, 250B, 250C and 250D that are arranged in a symmetrical array on the bottom part of the ICI 454. The ICI 454 may also include a set of six identically shaped circular sensing/recording electrodes 255A, 255B, 255C, 255D, 255E and 255F that are arranged in a symmetrical hexagonal array on the bottom part of the ICI 454.

Figure 24:
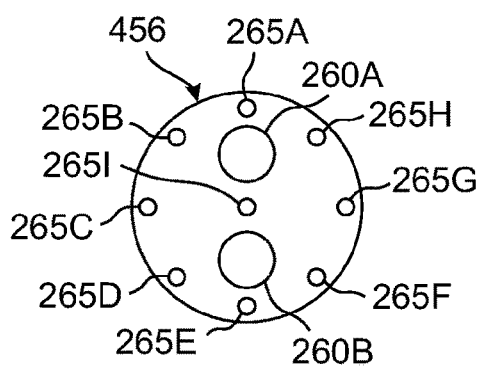

Turning to FIG. 24, the ICI 456 may include a set of two identically shaped circular current passing electrodes 260A and 260B that are arranged on the bottom part of the ICI 456 as illustrated in FIG. 24. The ICI 456 may also include a set of nine identically shaped circular sensing/recording electrodes 265A, 265B, 265C, 265D, 265E, 265F, 265G, 265H and 2651 that are arranged in a sensing electrode array on the bottom part of the ICI 456 as illustrated in FIG. 24.

Figure 25:
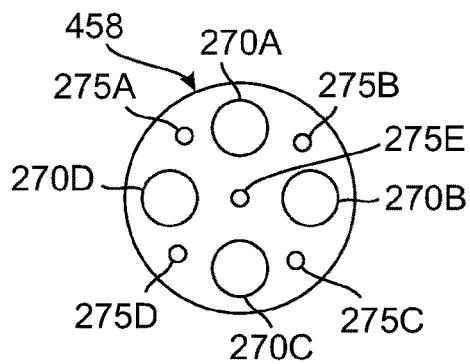

Turning to FIG. 25, the ICI 458 may include a set of four identically shaped circular-shaped current passing electrodes 270A, 270B, 270C and 270D that are arranged in a symmetrical array on the bottom part of the ICI 458. The ICI 458 may also include a set of five identically shaped circular sensing/recording electrodes 275A, 275B, 275C, 275D and 275E that are arranged in a on the bottom part of the ICI 458.

Figure 26:
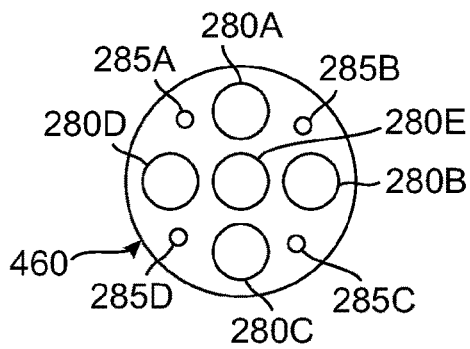

Turning to FIG. 26, the ICI 460 may include a set of five identical circular-shaped current passing electrodes 280A, 280B, 280C, 280D and 280E that are arranged in a symmetrical array on the bottom part of the ICI 460. The ICI 460 may also include a set of four identically shaped circular sensing/recording electrodes 285A, 285B, 285C and 285D that are arranged in a square pattern on the bottom part of the ICI 460 as illustrated in FIG. 26.

Figure 27:
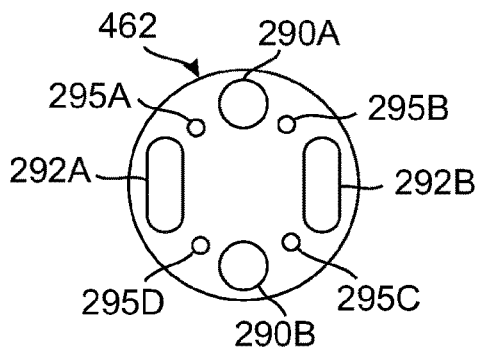

Turning to FIG. 27, the ICI 462 may include a set of four current passing electrodes 290A, 290B, 292A and 292D that are arranged in an array on the bottom part of the ICI 462. The current passing electrodes 290A and 290B are circular shaped electrode. The current passing electrodes 292A and 292B are banana shaped current passing electrodes. The ICI 462 may also include a set of four identically shaped circular sensing/recording electrodes 295A, 295B, 295C and 285D that are symmetrically arranged in a on the bottom part of the ICI 462 as illustrated in FIG. 27.

Figure 41:
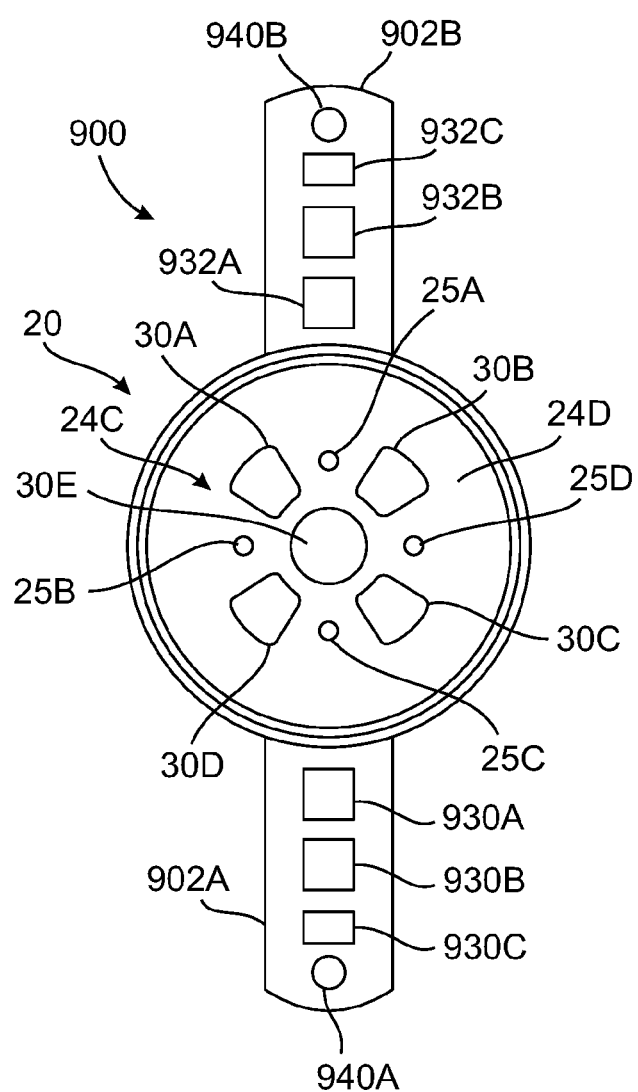
FIGS. 41-42 are schematic diagrams illustrating bottom views of two different embodiments of the implantable devices of the present application.

It is noted that in some embodiments having additional auxiliary electrodes (for example, the auxiliary electrodes 930A-930C and 932A-932C of the device 900 of FIG. 41, or the auxiliary electrodes 1030 of the device 1000), the auxiliary electrodes may be used for further steering the current by applying appropriate currents there through.

It is noted that while some of the sensing electrode arrays and current passing electrode arrays disclosed herein may be symmetrical arrays, this is not obligatory to practicing the invention and the electrodes in either or both current passing electrode arrays and/or the sensing electrode arrays of the implants may be asymmetrical arrays and may even include irregularly shaped electrodes.

Figure 28:
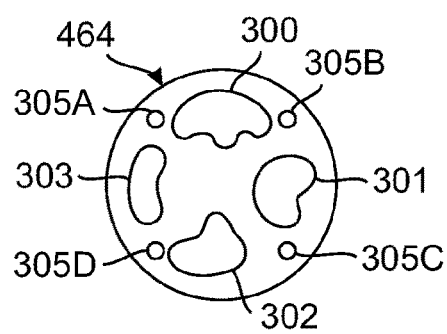

Turning to FIG. 28, the ICI 464 may include a set of four non-identical irregularly shaped current passing electrodes 300, 301, 302 and 303 that are arranged in a square pattern on the bottom part of the ICI 464. Each of the four current passing electrodes 300, 301, 302 and 303 may have a different unique shape that may be irregular and may be asymmetrically disposed on the bottom part of the ICI 464. The ICI 464 may also include a set of four identically shaped circular sensing/recording electrodes 295A, 295B, 295C and 285D that are symmetrically arranged in a on the bottom part of the ICI 464 as illustrated in FIG. 28. The shape of the current passing electrodes 300, 301, 302 and 303 may be designed to provide specific matching to specific anatomical cortical structures (such as, for example differently shaped gyri and/or differently shaped sulci). Such design may advantageously be individually tailored to each individual patient based on combined CT and/or fMRI mapping of the specific cortex of a specific individual, prior to implantation. Such specifically "tailor made" electrode configuration may enable further fine-tuning of stimulation efficacy and efficiency and may further reduce undesired stimulation of cortical anatomical structures that are adjacent to the desired stimulation target region.

Thus, the number, shape, position and arrangement of the sensing electrodes and/or of the current passing electrodes and may vary in different embodiments of the implants of the present application.

Reference is now made to FIG. 29 which is a schematic, part cross-sectional diagram schematically illustrating the implant of FIGS. 1-5 implanted within a calvarial bone. It is noted that the purpose of FIG. 29 is to provide a better understanding of the position of housing 20 and the shimming member 34 of FIGS. 1-5 after implantation within the calvarial bone 4. Therefore, only some parts of the ICI 10 are illustrated in detail in FIG. 29. The housing 20 of the ICI 10 is disposed within a cylindrical recess 48 extending through the outer table 5 and the cancellous bone 7 of the calvarial bone 4. It is noted that the inner table 5 is not breached or fully penetrated (but may, optionally, be partially penetrated without full breaching thereof) such that at least part of the inner table 5 separates between the stimulating electrodes and the sensing electrodes (electrodes are not shown in FIG. 29 for the sake of clarity of illustration) of the ICI 10 and does not allow direct contact of the ICI 10 with the tissues overlying the cortex (i.e. dura matter) or the cortex itself (not shown). The position of the coil 55 of the ECM 28 (of FIG. 10) within the sealed compartment 24 is shown in FIG. 29. The shimming member 34 is disposed above the housing 20 and attached to the calvarial bone by the screws 36A and 36B (of FIG. 6).

It will be appreciated that although the intra-calvarial implantation of the ICI 10 within the calvarial bone 4 as illustrated in FIG. 29 substantially improves the ability of the sensing electrodes of the implant to pick up the gamma band of the Ecog signals, may reduce the current densities required for cortical stimulation and may improve the signal to noise ratio (SNR) during sensing/recording, this implantation method is not necessarily obligatory and in some other embodiments, the implants contemplated in the present application may also be sub-dermally implanted between the outer surface 5A of the outer table 5 of the calvarial bone 4 (i.e., the outer surface of the skull) and the scalp 1.

Figure 30:
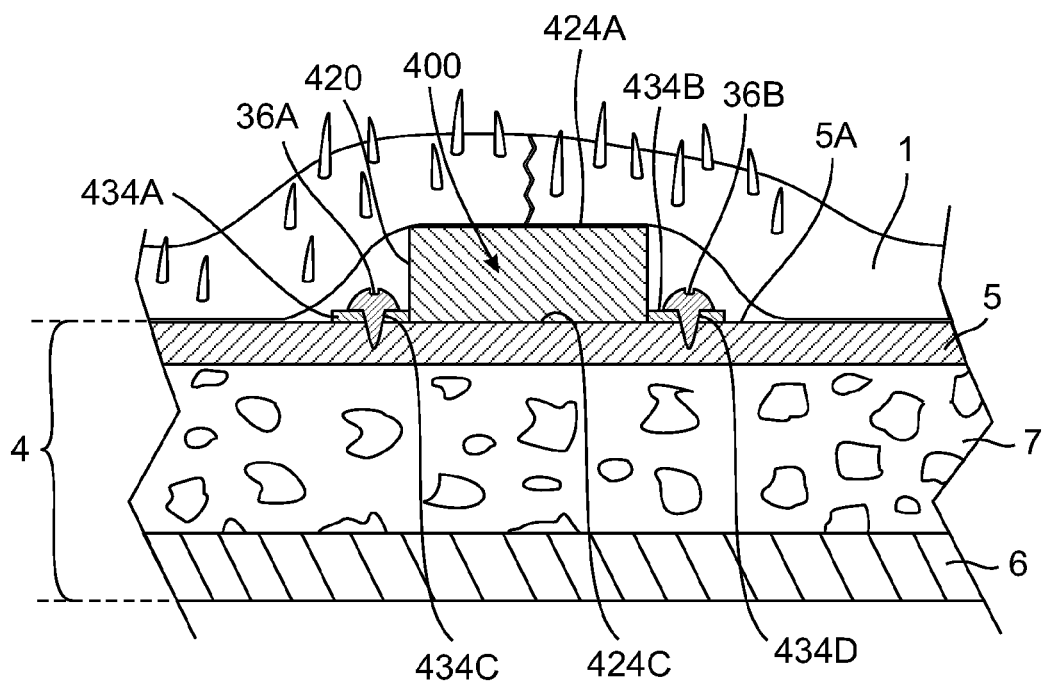
FIG. 30 is a schematic, part cross-sectional diagram illustrating an implant having current steering capabilities sub-dermally implanted between the outer surface of the calvarial bone and the skull, in accordance with some embodiments of the implants of the present application.

Reference is now made to FIG. 30 which is a schematic, part cross-sectional diagram illustrating an implant having current steering capabilities sub-dermally implanted between the outer surface of the calvarial bone and the skull, in accordance with some embodiments of the implants of the present application.

The sub-dermal implant 400 may be attached to the calvarial bone 4 and disposed between the outer surface 5A of the outer table 5 and the scalp 1. The housing 420 may have two tabs 434A and 434B laterally extending from the bottom part 424C or the housing 420. Two bone screws 36A and 36B are inserted through holes 434C and 434D formed within the tabs 434A and 434B, respectively and securely attach the implant 400 to the surface 5A of the outer table 5 to prevent rotation or movement of the implant 400 after implantation. The ECM 28, the sensing and current passing electrodes (not shown in FIG. 30) may be similar to the component as disclosed in all the ICIs of the present application. The advantage of the sub-dermal skull implants such as the implant 400 is that no drilling in the skull is required even further reducing the invasiveness, cost and time of the implantation procedure.

In an example, in a specific application to therapeutically treat mood disorders such as, for example, depression, any of the ICIs disclosed in the present application may be implanted for sensing electrical activity in the dorsolateral prefrontal cortex (DLPFC) to detect an indication that the patient is in a depressed state (such as, for example, modulation of high gamma band power/amplitude changes may be monitored by sensing electrical brain signals in the DLPFC). When the power in the higher frequencies of the gamma band is below an empirically determined threshold value, this may be an indication of a depressed state of the patient and the system may initiate stimulation of some target brain regions, such as, for example, the DLPFC, and/or other cortical regions.

In another exemplary application, the ICIs of the present application may be used for enhancing cognition by sensing simultaneously in the DLPFC and the temporo-parietal cortex (TPC) and processing the sensed signals to detect an indication of enhanced phase locking between signals sensed in the DLPFC and the TPC in the beta frequency band. Upon detection of the indication, the system 400 may stimulate directly the DLPFC and the stimulation may result in enhanced cognitive performance of the user/patient.

In such a way, the ICIs of the present application by using such closed loop BCI methods, may be used to treat many types of disorders, such as, for example, neurodegenerative disorders, neuropsychiatric disorder and/or psychiatric disorders, including, for example, epilepsy, traumatic brain injury (TBI), depression, obsessive-compulsive disorder (OCD), ADHD, attention deficit disorder (ADD), eating disorders including bulimia and anorexia, obesity, and other types of disorders.

Intra-calvarial recording from and/or stimulating of the cortical surface of the brain may enable neuro-modulation of electrophysiology that may have a wide range of clinical and non-clinical applications. In clinical applications of some embodiments, the cortical stimulation may be used to modify cortical excitability to treat numerous neuropsychiatric diseases such as, but not limited to, depression, attention deficit hyperactivity disorder (ADHD), addiction, and obesity. From a purely recording standpoint, cortical signals may be used for brain computer interfaces that may be used to treat a wide array of motor disabilities. From a non-clinical perspective, modulating the brain physiology either through stimulation or recording methodologies can be used to enhance cognitive function. Depending on the modality, the location in the brain, and the interface regime, cognitive operations such as attention, memory, analytic abilities, and mood may all be enhanced beyond a given individual's normal baseline.

A barrier for more wide spread adoption of these type of approaches is the invasiveness of the implantation of the electrodes. Once the skull bone and dura mater are penetrated with either intra-parenchymal or electro-corticographic electrodes there is a risk of having an intracranial hemorrhage or infection that could cause major harm, morbidity, or even death. While these risks, generally speaking, are quite small, the mere fact that they exist substantially changes a patient's perception of considering adoption of such invasive procedures. This also changes the manner in which patients are treated by physicians after implantation. If an intracranial electrode implant is surgically placed (e.g. deep brain stimulator, cortical stimulator, etc.), at the very least the patients are kept overnight for observation in a hospital to ensure that, should an intracranial complication arise, it can be rapidly addressed. A major need is to have a recording and stimulation brain interface that has minimal risk of an intracranial complication yet is still able to record and stimulate the brain with a functional equivalence similar or very close to that of the intracranial approaches. The presently disclosed ICIs, ICI systems, and methods of their construction and use may effectively and safely address many of the problems of the currently used intracranial methods.

It is noted that the processor/controllers disclosed herein may be or may include one or more computing devices selected from, one or more intracranial processor/controller, wearable processor/controller, remote processor/controller, a digital signal processor (DSP), a graphic processing unit (GPU), a quantum computing device, a central processing unit (CPU), or any combinations of the above. In some embodiments, the processor/controller may include and/or emulate a neural network. For example, the processor/controller(s) 140 or any other processors/controllers disclosed herein may include or may be connected to one or more neuromorphic ICs. Alternatively, and/or additionally, the processor/controller 140 or any other processors/controllers disclosed in the present application may be programmed to emulate one or more neural networks by software operative on the processor/controller(s).

Furthermore, any of the processor/controllers disclosed in the present application may have access to the "cloud" via the internet (preferably, wirelessly, but also possibly in a wired way) or through any other type of network, such as, for example, a LAN, a WAN, a VPN or any other type of wired or wirelessly accessible network.

In some embodiments, the processor/controller(s) disclosed herein may include wireless communication circuits, such as Bluetooth, or Wi-Fi communication units or circuits (not shown in detail any of the figures for the sake of clarity of illustration). Such wireless communication means may enable the processor/controller(s) to wirelessly communicate with external devices, such as for example, a remote computer, a server, a cellular telephone, a laptop computer, a VR headset, an AR headset or any other type of device having wireless communication capabilities (such as, for example, the device 202 of FIG. 8. Such embodiments may be useful in cases in which the processing power of the processor/controller(s) is limited. Such embodiments may allow the offloading of some or all of the computational burden to other processing devices, such as remote computer(s), servers, a cluster of computers, cellular smartphones, cellular telephones, a phablet, a tablet or any other suitable computing devices, and may enable the use of cloud computing, or parallel computing for processing data.

It is noted that in some embodiments of the ICIs of the present application, the implanted ICIs and/or other components of the ICI systems disclosed herein may be made MRI-compatible to enable use of the implanted ICIs during performing of fMRI imaging procedures. This may be performed by selecting non-magnetic and/or non-magnetizable materials to be used in the construction of the components of such ICIs. Such material may include, as an example, titanium, organic polymers or polymer based materials such as, Kevlar®, Parylene®, ceramic materials and other suitable materials. In such MRI-compatible embodiments, the power harvesting induction coils may be replaced by other types of power harvesting modules, such as, for example ultrasound energy harvesting modules using an implanted piezoelectric element coupled to the power harvesting units of the ICI. The use of fMRI compatible ICIs may be advantageous because it may allow the performing of complementary fMRI imaging to monitor the operation of the implantable system disclosed herein during implantation, testing and/or calibrating of the systems, as well as for tuning and/or adjusting the sensing and/or the stimulating regimes to improve or optimize system's performance. Additionally, the performing of fMRI imaging may assist the procedure of implantation, as disclosed in detail hereinabove.

In some embodiments of the systems and methods disclosed herein, the patient may undergo both anatomic imaging and functional imaging to define the optimal placement of the implanted ICI. For example, patients may be scanned using 3-T MRI scanners (such as but not limited to 3-T MRI scanners commercially available from Siemens, Erlangen, Germany). Anatomic imaging may include T1-weighted magnetization-prepared rapid acquisition gradient echo (MP-PAGE), T2-weighted fast spin echo, susceptibility-weighted imaging (SWI), diffusion-weighted imaging (DWI) and pre and post gadolinium T1-weighted fast spin echo in multiple projections. fMRI data may be acquired, for example, by using a T2*EPI sequence (3×3×3-mm³ voxels; 128 volumes/run; TE=27 ms; TR=2.8 s; field of view=256 mm; flip angle=90°), while the patients are instructed to remain still and fixate on a visual cross-hair without falling asleep (2 runs of 6 minute each for a total time of 12 minutes). Additionally, patients may also undergo CT scans with bone windows to determine the thickness of the skull. fMRI, CT and anatomic images may be co-registered using a stereotactic navigation system (for example Medtronic Stealth Navigation system commercially available from Medtronic, U.S.A. may be used for co-registration). The optimal implantation site may be determined using a combination of these imaging modalities. As an example, anatomic MRI imaging may be used to identify the dorsolateral prefrontal cortical region. Additionally, resting state or task based fMRI may be used to further refine the location for ICI implantation within the anatomical region.

Dynamic Network Tracking and Targeting

In the beginning of the 21$^{st}$ century, neuroscientists identified large-scale brain networks using resting-state functional Magnetic Resonance Imaging (rs-fMRI). These networks are collections of brain regions that have correlated fMRI BOLD signals. These networks can likewise be identified using other recording modalities such as electroencephalography (EEG), positron emission tomography (PET), and electrocorticography (ECoG). An example of one of these networks include the Default Mode Network (DMN) which is active when an individual is awake and at rest (e.g. daydreaming). It is an intrinsic network that is negatively correlated with other brain networks that are associated with external signals. The Dorsal Attention Network (DAN) which is active during unexpected events is an example of an external network. While these networks generally occupy the similar brain regions from subject to subject, their exact locations can vary not only between subjects but within a subject over time. Therefore, neuroscientists have used subject-specific scanning methods to precisely locate these networks in order to specifically target cortical regions for neural stimulation. For example, psychiatrists have used rs-fMRI to find the location in dorsal lateral prefrontal cortex (DLPFC) where the DAN and DMN networks are most anti-correlated. Once this location is found in a depressed patient it is stimulated using transcranial magnetic stimulation (TMS). That location has been shown to be the most optimal in treating subjects with depression. Since that optimal location can vary slightly over time within the same subject, it is important that networks can be tracked over time in order to precisely target stimulation therapy. However, such methods using rs-fMRI/TMS are quite cumbersome because network tracking may require repeated use of rs-fMRI with the associated expensive, inconvenient and time consuming rs-fMRI sessions requiring the patient to frequently travel to an rs-fMRI facility and are therefore mostly impractical for real time or near real time monitoring or closed-loop network tracking.

The devices systems and methods disclosed in the present application enable a relatively simple, precise and cost effective way of performing network tracking and targeting by using the recording electrodes of the implanted devices disclosed herein for automatically performing network localization and network tracking and by using the current steering methods disclosed herein to deliver localized stimulation (which may be exciting/activating signals and/or inhibiting or deactivating electrical signals) of automatically localized cortical targets.

Figure 31:
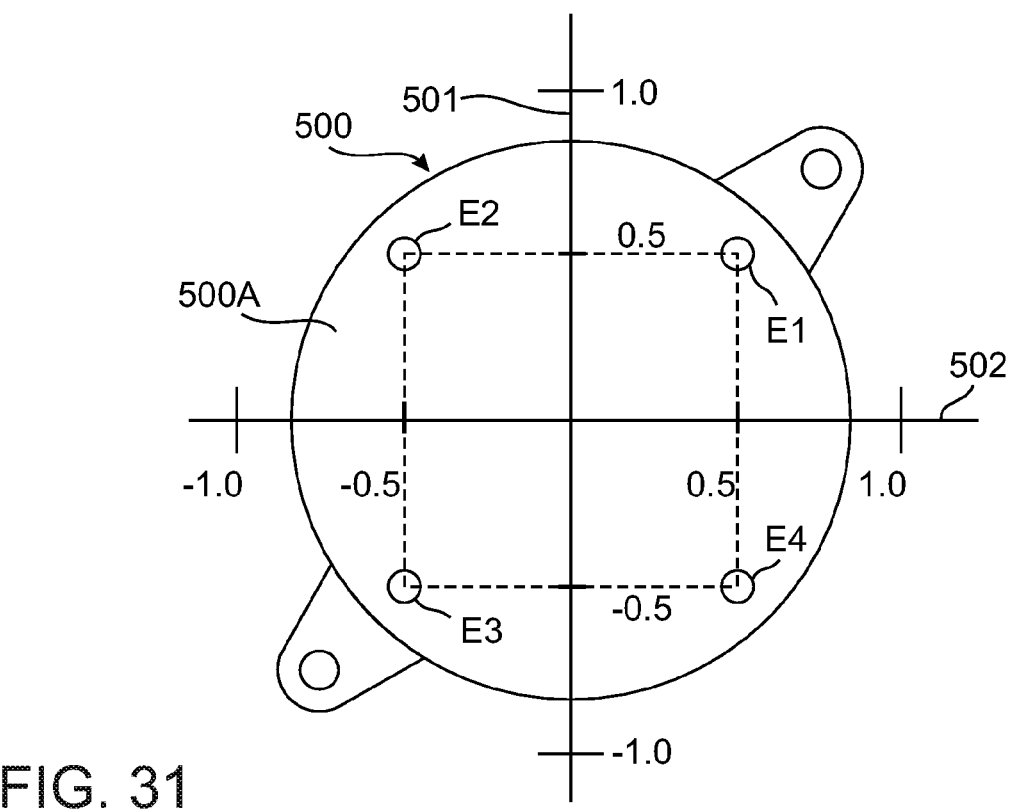
FIG. 31 is a schematic bottom view of an exemplary implantable sensing/stimulating device illustrating the placement of four sensing electrodes $E_1$, $E_2$, $E_3$ and $E_4$ arranged in a square pattern to record electrical signals over a region of the cortex.

Reference is now made to FIG. 31, which is a schematic bottom view of an exemplary implantable sensing/stimulating device illustrating the placement of four sensing electrodes $E_1$, $E_2$, $E_3$ and $E_4$ arranged in a square pattern to record electrical signals over a region of the cortex.

It is noted that only the sensing electrodes $E_1$-$E_4$ of the device 500 are shown in FIG. 31 and the stimulating electrodes of the device 500 are not shown for the sake of clarity of illustration. The stimulating electrodes may be any suitable stimulating electrodes, such as, for example, the stimulating electrodes of the devices 10, 450, 452 454, 456 458, 460, 462 and 464 (of FIGS. 5, 21, 22, 23, 24, 25, 26, 27 and 28, respectively). The stimulating electrodes (not shown) and/or the reference electrode of the device 500 may be shaped and arranged in any of the forms disclosed and illustrated in FIGS. 4-5, 10-13 and 21-28 hereinabove, or of the implantable devices 700 and 800 of FIGS. 39 and 40, respectively. The axis 501 is the "y" axis and the axis 502 is the "x" axis of a Cartesian 2D coordinate system having its center-point (coordinates x=0 and y=0) at the center of the circular bottom of the implantable device 500. Where x and y are marked in units of cm. The center of electrode $E_1$ is located at Cartesian coordinate (0.5, 0.5), the center of electrode $E_2$ is at (−0.5, 0.5), the center of electrode $E_3$ is at (−0.5, −0.5) and the center of electrode $E_4$ is at (0.5, −0.5). The electrode centers form a square pattern with 1 cm lengths on each side of the square.

The four spatially separated electrodes $E_1$-$E_4$ may be used to triangulate the location within the general surface area that should be stimulated based on brain network topography by computing for each of the electrodes the scalar magnitude of certain network biomarkers. For example, centering the device 500 over the DLPFC, the relative brain activity power of both the Theta (4-8 Hz) and Alpha (8-15 Hz) frequency bands in all four electrodes $E_1$, $E_2$, $E_3$ and $E_4$ may be measured. Since the DAN network has significant power in the Alpha band and the DMN network has significant power in the Theta band, the electrode with largest anti-correlation (e.g. difference in power) between the power in the two bands is closest to the optimal stimulation location. To calculate the difference in power in an electrode $E_n$ (where for the specific example of the device 500 that has four recording electrodes n is an integer in the range=1-4), we may take the absolute value of difference in the power (in electrode $E_n$) in the alpha band and in the theta band (recorded simultaneously for the same time period in the same electrode $E_n$). Mathematically, this may be calculated according to equation 5:

$$\Delta P_n = |P_{n,\alpha} - P_{n,\theta}|/A \qquad \text{Equation 5}$$

Wherein, $\Delta P_n$ is the normalized power difference between the Alpha band and Theta band for electrode $E_n$, $P_{n,\alpha}$ is the power in the Alpha frequency band recorded for electrode $E_n$, $P_{n,\theta}$ is the power in the Theta frequency band recorded for electrode $E_n$, and A is a normalization factor that scales the relative power differences across all electrodes.

For example, the normalized alpha-theta power difference for the electrode $E_1$ will be $\Delta P_1 = |P_{1,\alpha} - P_{1,\theta}|/A$ Furthermore, by weighting each electrode location by its power difference values and spatially averaging them, a linear prediction of the actual optimal location for stimulation between the four electrodes may be identified. Calculating the x coordinate may be performed using equation 6:

$$x = \Delta P_1 * 0.5 - \Delta P_2 * 0.5 - \Delta P_3 * 0.5 + \Delta P_4 * 0.5 \qquad \text{Equation 6}$$

calculating the y coordinate may be performed using equation 7:

$$y = \Delta P_1 * 0.5 + \Delta P_2 * 0.5 - \Delta P_3 * 0.5 - \Delta P_4 * 0.5 \qquad \text{Equation 7}$$

The computed x and y values of equations 6 and 7, respectively represent the location of the centroid of the region with peak power difference between the alpha band power and theta band power, which is the point where cortical stimulation should be applied.

It is noted that, while the above equations make use of the alpha/theta power difference biomarker for calculating the centroid of the region that needs to be stimulated, the centroid may be computed using alternative biomarkers. For example, the measured Alpha/Theta band power ratio $P_R$ may be used as the biomarker using the following equations 8-10:

$$P_{Rn} = B(P_{\alpha,n}/P_{\theta,n}) \qquad \text{Equation 8}$$

Wherein, $P_{Rn}$ is the normalized alpha/theta power ratio for electrode n, $P_{\alpha,n}$ is the power in the alpha band for electrode n, $P_{\theta,n}$ is the power in the alpha band for electrode n, and B is a normalization factor that scales the relative power ratios across all electrodes.

For the exemplary device 500, the (x,y) coordinates of the centroid of the region to be stimulated are computed using the following equations 9 and 10:

$$x = \Delta P_{R1} * 0.5 - P_{R2} * 0.5 - P_{R3} * 0.5 + P_{R4} * 0.5 \qquad \text{Equation 9}$$

$$y = P_{R1} * 0.5 + P_{R2} * 0.5 - P_{R3} * 0.5 - P_{R4} * 0.5 \qquad \text{Equation 10}$$

Alternatively and/or additionally, it may be possible to use the calculated relative gamma/theta power ratio of all the electrodes to calculate the centroid of the region to be stimulated using the following equations 11-13:

$$P_{RELn} = CP_{\alpha,n}/(P_{\alpha,n} + P_{\theta n})$$

Wherein, $P_{RELn}$ is the normalized alpha/theta relative power ratio for electrode n, $P_{\alpha,n}$ is the power in the alpha band for electrode n, $P_{\theta,n}$ is the power in the alpha band for electrode n, and C is a normalization factor that scales the relative power ratios across all electrodes.

The (x,y) coordinates of the centroid of the region to be stimulated are computed using the following equations 12 and 13:

$$x = P_{REL1} * 0.5 - P_{REL2} * 0.5 - P_{REL3} * 0.5 + P_{REL4} * 0.5 \qquad \text{Equation 12}$$

$$y = P_{REL1} * 0.5 + P_{REL2} * 0.5 - P_{REL3} * 0.5 - P_{REL4} * 0.5 \qquad \text{Equation 13}$$

Alternatively and/or additionally, it may be possible to use the calculated gamma band relative power values of all the electrodes as the biomarker to calculate the centroid of the region to be stimulated using the following equations 11-13:

$$P_{REL\gamma n} = DP_{\gamma,n}/P_{T,n} \qquad \text{Equation 14}$$

Wherein, $P_{REL\gamma n}$ is the normalized Gamma band relative power for electrode n, $P_{\gamma,n}$ is the power in the Gamma band for electrode n, $P_{T,n}$ is the total power in the entire measured range of frequencies for electrode n, and D is a normalization factor that scales the relative power ratios across all electrodes.

For example, $P_{T,n}$ could be the total power in the frequency range of 1-150 Hz.

The (x,y) coordinates of the centroid of the region to be stimulated are computed using the following equations 15 and 16:

$$x = P_{REL\gamma 1} * 0.5 - P_{REL\gamma 2} * 0.5 - P_{REL\gamma 3} * 0.5 + P_{REL\gamma 4} * 0.5 \qquad \text{Equation 15}$$

$$y = P_{REL\gamma 1} * 0.5 + P_{REL\gamma 2} * 0.5 - P_{REL\gamma 3} * 0.5 - P_{REL\gamma 4} * 0.5 \qquad \text{Equation 16}$$

There are other frequency bands (for example, Beta and Gamma frequency bands) that can also be used as biomarkers to identify network stimulation locations. All that is needed is to replace the scalar frequency band power difference values at each electrode (AP) with the new beta or gamma power difference, or relative power, or power ratio.

Preferably, but not obligatorily, the biomarker that may be used to assess the patients mood from the data recorded by recording electrode(s) is the power changes in theta and alpha rhythms. An advantage of using the theta rhythm is that it is accessible in cortical recordings in the lateral frontal cortical regions that are accessible to cortical stimulation by the implantable devices of the present application, and likely represents activity associated with the default mode network.

Likewise, in addition to band power, band phase and its interaction with band power (e.g. phase amplitude coupling) can be used as biomarkers to track brain network locations under a recording array of multiple electrodes over the brain.

Methods for computing phase amplitude coupling from the electrical signals recorded by recording electrodes are disclosed in detail in a paper by Samiee and Bailet entitled "Time-resolved phase-amplitude coupling in neural oscillations" published in NeuroImage, Vol 159, pp 270-27, (2017), incorporated herein in its entirety for all purposes.

Briefly, time resolved phase amplitude coupling [tPAC] is the modulation of the amplitude ($A_{fa}$) of an oscillatory rhythm (e.g. gamma band) of frequency $f_a$ by the phase of a slower rhythm (e.g. beta) $f_b$. Where $f_b < f_a$. The procedure for computing the value of [tPAC] from the electrical signal recorded by a recording electrode is performed as follows:

1. The recorded Electrophysiological signal (x(t)) is bandpass filtered around $f_a$
2. The envelope of the bandpass filtered signal is extracted via Hilbert transform on a short temporal window that slides along the envelope.
3. The power spectrum of the original signal (x(t)) in the same time window is estimated and its phase at the desired lower frequency ($f_b$) estimated.
4. For each time point, the amplitude of the fast-oscillation envelope and the instantaneous phase of the slow oscillation are reported using polar vector.
5. The Euclidean norm of the summed vectors averaged over an integer multiple of $f_b$ cycles is a scalar measure of phase-amplitude coupling strength.

Once the scalar magnitude of the phase-amplitude coupling is known for each electrode of the recording electrodes, the centroid may be computed.

For example, for the device 500, the (x,y) coordinates of the centroid of the region to be stimulated are computed using the following equations 17 and 18:

$$x = [tPAC1]*0.5 - [tPAC2]*0.5 - [tPAC3]*0.5 + [tPAC4]*0.5 \quad \text{Equation 17}$$

$$y = [tPAC1]*0.5 - [tPAC2]*0.5 - [tPAC3]*0.5 + [tPAC4]*0.5 \quad \text{Equation 18}$$

where [tPACn] is the computed magnitude of the phase-amplitude coupling for recording electrode n.

It is noted that while the symmetrical recording electrode arrangement of the implant device 10 is convenient, it is by no means obligatory. Rather, other non-symmetrical recording electrode arrangements are also possible as long as the x,y coordinates of the centers of the electrodes (for planar electrodes) are known for each electrode.

Figure 32:
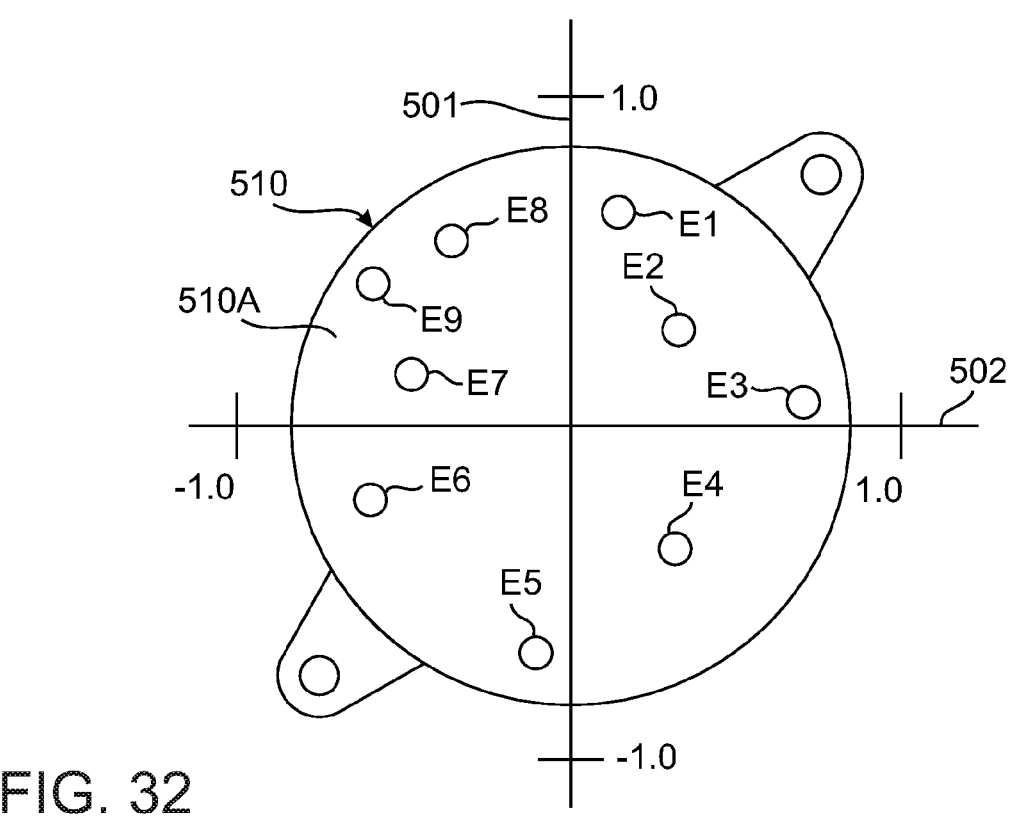
FIG. 32 is a schematic bottom view of an exemplary implantable sensing and stimulating device having a non-symmetrical and non-uniform distribution of nine similarly shaped recording electrodes usable for recording electrical signals over a region of the cortex in accordance with some embodiments of the implantable devices and systems of the present application.

Reference is now made to FIG. 32, which is a schematic bottom view of an exemplary implantable sensing and stimulating device having a non-symmetrical and non-uniform distribution of nine similarly shaped recording electrodes usable for recording electrical signals over a region of the cortex in accordance with some embodiments of the implantable devices and systems of the present application.

The implantable device 510 includes nine recording electrodes $E_1$-$E_9$. It is noted that only the recording electrodes $E_1$-$E_9$ of the device 510 are shown in FIG. 32 and the stimulating electrodes of the device 510 are not shown for the sake of clarity of illustration (The stimulating electrodes may be any suitable stimulating electrodes, such as, for example, the stimulating electrodes of the devices 10, 450, 452 454, 456 458, 460, 462 and 464 (of FIGS. 5, 21, 22, 23, 24, 25, 26, 27, and 28, respectively), or of the devices 700 and 800 of FIGS. 39 and 40 respectively). The stimulating electrodes (not shown) and/or the reference electrode of the device 500 may be shaped and arranged in any of the forms disclosed and illustrated in FIGS. 4-5, 10-13 and 21-28 hereinabove. The axis 501 is the "y" axis and the axis 502 is the "x" axis of a Cartesian 2D coordinate system having its center-point (coordinates x=0 and y=0) at the center of the circular bottom of the implantable device 510. Where x and y are marked in units of cm. The x,y coordinates of the center of each electrode of the electrodes $E_1$-$E_9$ are all known. The electrodes $E_1$-$E_9$ may be used to perform recording of electrical cortical signals as detailed hereinabove for the recording electrodes $E_1$-$E_4$ of the device of FIG. 31. Any of the biomarkers or biomarker combinations disclosed hereinabove may be computed for each one of the electrodes $E_1$-$E_9$ as disclosed in detail hereinabove.

The computation of the biomarker magnitude centroid x, y coordinates may be computed using the following equations 19 and 20:

$$x = \sum\nolimits_{1-9}^{n} BMn * Cn \quad \text{Equation 19}$$

Wherein,

BMn is the scalar value of the biomarker computed for electrode n, and

Cn is a constant representing a weighting factor determined by the x,y coordinates value of the recording electrode n.

$$y = \sum\nolimits_{1-9}^{n} BMn * Dn \quad \text{Equation 20}$$

Wherein,

BMn is the scalar value of the biomarker computed for electrode n, and

Dn is a constant representing a weighting factor determined by the x,y coordinates value of the recording electrode n.

Cn and Dn, are different position dependent weighting factors. If there are more recording electrodes on the positive side of the x-axis, Cn will weight each electrode's response, such that it is balanced on both sides of the x-axis.

$$\left( \text{i.e. } \sum\nolimits_{1}^{n} C_n * x_n = 0 \right).$$

Similarly, Dn will balance the responses about the y-axis).

Methods for Computing Stimulation Target Shape and Size Parameters

While the above disclosed computational methods are used to determining the centroid point of the region to be stimulated, more complex non-linear triangulation techniques may be used to compute not only the centroid point for the stimulation target but also its shape and size. For example, fitting the electrical biomarker data from all recording electrodes with a 2D Gaussian would yield both the centroid location and the size of the area to be stimulated. This can be mathematically computed by using equation 21 below:

$$P(x, y) = Ae \frac{-\left((x-x_0)^2 + (y-y_0)^2\right)}{2\sigma^2} \quad \text{Equation 21}$$

Where P(x,y) is the biomarker measured at each electrode location x and y, A represents the peak scalar value of the chosen biomarker and $\sigma$ represents the spatial extent of the Gaussian bell curve in units of cm. The x and y variables are the spatial 2D coordinates of the center of each individual electrode while $x_0$ and $y_0$ are the location of the Gaussian central peak. The $\sigma$ parameter is the standard deviation or the width of the Gaussian function in cm. It determines how wide the biomarker is spread across the cortex and would determine the total area needing stimulation (i.e. $\sigma^2$). Of course, since the stimulation targets (the region of the DAN network) are not necessarily just circular regions on the brain so other non-linear functions can be used to similarly but more accurately fit the data. The optimal target for stimulation may be more ellipsoid in shape or a more complex shape such as a curved ellipsoid (such as, for example the curved ellipsoidal current density contours illustrated in the simulations of FIGS. 14 and 16).

Once the appropriate stimulation location and/or shape and/or size has been identified using the recording electrode locations and their associated biomarkers as disclosed in detail hereinabove, the current steering methods disclosed hereinabove may be used to more accurately target the area to be activated (for example the DAN) or inactivated (for example the DMN). Over time, if the location and/or shape of the target region changes in an individual patient, the recording electrode array may be used to track such changes and update the stimulation parameters to more accurately target stimulation therapy.

Exemplary, Recording Parameters

For example, in a typical patient, recording periods in the range of 10-15 minutes may be used for recording the electrical signals in electrodes E1-E4. After the sensing/recording time period is terminated, the relevant biomarker values for each of the electrodes are computed (for example, by the controller/processor 140 of the ECM 28 (of FIG. 7), or the processor 208 of the external device 202 of FIG. 8), or by the remote server 12 of the system 200 of FIG. 34 hereinafter using cloud processing, or by the remote clinical workstation 13 of the system 200, or by the personal computer 15 of the system 200) to compute the biomarker values for each electrode. The x-y coordinate values of the centroid of the stimulation target are then computed (for example, by using equations 6 and 7, or 9 and 10, or 12 and 13, or 15 and 16 or 17 and 18, depending on the biomarker(s) selected for use).

The recording time periods may be intermittently used. For example, a recording time period having a duration of 5-10 minutes may be performed every 30 minutes. However different values of recording period duration and frequency may be used depending, inter alia, on the biomarker selected for use, the specific rate of target shift detected in a specific patient, the duration and form of the therapeutic stimulation selected.

However, in some embodiments of the methods of the present application, in which prescribed stimulation sessions having a prescribed session duration are periodically delivered to the patient, a single cortical recording time period having a duration in the range of 5-10 minutes may precede the stimulation session prescribed time, in order to enable the method to determine the spatial parameters (x-y coordinates of the centroid and/or size and/or shape parameters of the stimulation target), such as, for example the DAN in a depression patient. After such a single recording time period, the system may evaluate the collected data to determine whether the stimulation session needs to be delivered or may be skipped (see, for example, the method illustrated in FIGS. 38A-38B, hereinafter).

Exemplary Stimulation Parameters

Stimulation may be current-controlled (voltage will depend upon impedance of electrodes and tissue which will vary from patient to patient). Expected current amplitudes will typically range from 1-10 mA for intra-calvarial implanted devices (such as, for example the ICI 10) and may be in the range of 10-20 mA for devices implanted between the scalp and the calvarial bone (such as, for example, the implantable device 400 of FIG. 30), but in some embodiments the current amplitudes may be higher or lower than the above indicated typical amplitude ranges. Stimulation current pulse widths may typically be in the range of 100 microseconds to 1 millisecond, however, in some embodiments the pulse width may extend beyond this typical range. Stimulation pulse waveforms may be charge-balanced and pulse frequencies may typically be in the range of 5 Hz-100 Hz. Based upon known TMS efficacy, theta burst stimulation is expected to be most effective, which consists of a train of about 3-5 pulses delivered at a frequency of about 50 Hz and repeated about 5 times per second. Based upon the current implant design parameters, voltage excursions are expected to be within +/−20V for all electrodes, but could be higher in some embodiments of the implants. Some stimulation parameters that may be adjusted include anodic pulse amplitude, cathodic pulse amplitude, anodic pulse duration, cathodic pulse duration, inter-pulse interval, frequency of pulses within a pulse train, the number of pulses in a train, the frequency of trains (the intervals between trains), and the number of pulse trains.

In some embodiments, target stimulation may be applied in the time periods between the recording time periods. This method ensures that there are no electrical stimulation artifacts in the recorded sensed data. Alternatively, in cases where the device uses continuous recording of the electrical activity and stimulation is applied, the electrical stimulation artifacts may be eliminated or reduced by either discarding parts of the recorded data where the artifacts are present or by ensuring a sufficiently contiguous electrical sensing periods (with proper caution taken to avoid or reduce the introducing of spurious frequency content into the FFT results due to edge effects). The currently preferred method, is 10-15 minute recording followed by a prescribed stimulation period. However, in some embodiments of the methods and systems, a post-stimulation 10-15 minute recording period may be performed after each stimulation session.

Figure 33:
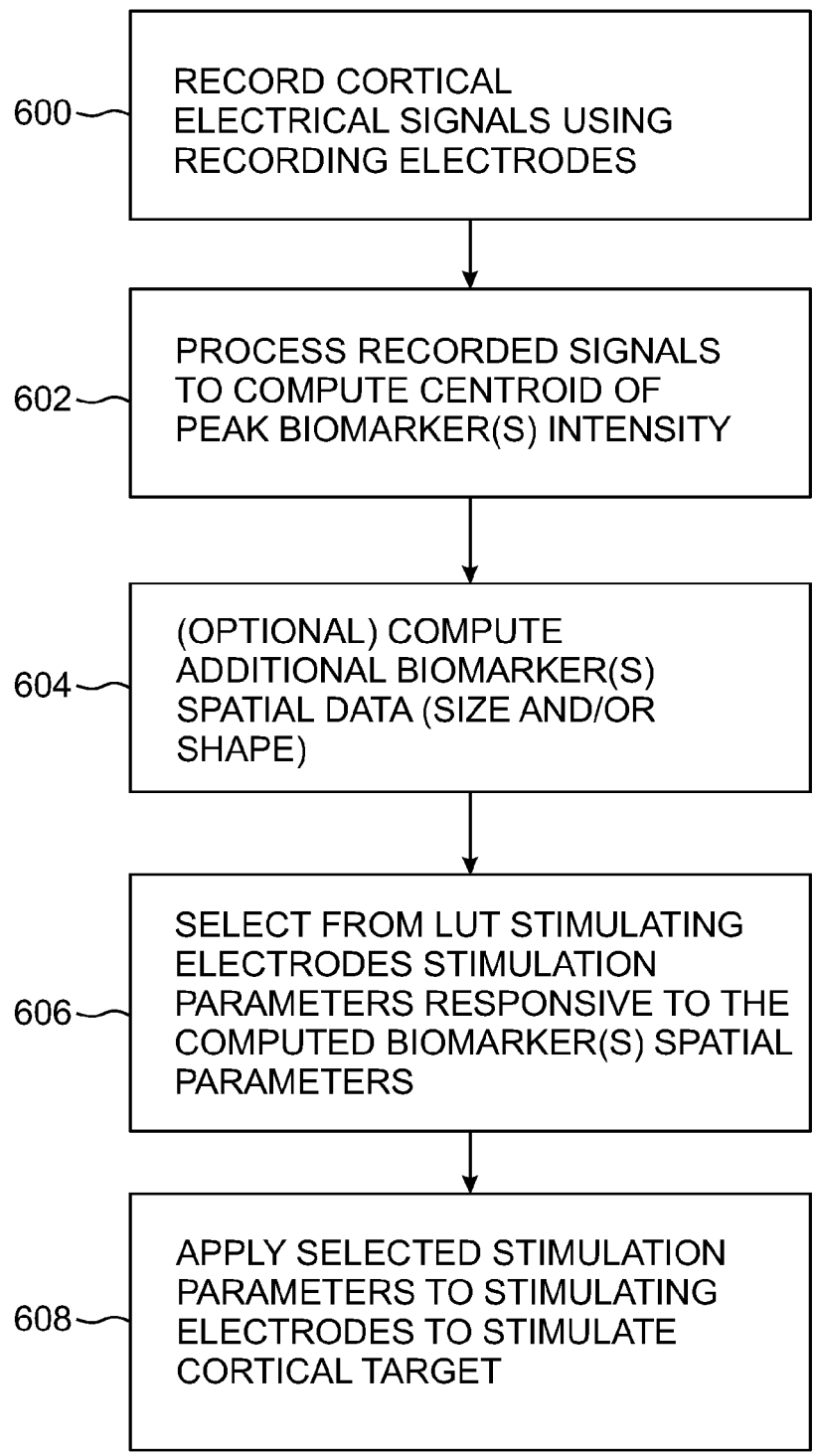
FIG. 33 is a schematic flow chart diagram illustrating the steps of a general method for tracking and stimulating a cortical stimulation target, in accordance with some embodiments of the methods of the present application.

Reference is now made to FIG. 33 which is a schematic flow-chart diagram illustrating the steps of a general method for tracking and stimulating a cortical stimulation target, in accordance with some embodiments of the methods of the present application.

The system (such as, for example the system 200 of FIG. 34 hereinafter) starts by recording cortical electrical signals using a plurality of recording electrodes (step 600). The recording electrodes may be any set or selected subset of recording electrodes, such as, for example, the recording electrodes illustrating in FIGS. 4, 5, 7, 21-28, and 31-32 hereinabove. However, any other type and arrangements of sensing/recording electrodes that is suitable for performing the triangulation and computation of the centroid a disclosed hereinabove may be used in the implantable devices, including, but not limited to some of the types and arrangements of electrodes of the intra-calvarial implants disclosed in International published applications WO/2019/130248 and WO/2020/161555.

The system then processes the recorded electrical signals to compute the x,y coordinates of the centroid indicative of peak intensity of the biomarker or biomarkers as disclosed in detail hereinabove (Step 602). The system may also (optionally) compute additional spatial data for the biomarker or biomarkers such as the shape and size of the biomarker intensity in the Cartesian coordinate system x,y (step 604). The system may then use the computed centroid and/or the other biomarker(s) spatial intensity data (if computed in step 604) for selecting from an LUT (stored in or available to the system) a matched set of stimulating electrode parameters to be applied to the stimulating electrodes of the implanted device step 606). Methods for performing the matching of the stimulation parameters to the computed biomarker(s) spatial data are disclosed in detail hereinafter. After the matched set of stimulation parameters is selected, the system may apply the selected set of parameters to the stimulating electrodes to electrically stimulate the cortical stimulation target (step 608).

It is noted that the method of FIG. 33 may be used to spatially track and deliver matched electrical stimuli to any cortical functional neural network that may have one or more characteristic biomarker(s) that may be computed from the recorded electrical signals obtained by a suitable set of recording electrodes.

In an exemplary specific non-limiting example, the method of FIG. 33 may be used to track and stimulate the DAN and/or the DMN, to deliver targeted electrical stimuli to the DAN and/or DMN in a depressed patient. In some embodiments, the matched stimuli may be delivered as excitatory electrical stimuli to the DAN to activate the DAN, in some other embodiments the stimuli may be delivered as inhibitory electrical signals for deactivating the DMN. In some other embodiments the system may deliver stimulatory electrical signals to activate the DAN and inhibitory electrical signals for deactivating the DMN (by either using the same single implanted device or by using two separate implanted devices (not shown in FIG. 34 herein below but possible in some embodiments of the system 200 having two implantable devices, or, in some embodiments of the system more than two implantable devices implanted in the head of one patient).

Figure 34:
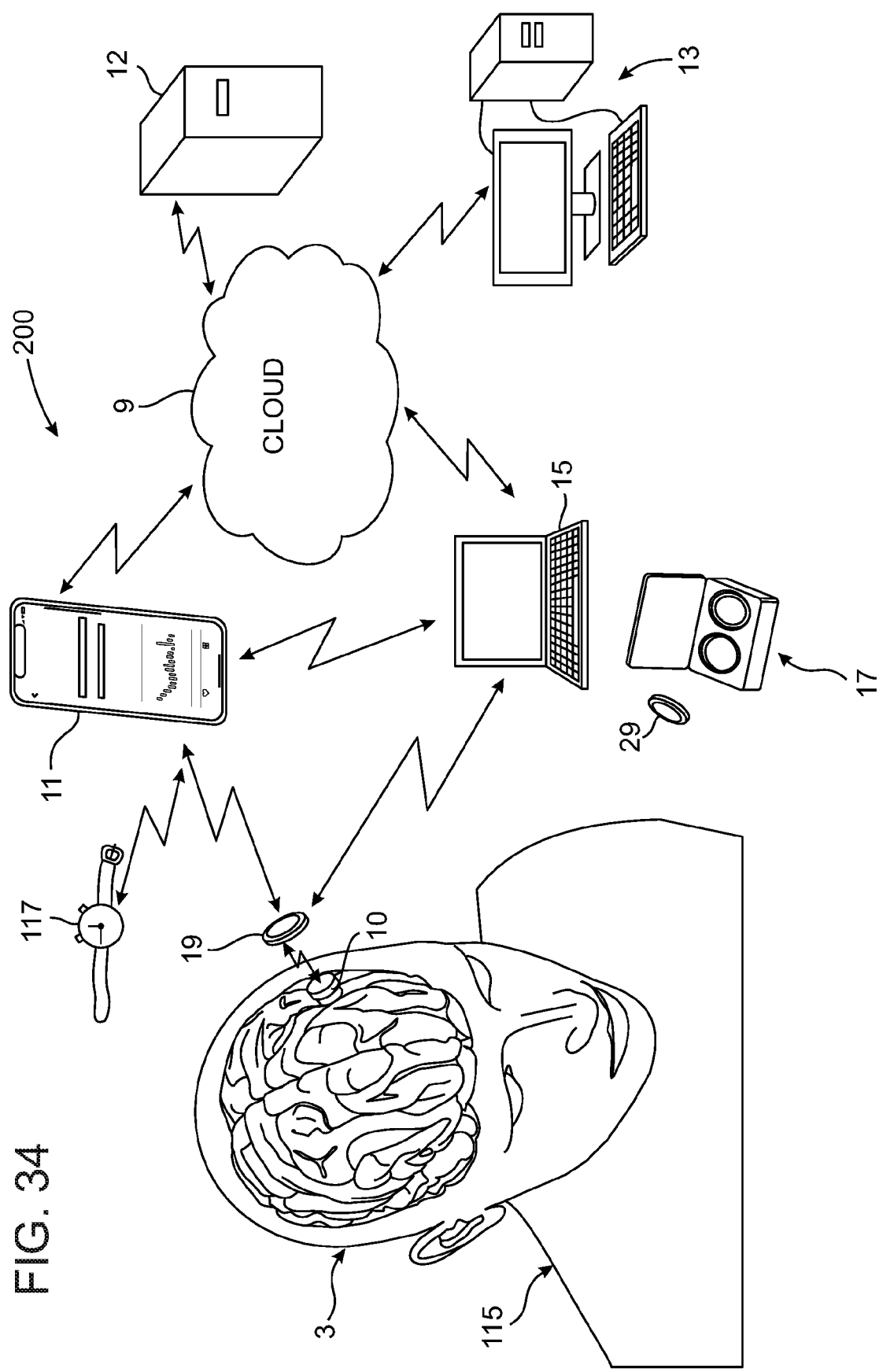
FIG. 34 is a schematic pictorial diagram illustrating some possible components of a system for tracking and stimulating a cortical electrical stimulation target in a depressed patient.

Reference is now made to FIG. 34 which is a schematic pictorial diagram, illustrating some possible components of a system for tracking and stimulating a cortical electrical stimulation target in a depressed patient.

The system 200 may include the implantable device 10 (of FIGS. 1-6) implanted in the calvarial bone of the head 3 of a patient 115 suffering from a mood disorder (such as, for example, depression). However, the implantable device (or devices) of system 200 may also be any of implantable devices disclosed in the present application or disclosed in International published applications WO/2019/130248 and WO/2020/161555.

The system 200 may also include a detachably attachable magnetic wirelessly energizing pod 19 for wirelessly providing electrical energy to the implanted device 10. In some embodiments, the pod 19 may also be configured to bi-directionally wirelessly communicate with the implanted device 10 and may relay data, status signals and commands signals from and to the implantable device 10 to one or more of the other components included in the system 200. The system 200 may also include a smartphone 11, a wearable smart watch 117, a personal laptop 11, a remote server 12 and a remote clinical workstation 13.

The system may also include a wireless charging device 17 that may be used for wirelessly charging a power source (not shown in FIG. 34 for the sake of clarity of illustration) included in the pod 19. The system may (optionally) include one or more additional pods 29 which may be used instead of the pod 19 if it is not charged or if it malfunctions.

The smartphone 11 may be any type of suitable smartphone and may have an application installed therein operating thereon for obtaining ecological momentary mood assessment (EMA) data of the patient 115 and for wirelessly communicating the EMA data to one or more of the pod 19, the personal laptop 15, the remote server 12 or the remote clinical workstation 13, or to any selected combination thereof, depending on the particular configuration and combination of the components included in different embodiments of the system 200. The smartphone 11 may also be used to enable the system 200 to communicate with the patient 115. For example, the system may notify the patient 115 that it is the prescribed stimulation time and that the patient 115 should attach the pod 19 to the scalp region above the implanted device 10. Such notification may be performed by any suitable means, such as, for example by using either a telephone call, or a voice message or a text message or a suitable audio signal (such as, for example, a beep, or a musical tune, a predetermined ringtone or any other suitable auditory and/or visual signals or combinations thereof).

The (optional) smartwatch 117 may be any type of smartwatch that has the capability to sense and record one or more physiological parameter of the patient 115, when the patient 115 wears the smartwatch 117. For example, the smartwatch 117 may be able to record the heart rate (HR) of the patient 115 or other physiological parameters of the patient 115 that may be indicative of or may be correlated to the mood of the patient 115. The smartwatch 117 may wirelessly communicate with the smartphone 117 that may receive the heart rate data from the smartwatch 117. The smartphone 11 may have a suitable application installed therein that may use the HR data to compute the heart rate variability (HRV) of the patient 115. The HRV parameter is known to be correlated with the severity of depressed mood of depressive patients.

For example, a review article by Andrea Sgoifo, Luca Carnevali, Maria de los Angeles Pico Alfonso, and Mario Amore, entitled "Autonomic dysfunction and heart rate variability in depression" published in *Stroke* (2015, Vol 18(3): pp 343-352) describes a correlation between HRV and the mood of depressive patients. Another review paper by Paniccia et al. entitled "Clinical and non-clinical depression and anxiety in young people: A scoping review on heart rate variability", published in *Autonomic Neuroscience: Basic and Clinical* (2017, Vol 208: pp. 1-14) concluded that "Changes in HRV were found across the spectrum of clinical and non-clinical populations of young people with depression or anxiety."

It is noted that methods for collecting EMA data are not the subject matter of the present application, are known in the art and are therefore not described in detail herein.

Briefly, EMA data may be collected using the smartphone 11 of the system 200 as described in detail in international published application WO/2019/244099 and the references cited therein which are incorporated herein by reference in their entirety for all purposes.

Methods, programs and devices for collecting depressive state correlated EMA data are disclosed in detail in the following references:
1) Published international application WO/2019/244099.
2) Robert LiKamWa, Yunxin Liu, Nicholas D. Lane and Lin Zhong entitled "MoodScope: Building a Mood Sensor from Smartphone Usage Patterns", published in MobiSys'13, June 25-28, 2013, Taipei, Taiwan.

In some embodiments of the system 200 that include the smartwatch 117 capable of recording the heart rate of the patient 115, the HRV parameter may be used by the system 200 to control the stimulation of the cortical tissues by the implanted implantable device 10, as will be described in detail with respect to the method illustrated in FIGS. 38A-38B hereinafter.

In some embodiments of the system 200, the smartwatch 117 may be capable of computing the HRV from the HR measurements and to wirelessly communicate the HRV data to one or more of the pod 19, the personal laptop 15, the remote server 12 and the clinical workstation 13. The HRV data may then also be used to control the stimulation of the cortex by the stimulating electrodes of the implantable device 10 as disclosed in detail in the method illustrated in FIGS. 38A-38B hereinafter.

It is noted that not all the components illustrated in FIG. 34 need to be included in the system 200. For example, the personal laptop 15 is optional and is not an obligatory component of the system 200, because some or all of the computations of the system may be performed by either the remote server 12 (using cloud processing), or by the clinical workstation 13 or by both the remote server 12 and the clinical workstation 13. Similarly, in some embodiments of the system 200 in which no EMA data needs to be collected, the smartphone 11 may not be included in the system. As the smartphone 11 may also be needed for communicating messages and/or notifications from the system 200 to the patient 115, in embodiments in which EMA data is not needed or not used, it is possible to replace the smartphone 11 by any other suitable device that has wireless communicating capabilities, such as, for example a pager or any other suitable hand held or wearable communication device known in the art (not shown in FIG. 34). Such communication devices may communicate with the patient 115 using beeps or any other auditory and/or visual signals or audio/visual signal combination.

The remote server 12 of the system 200 may wirelessly receive data, from the implantable device 10 (for example, over the internet using Wi-Fi and/or any desired internet communication protocols such as, for example, TCP/IP or any other wireless communication means and protocols) and may process the received data. The data received from the implantable device 10 may be wirelessly relayed from the implant 10 to the pod 19 and from the pod 19 to the smartphone 11 or (optionally) to the personal laptop 15 and may be communicated over the internet to the remote server 12 and/or to the clinical workstation 13.

The smartwatch 117 is also an optional component and may not be included in embodiments of the system 200 that do not make use of HRV data to control the cortical stimulation.

In some embodiments of the system 200, the pod 19 may have integrated Wi-Fi communication circuitry (not shown in FIG. 34) and may directly wirelessly relay data from the implantable device 10 over the internet (World Wide Web) to the remote server 12 and/or to the clinical workstation 13 (depending on the configuration of the system 200). The remote server 12 and/or the clinical workstation 13, or both, may process the received data to perform the necessary computations described in steps 602, 604 and 606 of the method illustrated in FIG. 33 and described hereinabove.

The selected stimulation parameter set computed in step 606 by the remote server 12 or the clinical workstation 13 or both, may then be wirelessly communicated back to the implantable device 10 either directly or by relaying it through the pod 19 or through the smartphone 11 or through the personal laptop 15 (depending, inter alia, on what components are included in the particular configuration of the system 200, and on the particular wireless capabilities integrated into each of the components, such as the implantable device 10, the pod 19, and the personal laptop 15).

It is noted that many possible different configurations of the system 200 may be implemented and used, depending on the processing power and/or on the communication capabilities available to each of the components disclosed herein. Typically, (but not obligatorily) due to the limited space available within the implantable device 10 (or within other embodiments of the implantable device used in the system) and to limited data storage capabilities and thermal management problems of the implantable device 10 and the pod 19, first generation system configurations may perform most or all the computational tasks involved in the method of FIG. 33 on the remote server 12 and/or in the clinical workstation 13 after wirelessly communicating the data recorded by the recording electrodes of the implantable device 10 either directly over the internet from the implantable device 10 to the remote server 12 (or the clinical workstation 13) or indirectly by relaying the recorded data through the pod 19 or the laptop 15, or through the smartphone 11.

However, as miniaturized processor technology progresses in the future, the processor/controllers of the implantable device 10 and/or the pod 19 or even of the smartphone 11 and the personal laptop 15 may have substantially improved processing power and memory capacity, and may assume all or at least some of the computational burden necessary to perform steps 602-606 of the method illustrated in FIG. 33, partially or completely obviating the need for performing cloud processing of data (by the remote server 12 and/or the clinical workstation 13).

However, even in such future generation systems in which all the computations are locally performed by system components (such as, for example, the implantable device 10, the pod 19, the smartphone 11 and the personal laptop 15 or by any selected combination thereof), there may still be a need for the remote server 12 and/or the clinical workstation 13. For example, the remote server 12 and/or the clinical workstation 13 may wirelessly receive (over the internet) relevant data from the system for storing in a database of the long term history of the operation of the system 200 for each individual patient. Such a database may record, inter alia, data representing the stimulation parameters used in each stimulation session on the patient 115, data representing the 2D location in the Cartesian coordinate system (x,y) of the computed centroid of the biomarker(s) peak intensity, the computed size and/or shape of the biomarker(s) intensity map computed using the linear Gaussian approximation method, EMA data obtained before the stimulation session, the HRV data obtained prior to a stimulation session, and any other clinically relevant data helpful to the psychiatrist or physician or caretaker monitoring the treatment of the patient 117.

This data stored in the historical database may enable the caretaker to follow up and supervise the effects of the therapeutic treatment of the patient 115 in order to assess therapeutic efficacy of the treatment over time. The clinical workstation 13 may also be used for presenting the data in graphical for use by the caretaker. Additionally, the clinical workstation 13 may be used by the caretaker or psychiatrist to remotely and wirelessly reprogram and change any selected parameters of the stimulation regime deliverable in stimulation sessions, to change or modify the efficacy of treatment, based on the historical database data, or during an initial stimulation fine-tuning time period that may enable the determining of individually tailored stimulation paradigms to each individual patient. For example, the caretaker may change any of the stimulation session parameters such as, for example, the anodic pulse amplitude, the cathodic pulse amplitude, the anodic pulse duration, the cathodic pulse duration, the inter-pulse interval within a pulse train, the frequency of pulses within a pulse train, the number of pulses in a pulse train, the frequency of trains (the intervals between trains), and the number of pulse trains delivered within a stimulation session.

Such individually tailored stimulation session parameters may be stored in the database and may be communicated, wirelessly and uploaded to the pod 19 or the smartphone 11 or the personal laptop 15 for wirelessly uploading to the implantable device 10 directly or through the pod 19.

Figure 35:
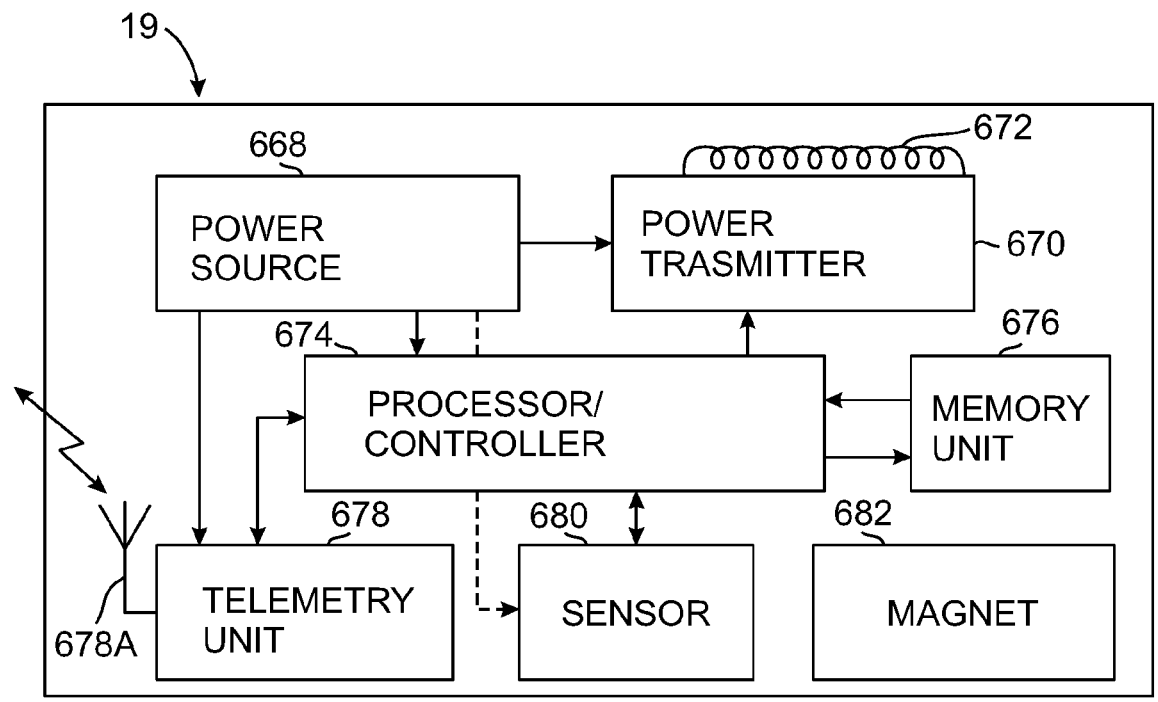
FIG. 35 is a schematic functional block diagram illustrating the components of a magnetic wirelessly energizing pod, in accordance with an exemplary embodiment of the pods usable in the systems of the present application.

Reference is now made to FIG. 35, which is a schematic functional block diagram illustrating the components of a magnetic wirelessly energizing pod, in accordance with an exemplary embodiment of the pods usable in the systems of the present application. The pod 19 may include a power source 668, a power transmitter 670 having an inductance coil 672, a processor/controller 674, a memory unit 676, a telemetry unit 678 having a telemetry antenna 678A, an (optional) sensor 680 and a magnet 682.

The processor controller 674 may be suitably connected to the power transmitter 670 for controlling the operation thereof. The processor controller 674 may also be suitably connected to the telemetry unit 678 and to the sensor 680 for controlling the operation thereof. The telemetry unit may have a suitable telemetry antenna (or multiple antennas) 678A suitably electrically connected thereto for wirelessly transmitting telemetry signals. The memory unit 676 is suitably connected to the controller/processor 674 and may serve to store data and temporary computational data during computations or during any of the control operations of the controller/processor 674. Similar to the controller/processor 140 of FIG. 7, in some embodiments of the pod 19, the memory unit 676 may alternatively be implemented as memory unit(s) integrated within the processor/controller 674.

The magnet 682 may be used for firmly attach the pod 19 to the scalp of the patient 115 by being attracted to another magnet attached to or included within the implantable device 10 (the magnet 34F of the implantable device 10 is not shown in detail in FIG. 34 but may be seen in FIGS. 1, 6, and 29). The magnets 34F and 682 may be annularly shaped magnets but other magnet shapes may be possible.

The power source 668 may be any suitable electrical charge storage device, such as, for example, a capacitor, a super capacitor, a battery, a rechargeable battery, a primary electrochemical cell, a rechargeable electrochemical cell of any suitable type or any other suitable charge storage device.

The power source 668 may be rechargeable. The power source 668 may be suitably electrically connected to the processor/controller 674, the telemetry unit 678, the power transmitter 670 and (optionally) to the sensor 680 for energizing these components. The power source 668 may be wirelessly charged by the wireless charging device 17 of FIG. 34 by placing the pod 19 on the wireless charging device 17. However, in some embodiments of the pod 19, the pod 19 may be charged by electrically connecting the pod 19 to a wired charger (not shown) through a suitable socket (not shown) such as for example a USB type socket that is connectable to a USB charger cable (not shown).

When the pod 19 is magnetically attached to the scalp by the force of attraction of the magnet 34F of the implanted device 10, the inductance coil 672 connected to the power transmitter 670 is aligned with the receiving inductance coil 55 (illustrated in FIG. 29) of the device 10. The pod 19 may then provide power to the device 10 by passing alternating current supplied by the power transmitter 670 through the inductance coil 672. The device 10 is energized by the electrical currents induced in the inductance coil 55 which may be rectified and conditioned to provide DC current to the components of the implanted device 10.

The sensor 680 of the pod 19 is a patient compliance sensor operable to detect whether the pod 19 has been properly attached to the patient's scalp in the correct position and alignment, to ensure that uninterrupted power is supplied to the implanted device 10 for the entirety of the prescribed stimulation session. The sensor 680 may be a passive or an active sensor and may provide a sensor status electrical signal to the processor/controller 674 if the pod 19 indicative that the pod 19 is properly attached to the scalp above the implanted device 10. If the pod 19 is removed from the scalp of the patient 115 or is misaligned relative to the implanted device 10, the sensor 680 may stop outputting the "pod attached" signal to the processor/controller 674 that may stop to telemetrically transmit a "pod attached" signal to the other components of the system 200 (such as, for example, the smartphone 11, and/or the personal laptop 15, and/or the to the remote server 12 (via the internet) and/or the clinical workstation 13 (via the internet), thus some or all the external components of the system 200 may remain updated of the pod 19 status (attached or not attached to the scalp). The sensor may be any type of suitable sensor, such as a magnetic sensor, an electrical contact sensor, a capacitive contact sensor a mechanical contact sensor, an electrical sensor or any other suitable type of sensor (or a combination of such sensors) capable of detecting detachment of the pod 19 from the scalp and/or (optionally) detecting a misalignment of the induction coils 672 and 55 with respect to each other. In some cases, data exchange between the implanted device 10 and the pod 19 may be used to determine if the pod 19 is properly attached to the patient's scalp either in addition to or in replacement of the sensor 680. In such case, a watchdog timer may be implemented in the pod 19 to detect a loss in communication between the implanted device 10 and pod 19 that would indicate that the pod 19 is not properly attached.

If the pod 19 is not initially correctly attached to the scalp of the patient, the sensor or watchdog timer outputs an electrical signal to the processor/controller 674 which in turn may control the telemetry unit 678 to wirelessly transmit a status signal to an external device disposed outside the body of the patient 115, such as, for example, one or more of, the smartphone 11, the personal laptop 15, the remote server 12 and the clinical workstation 13. The status signal (signifying that the pod 19 attachment was not detected) may indicate that the pod 19 is not properly placed on the correct scalp position, or that the patient 115 has not complied with the instruction to attach the pod 19 to the scalp, or that the pod 19 was intentionally or accidentally been misplaced on the scalp or detached from the scalp by accident. This signal may result in sending a notification to the patient 117 to attach the pod to the scalp. The notification may be delivered through the smartphone 11, or the personal laptop 15 or a pager (not shown) as disclosed hereinabove (by audio messages or audio-visual messages or by visual messages as was described in detail hereinabove) or by any other suitable way of notifying the patient 117 (for example, see the methods illustrated in FIGS. 37 and 38A-38B hereinafter, for more details).

Figure 36:
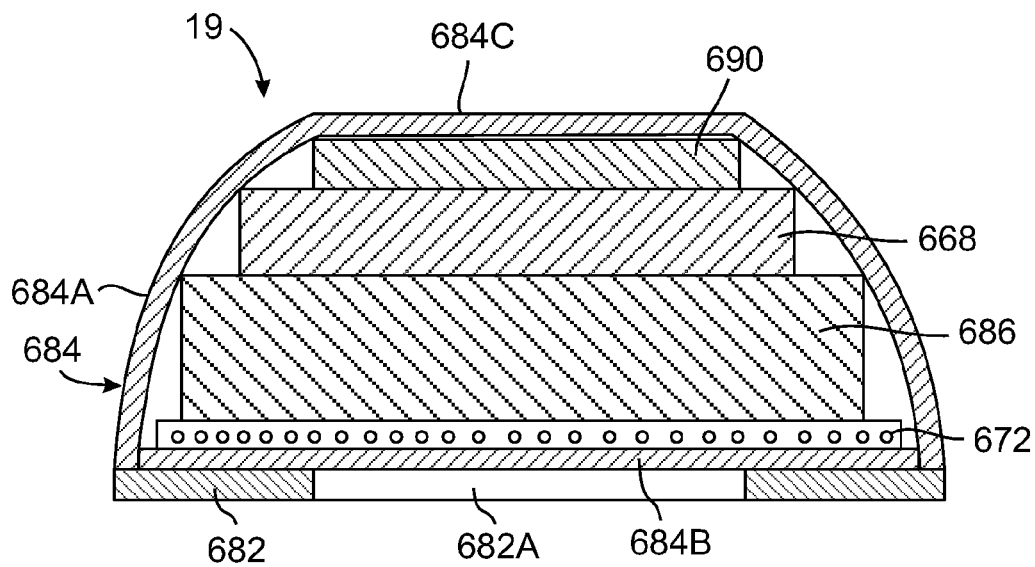
FIG. 36 is a schematic cross-sectional view illustrating an exemplary implementation of an embodiment of a wireless energizing pod usable in the system of FIG. 34.

Reference is now made to FIG. 36, which is a schematic cross-sectional view illustrating an exemplary implementation of an embodiment of a wireless energizing pod usable in the system of FIG. 34.

The pod 19 includes a housing 684, enclosing the inductance coil 672 therein. The pod 19 may also include an electronic circuitry module 684 that may include therein the sensor 680, the processor/controller 674, the memory unit 676 and the power transmitter 670. The pod 19 also includes the power source 668 (such as, for example, a rechargeable battery or a rechargeable electrochemical cell, as disclosed hereinabove). The pod 19 may also include within the housing 684 a printed circuit board (PCB) 690 that includes therein the telemetry unit 678 and a suitable telemetry antenna (not shown in detail).

It is noted that the electrical connections of the components within the ECM and or between the ECM and the power source 668 and the PCB 690 are not shown in FIG. 36 for the sake of clarity of illustration. These connections between the components of the pod 19 are better described in FIG. 35. It is also noted that the component implementation of the pod 19 illustrated in FIG. 36 is by no means obligatory, and different embodiments of the pod 19 may use quite different integrating schemes of the various functional and or physical components of the pod 19.

Furthermore, in some embodiments of the pod 19, the telemetry unit may use the inductance coil 672 of the power transmitter 670 as the telemetry antenna for transmitting telemetry data. This may be particularly implemented in pod embodiments in which the carrier frequency of the telemetry signal is significantly different from the frequency of the AC signal used by the power transmitter 670, allowing effective filtering of the broadcast electrical signals by the receiving device to isolate the telemetry frequencies from the AC frequency of the power transmitter 668.

The pod 19 also includes a magnet 682 that may be attached to the housing 684 (by gluing or welding or any other suitable attachment method), as illustrated in FIG. 36. The magnet 682 may be an annular magnet having an open passage 682A formed therein in order to enable a good inductive coupling between the inductance coil 672 and the inductance coil 55 of the implanted device 10 (not shown in FIG. 36). However, other magnet shapes and arrangements may be also used, depending, inter alia, on the material from which the magnet 682 is made. The magnet 682 may be made from any type of magnetic material, including but not limited to, a ceramic magnetic material such as Neodymium Iron Boron (NdFeB) magnetic material or Cobalt-Samarium based ceramic magnetic material, or any other type of suitable magnetic material. In some embodiments of the pod 19, the magnet 682 may be disposed within the housing 682 (such as, for example, above or below the inductance coil 672). It is noted that the housing 684 may be made from a strong, non-electrically conducting material, such as, for example a strong engineering polymer, or Teflon®, or high strength polyethylene, or polypropylene in order to allow the RF transmissions transmitted by the inductance coil 672 and or by the telemetry antenna 672 to pass through the housing 684. However, in some embodiments, at least some parts (such as for example, the side-walls 684A of the housing 684 may be made from a metallic material without excessively attenuating the signals transmitted by the induction coil 672 or by the telemetry antenna 678A.

For example, the top side 684C of the housing 684 and the bottom side 684B of the housing 684 may be made from an electrically non-conducting materials (such as, for example, a suitable polymer based plastic) while the side-walls 684A of the housing 684 may be made from a metallic electrically conducting material (such as, for example, stainless steel, aluminum or titanium).

It is noted that while the wireless magnetic pod 19 has many advantages, it is not obligatory to practicing the methods and implementing the systems of the present application. The system 200 may also make use of any other suitable wireless energizing pods or devices. For example, the system 200 may make use of the external inductance coil 60 disclosed in detail in International published application WO/2020/161555 and illustrated in FIGS. 15-16 of WO/2020/161555.

Figure 37:
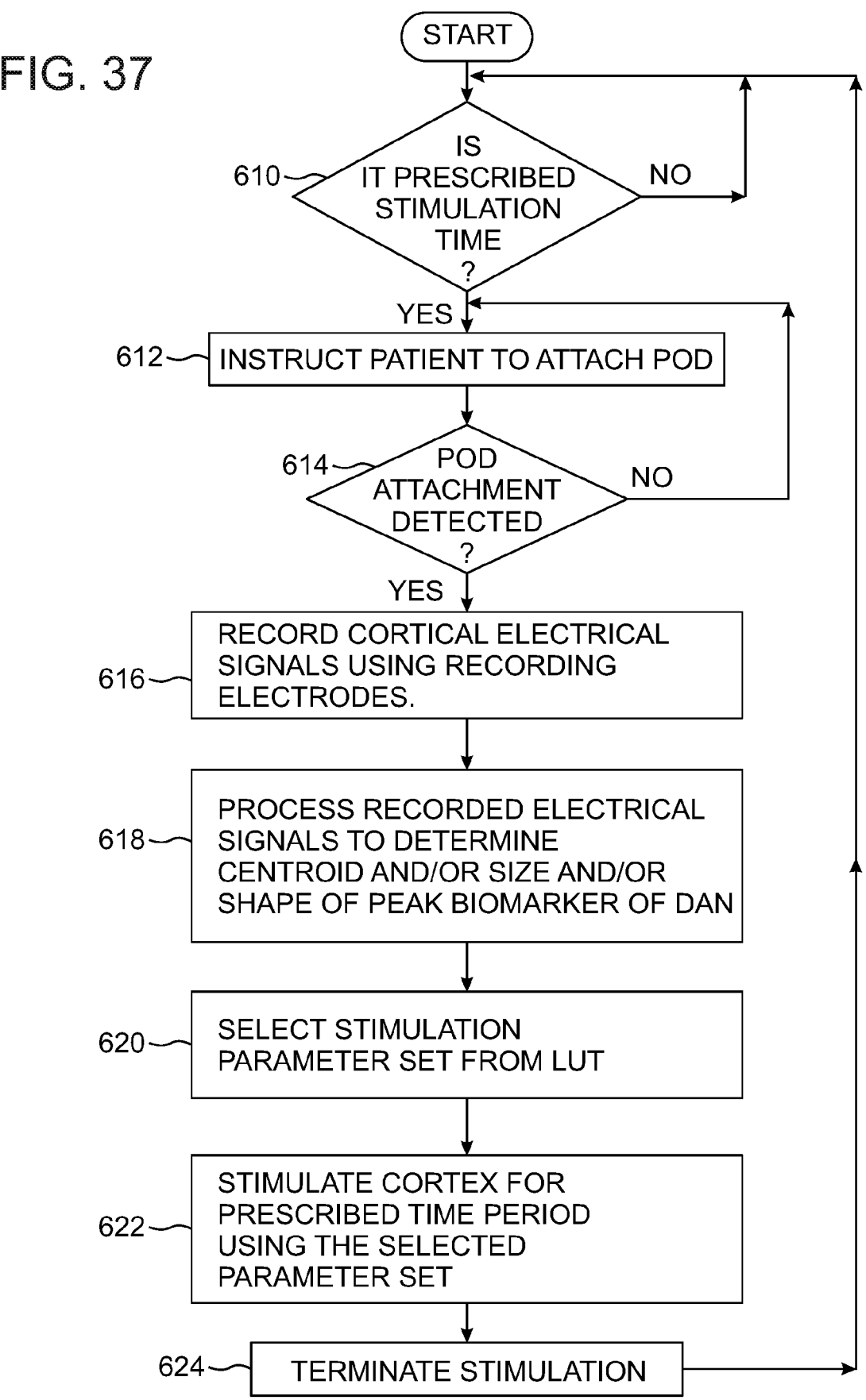
FIG. 37 is a schematic flow chart diagram, illustrating the steps of a method for tracking and targeting a cortical stimulation target, in accordance with some embodiments of the methods of the present application.

Reference is now made to FIG. 37 which is a schematic flow chart diagram, illustrating the steps of a method for tracking and targeting a cortical stimulation target, in accordance with some embodiments of the methods of the present application.

Typically, the system 200 may be programmed to periodically deliver electrical stimulation therapy to the patient 215. The duration of the stimulation session and the time interval between stimulation sessions may be determined by the caretaker or psychiatrist and uploaded to the necessary components of the system 200 (such as, for example, the personal laptop 15 or the smartphone 11, or the remote server 12 or the clinical remote workstation).

The method of FIG. 37 starts by checking if it is time for the prescribed for a stimulation session (step 610). If it is not the prescribed time, the method returns control to step 610. If the prescribed time for a stimulation session has been reached, the method instructs the patient 115 to attach the pod 19 to the scalp of the patient 115 above the implanted device 10 (Step 612). The method then checks if pod attachment has been detected (step 614). The checking may be performed by checking whether the sensor 680 of the pod 19 sends the signal indicative that the pod 19 is properly attached to the scalp as disclosed in detail hereinabove. If the pod 19 is not attached properly to the scalp of the patient 115, the method may return control to step 612 to instruct the patient 115 (again) to attach the pod 19. The notification may be done by the smartphone 11, or the personal laptop 15, or the smartwatch 117, or a pager (not shown) as disclosed in detail hereinabove. This notification cycle may be performed at predetermined prescribed time intervals (such as, for example, every two minutes, or any other suitable inter-notification time period) until patient compliance is achieved.

Alternatively, in some embodiments of the method, the method may counts the number of notifications sent to the patient 115 and if the patient 115 has not complied with instructions after a preset number of notifications or after a predetermined or preset time period after the prescribed time for starting the stimulation session, the method may then stop or terminate and may send a notification to the remote server 12 and to the clinical workstation 13 that may result in a warning notification being sent to the caretaker or psychiatrist indicating lack of patient compliance and failure to initiate the stimulation session. The caretaker or psychiatrist may then take any necessary steps to correct the situation.

If the method detects that the pod 19 is properly attached to the scalp of the patient 115, the method begins to record cortical electrical signals by using the recording electrodes of the implantable device 10 (step 616). The method then processes the recorded electrical signals as disclosed in detail hereinabove to determine the centroid and/or the size, and/or the shape of the peak biomarker of the dorsal attention network (step 618). The method then selects from the LUT stored in the remote server 12 or in the clinical workstation 13 or in the personal laptop 15 (or in any other suitable component of the system 200) a matched set of stimulation parameters to be used for stimulation of the cortical region under the implanted device 10 (step 620). The methods of selecting a matched set of stimulation parameters are disclosed in detail hereinafter. The method may then use the stimulating electrodes 30A-30D of the implanted device 10 to stimulate the cortex for the prescribed stimulation time period using the set of the matched stimulation parameter set selected from the LUT (step 622). After the prescribed stimulation time period has passed, the method terminates the stimulation (step 625) and returns control to step 610.

It is noted that the method of FIG. 37 is a method embodiment that delivers stimulation sessions at the prescribed time set by the caretaker or psychiatrist and will avoid initiating a stimulation session only if it is detected that the pod 19 is not properly attached to the scalp of the patient 115 for any reason (such as, for example, pod misalignment, patient non-compliance, pod accidentally detached from scalp, pod is discharged). However, more sophisticated closed loop control of stimulation delivery may be performed by the system 200 by using data representing various patient physiological and/or behavioral biomarker data indicative of patient's mood. Such exemplary biomarkers may be HRV and EMA data.

Figure 38A:
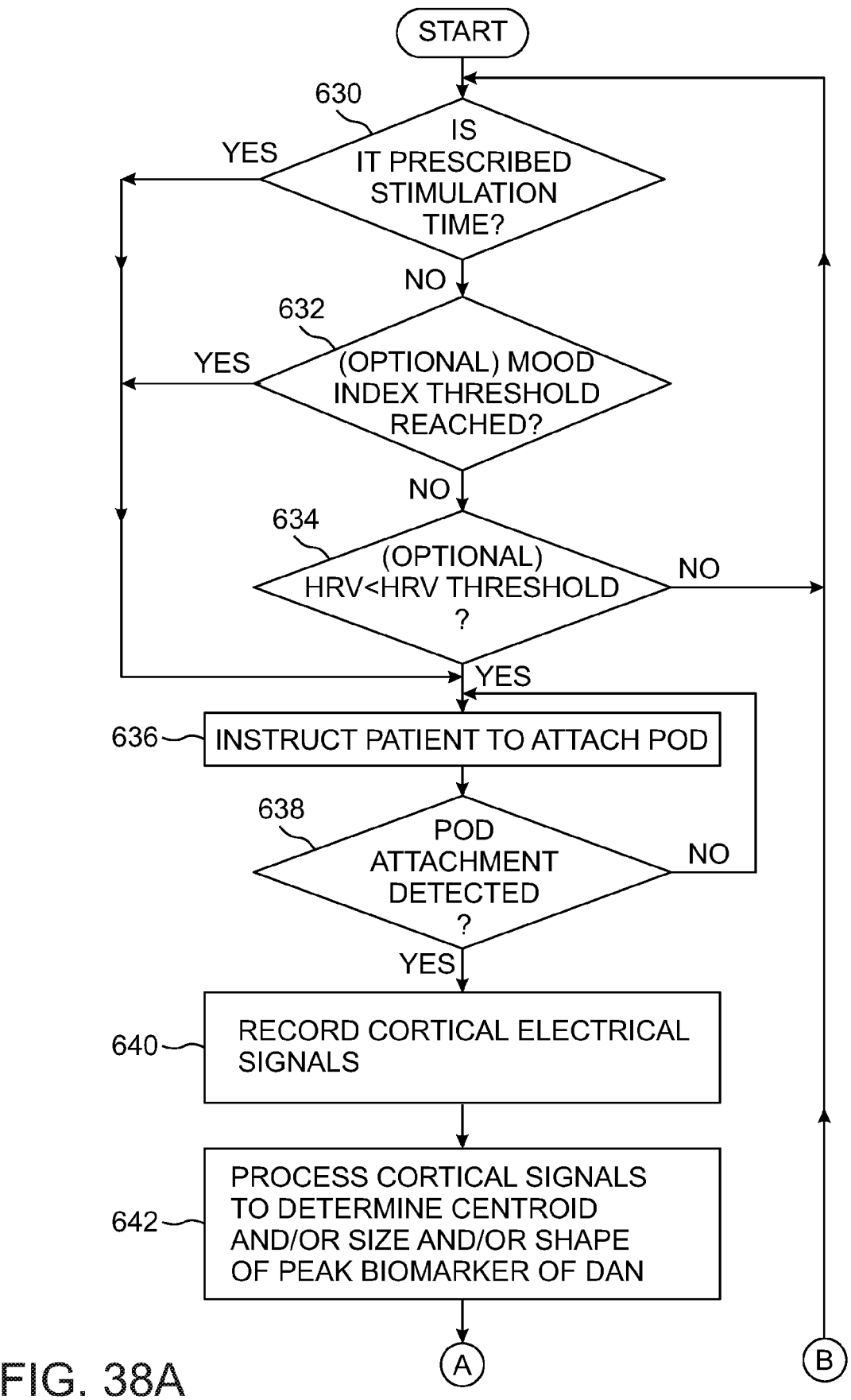
FIGS. 38A-38B are schematic flow chart diagrams illustrating the steps of another method for tracking and targeting a cortical stimulation target, in accordance with some embodiments of the methods of the present application.
Figure 38B:
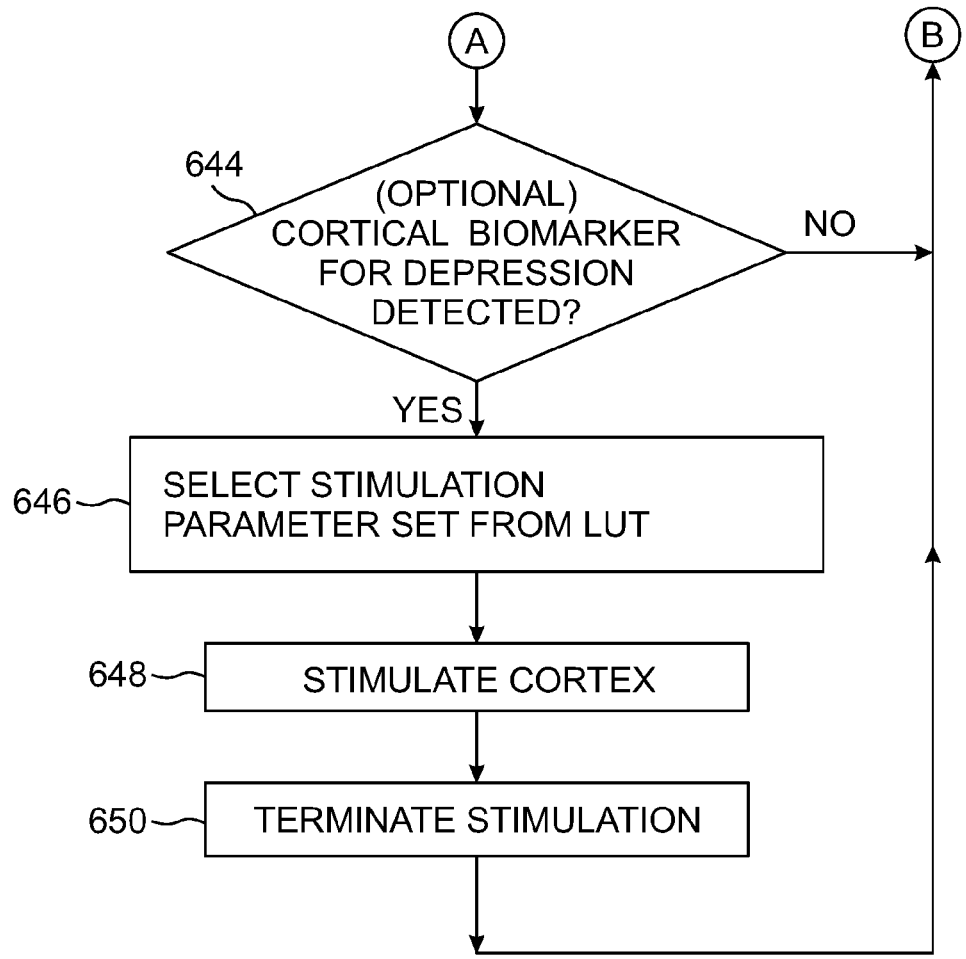

Reference is now made to FIGS. 38A-38B, which are schematic flow chart diagrams illustrating the steps of another method for tracking and targeting a cortical stimulation target, in accordance with some embodiments of the methods of the present application.

The method illustrated in FIGS. 38A-38B starts by checking if it is time for the prescribed stimulation session (step 630). If it is the prescribed time, it moves on to step 636. If it is not the prescribed time, the method can optionally return to step 630 or continue on to step 632. In optional step 632, the method checks if the mood index (MI or MX) threshold has been reached (step 632). If has been reached, it moves on to step 636. If mood index threshold has not been reached, the method can optionally return to 630 (not shown) or continue on to step 634 (shown). The mood index MX may be computed from EMA data collected by the smartphone 11 and wirelessly transmitted to the remote server 12 and/or the clinical workstation over the internet. It is noted that the methods for collecting EMA data and computing the mood index (MI or MX) is known in the art, is not the subject matter of the present application, and is therefore not described in detail hereinafter.

Briefly, the remote server 12 and/or the clinical workstation 13 may compute the indexes MI or MX, as is disclosed in detail in International published application WO/2019/244099. If the computed value of the mood index (MI or alternatively MX, as defined in WO/2019/244099) has reached a preset threshold value, the method the method transfers control to step 636. If the computed value mood index (MI, or alternatively MX) has not reached the preset threshold value, the method optionally transfers control to step 634 (shown) or returns to 630 (not shown). In (optional) step 634, the method checks if the current value of the HRV (provided by the smartwatch 117 and/or by the smartphone 11 in combination with the smartphone 11) is smaller than a preset or predetermined HRV threshold (which represents an indication that the patient 115 is in a depressed state). If the current HRV value is not smaller than the HRV threshold (which means that the patient 115 is not in a depressed state and the delivery of the prescribed stimulation session is not justified or needed), the system returns control to step 630 without delivering a stimulation session.

If the current HRV value is smaller than the HRV threshold, the system proceeds to step 636.

Steps 636, 638, 640, 642 are identical to steps 612, 614, 616 and 618 of the method of FIG. 37. Briefly, the method instructs the patient 115 to attached the pod 19, checks if the pod 19 is attached if the pod 19 is not attached control is transferred to step 636, if the pod is properly attached, the system proceeds with steps 640 and 642. After the biomarker centroid and/or size and/or shape is determined, the method proceeds to (optional) step 644. In step 644, the method may (optionally) proceeds to check if one or more cortical biomarkers (computed from the processed signals recorded by the recording electrodes) indicates a depressed state of the patient 115. If no such biomarker value indicative of a depressed state is detected, the method may return control to step 630 without delivering a therapeutic stimulation session. If the value of the biomarker is indicative of a depressed state of the patient 115, the method proceeds to step 646 and selects a matched stimulation parameter set from the LUT, as described in detail with respect to step 620 of the method of FIG. 37. The method then proceeds to step 648 (which is identical to step 622 of the method of FIG. 37) in which the method stimulates the cortex for the prescribed time period using the stimulation parameter set selected from the LUT in step 646.

The system may then terminate the stimulation session (step 650) and returns control to step 630.

It is noted that in some embodiments of the method, step 632 may be eliminated. In some other embodiments of the method, step 634 may be eliminated, and in some other embodiments, step 644 may be eliminated. Furthermore, in some embodiments of the method, steps 632 and 634 may be eliminated. In some other embodiments, steps 632 and 644 may be eliminated. In some other embodiments of the method, steps 634 and 644 may be eliminated.

The elimination of the above indicated steps or pairs of steps may depend, inter alia, on the type of components included in the system 200, the predictive accuracy of the checked parameter (such as, HRV, predicting a depressed state of the patient 115, and other considerations.

The computed cortical biomarker(s) checked in Step 644 may include, for example, one or more of the following biomarkers: the time resolved phase amplitude coupling [tPAC], the alpha theta difference ($\Delta P_{\alpha,\theta}$), the normalized alpha, theta power ratio ($P_{R\alpha,\theta}$), the relative gamma power ($P_{REL}\gamma$), the relative beta power ($P_{REL}\beta$), the beta gamma power difference($\Delta P_{\beta,\gamma}$), the normalized beta gamma relative power($P_{REL}\gamma$), the normalized beta gamma power ratio ($P_{R\beta,\gamma}$), the peak frequency of a spectral analysis, the peak frequency power in a specific frequency band, phase coupling, correlation measurements, frequency band variance, frequency band power, ripples, fast ripples, or any other suitable cortical biomarker of depression computable from the recorded electrical signals recorded by one or more of the recording electrodes of the implanted device (such as, for example, the signals recorded by the recording electrodes 25A-25D of the implantable device 10.

It is noted that throughout the specification and the claims, the abbreviations used to denote specific biomarkers that may be computed from cortical signal recordings performed by any recorded electrode (but without specifying the electrode number) are as follows in TABLE 2 below.

TABLE 2

| Biomarker notation | Definition |
|---|---|
| tPAC | The time resolved phase amplitude coupling |
| $\Delta P_{\alpha,\theta}$ | The alpha theta difference |
| $PR_{\alpha,\theta}$ | The normalized alpha, theta power ratio |
| $P_{REL}\gamma$ | The relative gamma power |
| $P_{REL}\beta$ | The relative beta power |
| $\Delta P_{\beta,\gamma}$ | The beta gamma power difference |
| $\Delta P_{\beta,\gamma}$ | The beta gamma power difference |
| $P_{REL}\gamma$ | The normalized beta gamma relative power |
| $P_{R\beta,\gamma}$ | The normalized beta gamma power ratio |

The method for computing values of the biomarkers of TABLE 2 for any single electrode are disclosed hereinabove in equations 5, 8, 11 and 14.

Examples of usable biomarkers may include the relationship between theta and alpha power, which are differentially associated with intrinsic and extrinsic networks, respectively. Elevations in theta power are inversely associated with mood. Specifically, increases in theta rhythm are associated with depressed mood. Alternatively, beta coherence may also be an indicator of mood. Increased variability of beta coherence within this network predicts worse mood.

The value of the biomarker(s) may be computed from signals obtained from a single recording electrode (such as, for example, the electrode exhibiting the highest or lowest value of the biomarker out of all the recording electrodes) or as an averaged value computed from the recorded signals of more than one electrode).

Methods of Selecting Matched Stimulation Parameter Sets.

Figure 39:
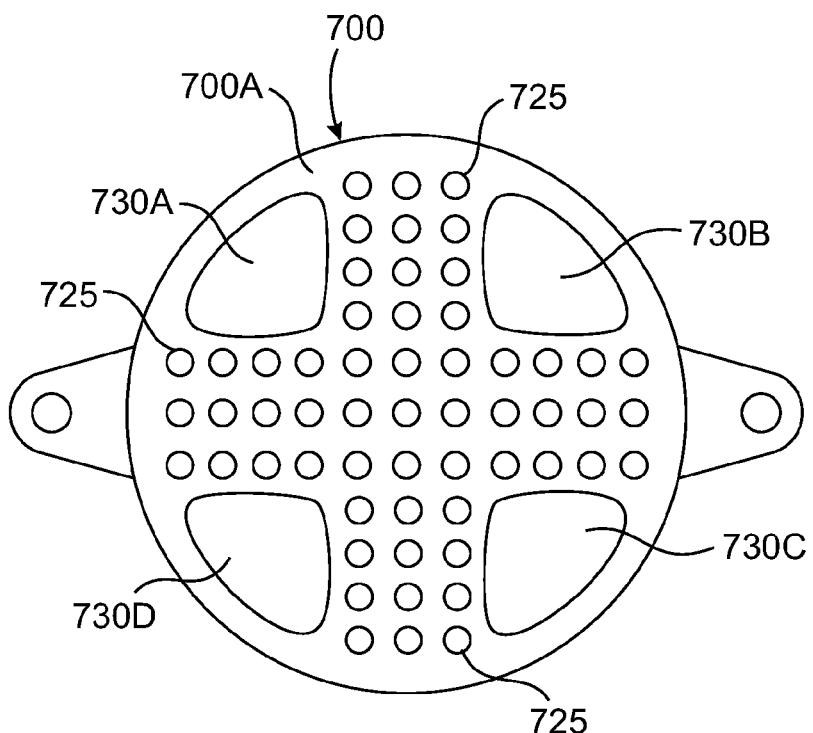
FIGS. 39-40 are schematic bottom views of some embodiments of the implants of the present application, having some useful arrangements of recording and stimulating electrode arrangements.
Figure 40:
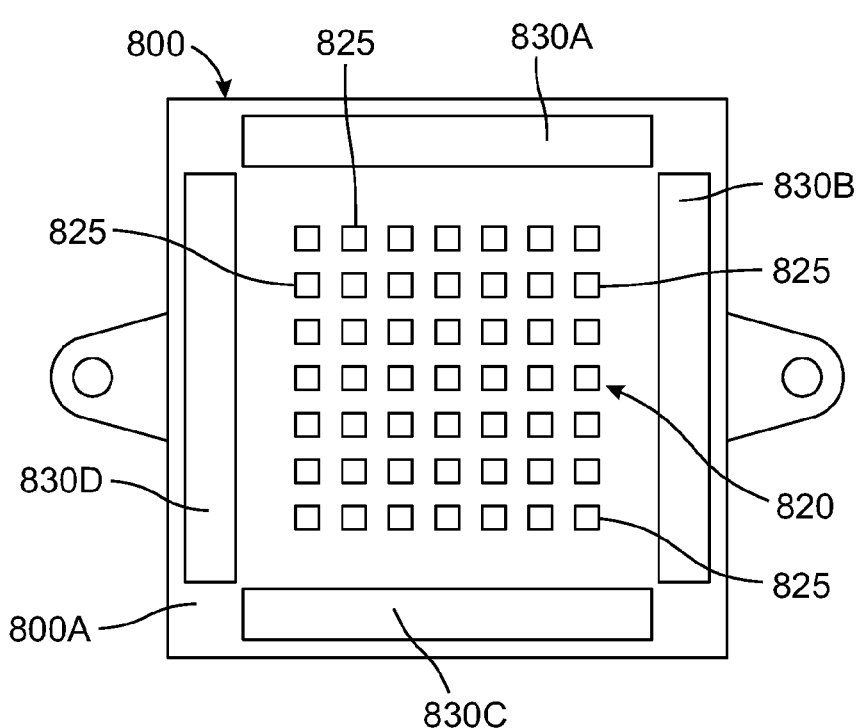

Reference is now made to FIGS. 39-40, which are schematic bottom views of two additional implantable devices, illustrating the arrangement of recording electrodes and stimulating electrodes at the bottom of some embodiments of the implantable devices of the present application.

Turning to FIG. 39, the implantable device 700 has a bottom surface 700A, the structure and components of the device 700 mat be similar to those of the device 10 except that the size and number of the electrodes arranged on the bottom surface 700A are different, the device 700 has four stimulating electrodes 730A-730D that may be symmetrically arranged relative to the center point (not shown) of the circular bottom surface 700. The device 700 includes a "cross-like" electrode-array including fifty-seven recording electrodes 725 as illustrated in FIG. 39.

Turning to FIG. 40, the implantable device 800 may be shaped like a rectangular box or prism and has a square bottom surface 800A. The surface 800A has four rectangular stimulating electrodes 830A-830D symmetrically arranged with respect to the center point (not shown) of the square bottom surface 800A. The stimulating electrodes 830A-830D surround a rectangular recording electrode array 820 including forty-nine recording electrodes 825 symmetrically arranged with respect to the center point of the square bottom surface 800A as illustrated in FIG. 40.

The implantable devices 700 and 800 may be implanted intra-calvarially or between the calvarial bone and the scalp and maybe used for stimulating the cortex and for recording electrical cortical signals as disclosed hereinabove for the implantable device 10.

Due to the relatively high number of recording electrodes per unit area of the bottom surfaces 700A and 800A, the plurality of electrodes 725 and 825, respectively, may provide a higher mapping density of the recorded cortical signals and/or the computed biomarker intensity values.

This may enable obtaining a more refined "mapping" of the biomarker values having a better resolution than what is possible with the four recording electrodes 25A-25D of the implantable device 10. Such a "map" may be useful for defining a size and shape for the area with peek intensity of the biomarker that will have more useful information than just computing the centroid of peak biomarker intensity as disclosed hereinabove (at the cost of decreasing the signal to noise ratio of the recorded electrical signals due to the resulting decrease in the single electrode size or in the electrode surface area exposed on the bottom of the devices 700 and 800).

For example, such a size and shape of the biomarker may be determined by zeroing the value of all the computed biomarker value data points which have a value below a predefined threshold value, resulting in a 2D map having a contour line approximately representing the (somewhat pixelated) shape approximating a contour of the shape of the region with arbitrarily selected data point values exceeding the selected threshold value. By stepwise changing (increasing) the threshold value it is possible to "construct" a map with approximate iso-intensity contour lines on the planar bottom of the device, representing the intensity distribution of the biomarker.

Such refined intensity contour maps may be used to select the matched stimulating parameter set (or sets) from the parameter sets stored in the LUT.

For example, if the LUT includes a set of digitized pixel maps (each map may be composed of m×m pixels with known x-y coordinates in the selected plane) of current density values within a cortical plane parallel to the bottom of the implanted device (obtained by using the COMSOL simulations as disclosed hereinabove). It is possible to select a matched set of stimulation parameters from the LUT by the following procedure: computing for each LUT set of parameters the following weighted sum obtained by the following procedure:

1) Assuming that the set of pixels representing each of the biomarker values computed from the recorded electrical cortical signals are spatially identical to the set of pixels of each LUT entry (meaning that each pixel of the stored 2D pixel map of the biomarker values has the same x-y Cartesian coordinate values and the same pixel 2D dimensions as the simulated current density).
2) Compute the sum M of the n products $BV_N \times I_N$ over the range N=1-n Wherein, $BV_N$ is the biomarker value of the $N^{th}$ pixel, and
$I_N$ is the current density value of the corresponding $N^{th}$ pixel of the simulated current density pixel map.

And wherein n is a subset of pixels which are positioned within the region of overlap of both pixel maps.

4) Select the set of stimulation parameters which has maximal value of the product sum.
5) If there are several pixels having the same (maximal) value of M, randomly or pseudo-randomly select one stimulation parameter set out of all the stimulation parameter sets having the same computed (maximal) M.

This procedure is readily expanded for 3D by using digitized voxel maps (each map may be composed of m×m×m voxels with known x-y-z coordinates in a selected volume) of current density values (obtained by using the COMSOL simulations as disclosed herein above) and a corresponding digitized voxel map of the desired activation pattern.

Variations of this procedure may also be implemented. For example, pixel or voxel maps may be modified prior to step 2 by thresholding values. For example, biomarker values below a defined value may be zeroed and current density values below a defined value may be zeroed prior to steps 2-5. Pixel or voxel values may also be normalized. For example, values may be set to a value of one (1) if a defined threshold is exceeded prior to steps 2-5. Other embodiments on this method may include implementation of more sophisticated optimization techniques including least-squares. For example, a stimulation set may be selected if it provides the minimum summation of squared differences between pixel or voxel maps:

$$\min \sum (BV_N - I_N)^2$$

These examples are intended to be illustrative, rather than limiting, of variations of the method described hereinabove, such that modern optimization methods may be readily adapted to this purpose.

Figure 42:
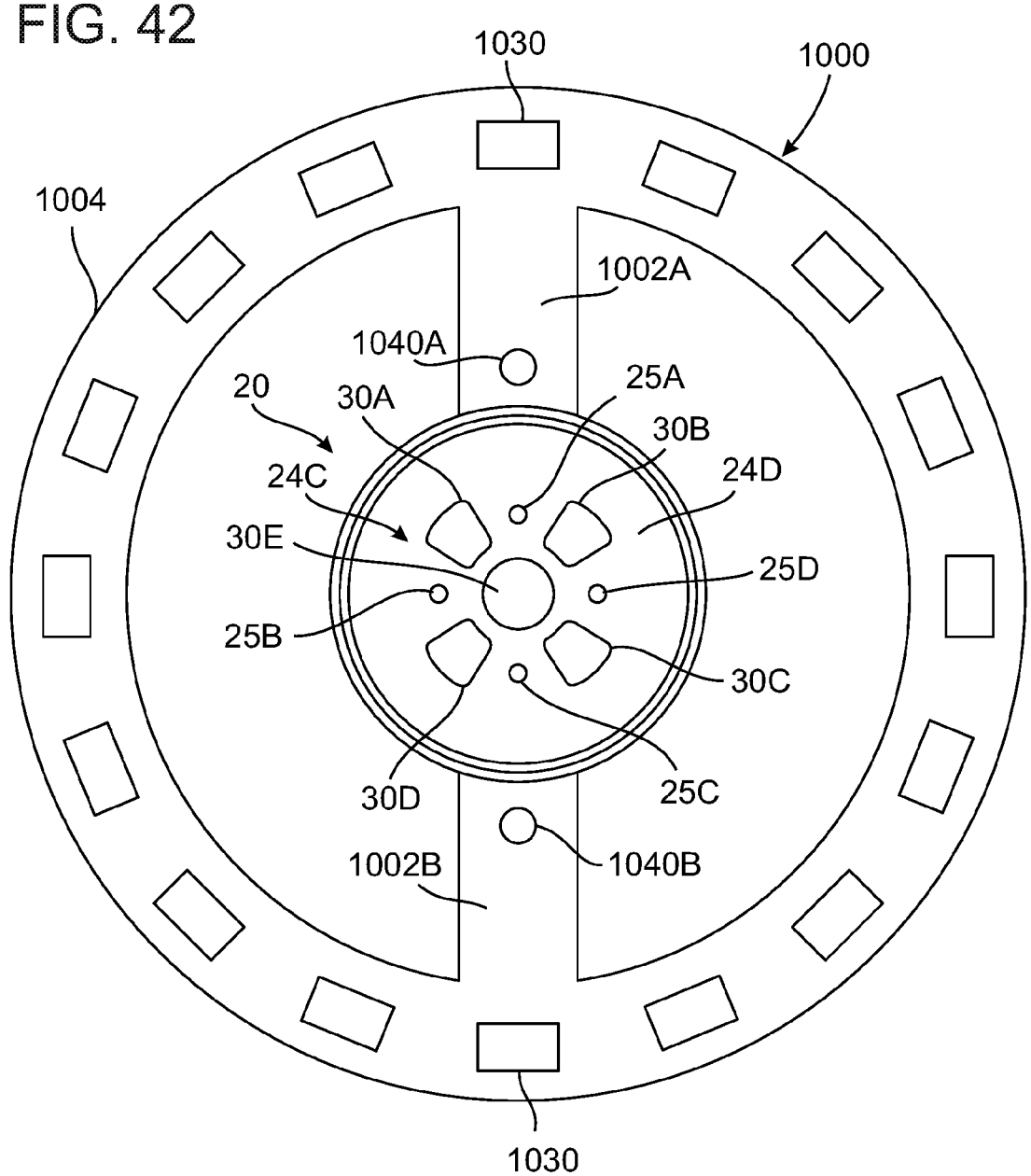

Reference is now made to FIGS. 41-42, which are schematic diagrams illustrating bottom views of two different embodiments of the implantable.

Turning to FIG. 41, the implantable device 900 may include the stimulating electrodes 30A-30D, the sensing/recording electrodes 25A-25D and the reference electrode 30E and the housing 20 of the ICI 10 of FIGS. 1-5. The implantable device 900 may include two flat elongated members 902A and 902B instead of the tabs 34A and 34B of the ICI 10. The elongated member 902A extends laterally from the housing 20 and includes a screw hole (or open eyelet) 940A for inserting an attachment screw therein (screw is not shown) and three auxiliary electrodes 930A, 930B and 930C. The elongated member 902B extends laterally from the housing 20 in a direction opposite the direction of extension of the elongated member 902A and includes a screw hole 940A and three auxiliary electrodes 932A, 932B and 932C.

It is noted that the shape, number and distribution of the auxiliary electrodes 930A-C and 932A-C along the elongated members 902A and 902B may vary in different embodiments of the device 900. Additionally, elongated members 902 may vary in number, shape, orientation, and symmetry in different embodiments of the device 900.

The ECM 28 (not shown in FIG. 41) of the implantable device 900 is suitably modified such that some or all of the auxiliary electrodes 930A, 930B, 930C, 932A, 932B and 932C may be connected to the first electrode selecting module 120 120 (of FIG. 7). In some other embodiments of the implantable device 900, some or all of the auxiliary electrodes 930A, 930B, 930C, 932A, 932B and 932C may be connected to the second electrode selecting module 124 of FIG. 7. In other embodiments of the implantable device 900 some of the auxiliary electrodes 930A, 930B, 930C, 932A, 932B and 932C may be connected to the first electrode selecting module 120 while the remaining electrodes may be connected to the second electrode selecting module 124.

In other embodiments of the implantable device 900 some of the auxiliary electrodes 930A, 930B, 930C, 932A, 932B and 932C may replace The electrode 30F, or may be connected to the electrode 30F.

Thus, any electrode of the auxiliary electrodes 930A, 930B, 930C, 932A, 932B may be operable as a sensing electrode, or a reference or ground electrode (for sensing), or a stimulating electrode (for stimulation), or a return/ground electrode (for stimulation).

In some embodiments of the implantable device 900, one or more antennas may be integrated into the one or more elongated members 902 and may be connected to the telemetry unit 24.

Turning now to FIG. 42, the implantable device 1000 may include the stimulating electrodes 30A-30D, the sensing/recording electrodes 25A-25D and the reference electrode 30E and the housing 20 of the ICI 10 of FIGS. 1-5.

The implantable device 1000 may include two flat elongated members 1002A and 1002B attached to the housing 20. The elongated member 902A extends laterally from the housing 20 and may include a screw hole (or open eyelet) 1040A for inserting an attachment screw therein (screw is not shown). The elongated member 1002B extends laterally from the housing 20 in a direction opposite the direction of extension of the elongated member 1002A and may include a screw hole (or open eyelet) 1040B for inserting an attachment screw therein (screw is not shown).

The elongated members 1002A and 1002B extend laterally into a circumferential member 1004, surrounding the housing 20. The circumferential member 1004 may include a plurality of auxiliary electrodes 1030. The auxiliary electrodes 1030 are symmetrically spaced around the circumferential member 1004 as illustrated in FIG. 42. However, in other embodiments of the device, the auxiliary electrodes 1030 may be asymmetrically distributed along the circumferential member 1004. It is noted that the shape, number and distribution of the auxiliary electrodes 1030 along the circumferential member 1004 may vary in different embodiments of the device 1000. Similarly, the number and position of the screw holes of the device 1000 may also vary. For example, in some embodiments, four screw holes (not shown in FIG. 42) may be positioned along the circumferential member 1004 in order to ensure its proper fixation to the calvarial bone and to prevent or reduce undesirable movements of the position of the electrodes 1030 along the calvarial bone that may be caused by touching or flexing the scalp.

It is noted that the elongated members 902A and 902B of the device 900, the elongated members 1002A and 1002B, and the circumferential member 1004 may be made from an electrically non conducting material such as for example a suitable polymer based material (for example, PARYLENE®, or any other suitable biocompatible flexible or bendable material to better fit the curvature of the calvarial bone. Suitable electrically conducting wires (not shown may be embedded through the electrically non-conducting material of the elongated members 902A and 902B of the device 900, the elongated members 1002A and 1002B, and the circumferential member 1004 to sealingly pass through the housing 20 where they may be electrically connected to the first electrode selecting module 120 (of FIG. 7) and/or to the second electrode selecting module 124 of FIG. 7.

The ECM 28 (not shown in FIG. 42) of the implantable device 1000 may be suitably modified such that some or all of the auxiliary electrodes 1030 may be connected to the first electrode selecting module 120 (of FIG. 7). In some other embodiments of the implantable device 1000, some or all of the auxiliary electrodes 1030 may be connected to the second electrode selecting module 124 of FIG. 7. In other embodiments of the implantable device 1000 some of the auxiliary electrodes 1030 may be connected to the first electrode selecting module 120 while the remaining electrodes 1030 may be connected to the second electrode selecting module 124.

In other embodiments of the implantable device 1000 some of the auxiliary electrodes 1030 may replace or be connected to the counter/return electrode 30F.

Thus, any electrode of the auxiliary electrodes 1030 may be operable as a sensing electrode, or a reference or ground electrode (for sensing), or a stimulating electrode (for stimulation), or a return/ground electrode (for stimulation). In some embodiments of the implantable device 1000, an inductive coil may be integrated into the circumferential member 1004 that inductively couples to the external inductance coil 672 to receive wireless power. In some embodiments of the implantable device 1000, one or more antennas may be integrated into the circumferential member 1004 that may be connected to the telemetry unit 24.

It is noted that in some of the embodiments of the implantable devices of the present application, electrodes may be integrated on the sides of the implant, on the top of the implant, and/or on structural elements extending outward from the implant. In some embodiments, electrodes may be integrated into tabs that extend from the implant as shown in FIG. 41. In some embodiments, electrodes may be integrated into symmetric (or in some embodiments non-symmetric) structural elements that circumscribe the implant as shown in FIG. 42. In some embodiments, the structural elements that incorporate electrodes may integrate eyelets or other anchoring mechanisms to affix the implant to the skull. Electrodes that are integrated on the sides, top, and/or extensions of the implant may be used as stimulating electrodes, return/ground electrodes for stimulation, sensing electrodes, or reference/ground electrodes for sensing.

When the auxiliary electrodes are used as reference/ground electrodes for sensing, they provide the advantage of improving the common-mode rejection ratio (CMRR) of signals recorded from the bottom surface of the implant (the surface that is closer to the cortex after implantation). For example, global signals picked up from electrodes placed on the side, top, or extensions from the implant may be subtracted from local signals picked up from electrodes closer to the cortical surface (Such as, for example, electrodes disposed on the bottom surface of the implant) that include both global "noise" and local signals of interest.

When the auxiliary electrodes are used as reference/ground electrodes for sensing and their geometries do not form a continuous loop that is parallel to the energizing pod 19 used to power the implant, they provide the advantage of minimizing undesirable inductive coupling of the inductive power signal into recordings, which further improves signal to noise ratio (SNR).

When the auxiliary electrodes are used as return/ground electrodes for stimulation, they provide the advantage of shifting the path of steered current to further improve the ability to shift, shape, and focus therapeutic stimulation. Furthermore, the ability to switch between electrodes or combinations of electrodes that are used as return/ground provides an added degree of freedom to shape stimulation activation patterns below the implantable device. For example, when using an electrode, or combination of electrodes, on the upper right side of the implantable device as the stimulation return electrode(s), the current path from the stimulation electrodes on the bottom surface of the implantable device (such as, for example, the bottom surface 24D of the devices 900 and 1000) will be shifted to the right, shifting the region of neural activation below the implantable device to the right.

When an inductive coil or data antenna are integrated into the elongated tabs or circumferential members, they provide the advantage of increasing the circumference of the inductive coil to capture more energy and length of the antenna to match the wavelength or fractional wavelength used by the telemetry module for more robust data transmission.

When using an electrode, or combination of electrodes, on the upper left side of the implantable device as the stimulation return electrode(s), the current path from stimulating electrodes on the bottom surface of the implantable device will be shifted to the left, shifting the region of neural activation below the electrodes disposed on the bottom surface of the implantable device to the left. Similarly, the stimulation activation region can be made to be more focal or broad by switching the stimulation return/ground between electrodes, or combination of electrodes, that are located closer or further from the center of the implantable device.

It is noted that combining the network tracking data from the recording electrodes with patient feedback and other non-electrode biomarkers (e.g. heart rate variability), a closed-loop stimulation system is formed that intermittently or continuously updates stimulation parameters.

It is noted that while the ICIs and ICI systems disclosed in the present application are designed mainly for implantation in a human, they may also be implanted in the calvarial bone of any other mammal either as they are described herein or in a scaled down or scaled up versions having different dimensions to match the thickness of the calvarial bone of the mammal in which they are to be implanted. Such ICIs may be implanted in non-human mammals for research purposes or other commercial applications.

Furthermore, while only certain types of implants intra-calvarially implanted and sub-dermally implanted devices (i.e. devices implanted between the calvarial bone and the scalp) are disclosed in the present application, many other different types of implants may be usable in the systems and methods of the present application. For example, many of the types of calvarial implants disclosed in international published applications WO/2019/130248 and WO/2020/161555 may be used in the systems and methods of the present application and are included within the scope of the present application.

Furthermore, while the systems devices and methods disclosed in detail hereinabove are suitable for tracking stimulation targets and delivering stimulation therapy in depressive patients, the stimulation target tracking and stimulation methods and devices may be also adapted to be used in other different psychiatric or neuropsychiatric disorders as long as the cortical therapeutic stimulation target for such patients has known suitable cortical biomarkers that may be computed by processing electrical signals recorded by recording electrodes at a defined cortical region. For example, the systems, devices and methods disclosed herein may be used to treat, mood disorders, Post traumatic syndrome (PTSD), bipolar disorder (in manic-depressive patients), Attention deficit disorder (ADD), attention deficit hyperactivity disorder (ADHD), chronic pain, addiction, obesity, neurodegenerative disorders or dementias (such as, for example, Alzheimer's disease, or other forms of age related cognitive decline.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for tracking a cortical region to be stimulated in a patient, the system comprising:
    at least one implantable device configured to be implanted in the head of the patient, the implantable device includes a plurality of recording electrodes for recording electrical signals from the cortical region, a plurality of stimulating electrodes for delivering stimulating electrical signals to at least part of the cortical region, a controller/processor for controlling the recording of the electrical signals from the cortical region and for controlling the delivering of the stimulating signals, a telemetry unit for wirelessly bi-directionally communicating with one or more external devices and a power source for energizing the implantable device,
    one or more external devices disposed outside the body of the patient, the one or more external devices includes at least one processor/controller configured for processing data and at least one telemetry unit for wirelessly bi-directionally communicating with the at least one implantable device,
    wherein the at least one implantable device and one or more external devices are in wireless communication there between and are programmed to perform the steps of,
    recording electrical cortical signals using the plurality of recording electrodes,
    processing the recorded electrical signals to compute spatial parameters representing the spatial distribution of the magnitude of at least one biomarker indicative of the cortical region to be stimulated,
    selecting from a look-up table (LUT) available in the system and including a plurality of simulated current spatial distribution data sets or datasets derived from the plurality of simulated current spatial distribution sets, a matched data set of stimulation parameters to be applied to the plurality of stimulating electrodes responsive to the spatial parameters representing the spatial distribution of the at least one biomarker computed in the step of processing, and
    applying to the cortical region stimulating electrical signals using the matched set of stimulation parameters selected in the step of selecting.

2. The system according to claim 1, wherein the at least one implantable device comprises a plurality of implantable devices implanted in the head of the patient.

3. The system according to claim 1, wherein the one or more external devices are selected from the list consisting of, a hand held computing device, a wearable computing device, a smartwatch, a smartphone, a personal computer, a personal laptop, a remote clinical workstation, a remote server and any combination thereof.

4. The system according to claim 3, wherein the system includes at least one remote server and wherein the steps of processing and selecting are performed by cloud processing on the remote server or on the remote clinical workstation.

5. The system according to claim 1, wherein the one or more implantable devices each include a magnet, and wherein the one or more external devices include one or more detachably attachable wirelessly energizing devices, attachable to the scalp of the patient over the at least one implantable device, wherein the one or more energizing devices are selected from the list consisting of,
    an energizing pod comprising a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod,
    an energizing pod comprising a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a permanent magnet attached to the housing or disposed within the housing of the energizing pod, an energizing pod comprising a housing, an induction coil electromagnetically couplable to a second induction coil disposed within or on the at least one implantable device for inductively providing electrical energy to the at least one implantable device, a power transmitter electrically connected to the induction coil of the energizing pod, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod, wherein the inductance coil connected to the power transmitter of the pod is also electrically connected to the telemetry unit and is operable as an antenna of the telemetry unit, an energizing pod comprising a housing, an induction coil electromagnetically couplable to a second induction coil disposed within or on the at least one implantable device for inductively providing electrical energy to the at least one implantable device, a power transmitter electrically connected to the induction coil of the energizing pod for controllably providing electrical alternating current to the inductance coil, a telemetry unit for wirelessly bi-directionally communicating data and/or commands and/or status signals between the energizing pod and at least one of the one or more external devices, a sensor for detecting attachment of the energizing pod to the scalp of the patient over the at least one implantable device, a memory unit for storing and retrieving data, a processor/controller connected to the sensor, the telemetry unit, the memory unit and the power transmitter for controlling the operation thereof, a power source for providing electrical energy to the components of the pod, and a magnet attached to the housing or disposed within the housing of the energizing pod.

6. The system according to claim 1, wherein the implantable device is programmed to perform the step of recording and the step of applying and wherein the at least one external device is programmed to perform the steps of processing and selecting.

7. The system according to claim 1, wherein the stimulating electrical signals are selected from,
exciting stimulating electrical signals,
inhibiting electrical signals, and
a combination of exciting and inhibiting signals.

8. The system according to claim 1, wherein the at least one implantable device is selected from the list consisting of, an intra-calvarially implantable device adapted to be implanted within the calvarial bone of the skull of the patient, and, an implantable device adapted to be implanted between a calvarial bone and a scalp of the patient.

9. The system according to claim 1, wherein the at least one biomarker is selected from the list consisting of, a time resolved phase amplitude coupling of gamma and beta frequency bands [tPAC]$\gamma\beta$, a normalized alpha-theta power difference ($\Delta P_{\alpha,\theta}$), a normalized alpha-theta power ratio ($P_{R\alpha,\theta}$), a relative gamma power with respect to the total power ($P_{REL}\gamma$), a relative beta power with respect to the total power ($P_{REL}\beta$), a normalized beta-gamma power difference ($\Delta P_{\beta,\gamma}$), a normalized beta-gamma relative power ($P_{REL\beta\gamma}$), a normalized beta-gamma power ratio ($P_{R\beta,\gamma}$), peak frequency of a spectral analysis, peak frequency power in a specific frequency band, phase coupling, correlation measurements, frequency band variance, frequency band power, ripples, fast ripples.

10. The system according to claim 1, wherein the plurality of recording electrodes are selected from the list of,
a plurality of identically shaped recording electrodes positioned such that their recording surfaces are disposed on the bottom surface of the implantable device and facing the cortical region,
a plurality of identically shaped recording electrodes positioned such that their recording surfaces are disposed on the bottom surface of the implantable device and facing the cortical region and wherein the recording electrodes are symmetrically disposed with respect to the center point of the bottom of the implantable device,
a plurality of identically shaped recording electrodes positioned such that their recording surfaces are disposed on the bottom surface of the implantable device and facing the cortical region and wherein the recording electrodes are non-symmetrically disposed with respect to the center point of the bottom of the implantable device.

11. The system according to claim 1, wherein the one or more implantable devices also includes one or more auxiliary electrodes selected from the list consisting of,
one or more reference electrodes,
one or more current return electrodes,
one or more stimulating electrodes,
one or more reference electrodes disposed on one or more attachment tabs of the implantable device,
one or more reference electrodes disposed on a laterally extending member attached to or laterally extending from the implantable device,
one or more current return electrodes disposed on one or more attachment tabs of the implantable device,
one or more current return electrodes disposed on a laterally extending member attached to or laterally extending from the implantable device,
one or more additional stimulating electrodes disposed on one or more attachment tabs of the implantable device,
one or more additional stimulating electrodes disposed on a laterally extending member attached to or laterally extending from the implantable device, and
any combinations thereof.

12. The system according to claim 1, wherein the step of selecting includes the steps of,
computing the coordinates of the centroid of biomarker peak magnitude in a Cartesian x,y coordinate system within a first plane parallel to the bottom surface of the implanted device from the values of the biomarker computed for each electrode recording electrode,
computing for each parameter set of the LUT the coordinates of the peak current density in a second plane parallel to the first plane and disposed within the cortical region to be stimulated, to obtain a set of computed values of coordinates of peak current densities,
computing the distance between x-y coordinates of the centroid and each of the x-y coordinates to obtain a set of distance values, selecting from the set of computed distances the set of stimulation parameters having the shortest distance of the set of distance values,
if there are two or more shortest distance values having the same value, randomly or pseudo-randomly choosing a single set of stimulation parameters from the set of two or more equal shortest distance values.

13. The system according to claim 1, wherein the system includes at least one external device capable of providing EMA data to the system and wherein the step of applying may be prevented or enabled responsive to the EMA data provided to the system.

14. The system according to claim 1, wherein the system includes at least one external device capable of providing heart rate variability (HRV) data to the system, and wherein the step of applying may be prevented or enabled responsive to the HRV data provided to the system.

15. The system according to claim 1, wherein the step of processing includes processing the electrical signals recorded by one or more of the recording electrodes and computing from the electrical signals the value of a biomarker indicative of the mood state of the patient, and wherein the step of applying may be prevented or enabled responsive to the computed value of the biomarker data.

16. The system according to claim 1, wherein the patient is a patient having a disorder or condition selected from the list consisting of, a mood disorder, depression post traumatic syndrome (PTSD), bipolar disorder, attention deficit disorder (ADD), attention deficit hyperactivity disorder (ADHD), chronic pain, addiction, obesity, an eating disorder, bulimia, anorexia, a neurodegenerative disorder, anxiety, a dementia, Alzheimer' disease, an age related cognitive decline, Traumatic brain injury (TBI), or any combination thereof.

17. A method for detecting and tracking in a cortex of a patient the present anatomical position of a cortical neural network to be stimulated by an implantable device by using the system according to claim 1, the method comprising the steps of:
recording electrical cortical signals from a cortical region of the patient using the plurality of recording electrodes,
processing the recorded electrical signals to compute spatial parameters representing the spatial distribution of the magnitude of at least one biomarker indicative of the cortical region to be stimulated,
selecting from an available plurality of simulated current spatial distribution data or data sets derived from the plurality of simulated current spatial distribution data sets, a matched set of stimulation parameters to be applied to the cortex responsive to the spatial parameters representing the spatial distribution of the at least one biomarker computed in the step of processing, and
applying to the cortex stimulating electrical signals using the matched set of stimulation parameters selected in the step of selecting.

18. The method according to claim 17, wherein the step of applying is performed by one or more implantable devices implanted within a calvarial bone of the patient or between the calvarial bone and a scalp of the patient, the one or more implantable devices have a plurality of stimulating electrodes for stimulating the cortex of the patient.

19. The method according to claim 17, wherein the step of recording includes the steps of conditioning and amplifying the cortical signals prior to the step of processing.

20. The method according to claim 17, wherein the method includes the step of wirelessly transmitting the signal recorded in the step of recording to at least one computing device disposed outside the body of the patient, wherein one or more of the steps of processing and selecting is performed by the at list one computing device.

21. The method according to claim 18, wherein the method also includes the step of wirelessly transmitting the matched set of stimulation parameters selected in the step of selecting to one or more implantable devices for controlling the application of cortical stimulation by a plurality of stimulating electrodes included in the one or more implantable devices, using the matched set of stimulation parameters.

22. The method according to claim 17, wherein the step of selecting includes the steps of,
computing the coordinates of the centroid of the at least one biomarker in a Cartesian x,y coordinate system within a first plane passing through the bottom surface of the implanted device from the values of the biomarker computed for each recording electrode of the plurality of recording electrodes,
computing for each parameter set of the LUT the coordinates of the peak current density in a second plane parallel to the first plane and disposed within the cortical region to be stimulated, to obtain a set of computed values of coordinates of peak current densities,
computing the distance between the x,y coordinates of the centroid and each of the x-y coordinates to obtain a set of distance values,
selecting from the set of computed distances the set of stimulation parameters having the shortest distance of the set of distance values, and
if there are two or more shortest distance values having the same value, randomly or pseudo-randomly choosing a single set of stimulation parameters from the set of two or more equal shortest distance values.

23. The method according to claim 17, wherein the method includes the step of receiving EMA data from a device outside the body of the patient and wherein the step of applying may be prevented or enabled responsive to the EMA data.

24. The method according to claim 17, wherein the system includes the step of receiving heart rate variability (HRV) data, and wherein the step of applying may be prevented or enabled responsive to the HRV data.

25. The method according to claim 17, wherein the step of processing includes processing the electrical signals recorded from the cortex in the step of recording and computing from the electrical signals the value of one or more biomarkers indicative of the mood state of the patient, and wherein the step of applying may be prevented or enabled responsive to the computed value of the biomarker data.

26. The method according to claim 25, wherein the one or more biomarkers are selected from the list consisting of: a time resolved phase amplitude coupling of gamma and beta frequency bands [tPAC]$\gamma\beta$, or a normalized alpha-theta power difference ($\Delta P_{\alpha,\theta}$), a normalized alpha-theta power ratio ($P_{R\alpha,\theta}$), or a relative gamma power with respect to the total power ($P_{REL}\gamma$), a relative beta power with respect to the total power ($P_{REL}\beta$), a normalized beta-gamma power difference ($\Delta P_{\beta,\gamma}$), a normalized beta-gamma relative power ($P_{REL\beta,\gamma}$), a normalized beta-gamma power ratio ($P_{R\beta,\gamma}$), peak frequency of a spectral analysis, peak frequency power in a specific frequency band, phase coupling, correlation measurements, frequency band variance, frequency band power, ripples, and fast ripples.

27. The method according to claim 17, wherein the patient is a patient having a disorder or condition selected from the list consisting of, a mood disorder, post traumatic syndrome (PTSD), bipolar disorder, attention deficit disorder (ADD), attention deficit hyperactivity disorder (ADHD), chronic pain, addiction, obesity, a neurodegenerative disorder, a dementia, or Alzheimer' disease, an age related cognitive decline, Traumatic brain injury (TBI), or any combination thereof.

* * * * *